US007753770B2

(12) United States Patent
Walker et al.

(10) Patent No.: US 7,753,770 B2
(45) Date of Patent: Jul. 13, 2010

(54) METHODS AND APPARATUS FOR DETERMINING HYBRID WAGERING GAME SESSIONS

(75) Inventors: Jay S. Walker, Ridgefield, CT (US); Robert C. Tedesco, Fairfield, CT (US); James A. Jorasch, New York, NY (US)

(73) Assignee: IGT, Reno, NV (US)

( * ) Notice: Subject to any disclaimer, the term of this patent is extended or adjusted under 35 U.S.C. 154(b) by 587 days.

(21) Appl. No.: 11/393,939

(22) Filed: Mar. 29, 2006

(65) Prior Publication Data

US 2006/0189371 A1 Aug. 24, 2006

Related U.S. Application Data

(60) Provisional application No. 60/685,604, filed on May 27, 2005, provisional application No. 60/666,393, filed on Mar. 29, 2005.

(51) Int. Cl.
*A63F 13/00* (2006.01)

(52) U.S. Cl. ............................ 463/16; 463/20; 463/25; 463/29; 273/138.1; 273/139

(58) Field of Classification Search ............ 463/16–21, 463/25–34, 1, 10–13, 23; 273/138.2, 143 R, 273/138.1, 139, 141 A, 142 B, 142 C, 142 J, 273/148 R; 700/90–92; *A63F 13/00*
See application file for complete search history.

(56) References Cited

U.S. PATENT DOCUMENTS 5,178,389 A 1/1993 Bentley et al. .......... 273/138 A
5,709,603 A 1/1998 Kaye ........................... 463/17
5,800,268 A 9/1998 Molnick
5,961,384 A * 10/1999 Robinson ..................... 463/10
5,964,463 A * 10/1999 Moore, Jr. ................... 273/274
5,987,211 A * 11/1999 Abecassis .................... 386/46
6,077,163 A * 6/2000 Walker et al. ................ 463/26
6,203,429 B1 * 3/2001 Demar et al. ................ 463/20

(Continued)

OTHER PUBLICATIONS http://web.archive.org/web/*/http://megamillions.org.*

(Continued)

*Primary Examiner*—Peter DungBa Vo
*Assistant Examiner*—Arthur O. Hall
(74) *Attorney, Agent, or Firm*—K&L Gates LLP

(57) ABSTRACT

In accordance with some embodiments, a plurality of outcomes are generated and used to create a video presentation of representative outcomes of a wagering game. The video presentation is recorded onto a tangible medium (e.g., DVD or CD-ROM) or otherwise provided to a player (e.g., the player may access the video presentation online). This allows a player to purchase a video presentation of predetermined outcomes in a jurisdiction in which gambling is legal yet view the presentation at the player's convenience (e.g., from any jurisdiction and at any time). The player is also offered to determine a result associated with at least one local game play, wherein the offer requires use of an electronic game device located in a legalized gambling jurisdiction to determine the local game play result. In some embodiments, a purchaser of the video presentation may subsequently redeem it for a total redemption value that is associated with both a redemption value for the tangible medium and with the results achieved from the local game play.

6 Claims, 18 Drawing Sheets

| GAME PLAY NUMBER 535 | WAGER 540 | INDICIA 545 | INDICIA IDENTIFIER 550 | PAYOUT 555 |
|---|---|---|---|---|
| 1 | $0.25 | NONWINNING COMBINATION | O-000001 | 0 |
| 2 | $0.25 | NONWINNING COMBINATION | O-000001 | 0 |
| 3 | $0.25 | CHERRY/CHERRY/CHERRY | O-000007 | 20 |
| 4 | $0.25 | NONWINNING COMBINATION | O-000001 | 0 |
| 5 | $0.25 | NONWINNING COMBINATION | O-000001 | 0 |
| 6 | $0.25 | NONWINNING COMBINATION | O-000001 | 0 |
| 7 | $0.25 | ANY/ANY/CHERRY | O-000003 | 2 |
| 8 | $0.25 | NONWINNING COMBINATION | O-000001 | 0 |
| 9 | $0.25 | ORANGE/ORANGE/BAR | O-000009 | 10 |

U.S. PATENT DOCUMENTS

| | | | | |
|---|---|---|---|---|
| 6,206,782 | B1 * | 3/2001 | Walker et al. | 463/25 |
| 6,315,660 | B1 * | 11/2001 | DeMar et al. | 463/16 |
| 6,322,309 | B1 * | 11/2001 | Thomas et al. | 413/20 |
| 6,390,921 | B1 * | 5/2002 | Busch et al. | 463/42 |
| 6,468,160 | B2 * | 10/2002 | Eliott | 463/43 |
| 6,508,709 | B1 | 1/2003 | Karmarkar | 463/42 |
| 6,527,638 | B1 * | 3/2003 | Walker et al. | 463/25 |
| 6,599,192 | B1 * | 7/2003 | Baerlocher et al. | 463/25 |
| 6,602,136 | B1 * | 8/2003 | Baerlocher et al. | 463/16 |
| 6,645,075 | B1 | 11/2003 | Gatto et al. | 463/25 |
| 6,685,560 | B1 * | 2/2004 | Hughes | 463/16 |
| 6,709,331 | B2 | 3/2004 | Berman | 463/16 |
| 6,780,564 | B2 | 8/2004 | Lawandy et al. | 430/270.1 |
| 6,802,776 | B2 * | 10/2004 | Lind et al. | 463/19 |
| 6,863,608 | B1 * | 3/2005 | LeMay et al. | 463/24 |
| 6,884,170 | B2 * | 4/2005 | Rowe | 463/31 |
| 6,918,831 | B2 | 7/2005 | Nguyen et al. | 463/20 |
| 6,935,949 | B1 | 8/2005 | Murphy | 463/20 |
| 6,964,609 | B2 | 11/2005 | Haag et al. | 463/20 |
| 6,987,925 | B2 | 1/2006 | Kinzer et al. | 386/125 |
| 7,076,467 | B1 * | 7/2006 | Chatani | 705/52 |
| 7,104,889 | B2 * | 9/2006 | Nelson et al. | 463/25 |
| RE39,368 | E * | 10/2006 | Alcorn et al. | 463/29 |
| 2002/0132666 | A1 * | 9/2002 | Lind et al. | 463/42 |
| 2002/0196342 | A1 * | 12/2002 | Walker et al. | 348/157 |
| 2003/0064805 | A1 * | 4/2003 | Wells | 463/39 |
| 2003/0104860 | A1 * | 6/2003 | Cannon et al. | 463/25 |
| 2003/0177347 | A1 * | 9/2003 | Schneier et al. | 713/151 |
| 2004/0152504 | A1 | 8/2004 | Herrmann et al. | 463/16 |
| 2004/0210507 | A1 * | 10/2004 | Asher et al. | 705/37 |
| 2004/0229677 | A1 | 11/2004 | Gray et al. | 463/17 |
| 2004/0235550 | A1 | 11/2004 | McNally et al. | 463/16 |
| 2004/0248634 | A1 * | 12/2004 | Herrmann et al. | 463/12 |
| 2005/0059493 | A1 | 3/2005 | Tyson et al. | 463/42 |
| 2005/0114272 | A1 | 5/2005 | Herrmann et al. | 705/67 |
| 2005/0119042 | A1 | 6/2005 | Chamberlain et al. | 463/19 |
| 2005/0170881 | A1 | 8/2005 | Muskin | 463/20 |
| 2005/0193209 | A1 | 9/2005 | Saunders et al. | 713/182 |
| 2005/0277459 | A1 | 12/2005 | Haag et al. | 463/13 |
| 2006/0154730 | A1 * | 7/2006 | Okuniewicz | 463/43 |

OTHER PUBLICATIONS www.englishharbour.com, http://web.archive.org/web/*/http://englishharbour.com.*

Brochure: "Unlock the power of DVD with Optreve", www.screenlifedvd.com, undated.

Overview: "DVD Manufacturing Process", Technicolor, a Thomson Service, undated.

Press Release: "Correction—Legal iGaming—LV NV", PR Newswire, Apr. 4, 2004.

Nice, Karim, "How DVDs Work", [online], [retrieved Apr. 8, 2005], Retrieved from the Internet: <http://electronics.howstuffworks.com/dvd.htm/printable>.

McQueen, Patricia A., "New game in town—Electronic Game Card hopes gaming and promotional innovation leads to casino and lottery inroads", Casino Journal, May 2005, pp. 40,42 and 50.

"DVD 8800S", [online], [retrieved May 24, 2005], Retrieved from the Internet: <http://www.convactech.com/product/dvd8800mid.html>.

"Kansas Lottery presents eScratch", [online], [retrieved Jun. 8, 2005], Retrieved from the Internet: <http://www.escratchks.com/escratch/postHome.do>.

"Welcome to the Future of Gaming . . . ", Legal iGaming, [online], [retrieved Jun. 13, 2005], Retrieved from the Internet: <http://www.legaligaming.com/main.htm>.

"Quarter Play: The Instant-Scratch Game Goes Electronic", Iowa Lottery Press Room, [online], [retrieved Jun. 13, 2005], Retrieved from the Internet: <http://www.ialottery.com/PressRoom/N10-01-04.html>.

"Remote Access Gaming", Legal iGaming, [online], [retrieved Jun. 13, 2005], Retrieved from the Internet: <http://www.legaligaming.com/remote.htm>.

Welch, Sara, "Foxwood's new Playway game stirs up controversy", WTNH.com, [online], [retrieved Jul. 20, 2005], Retrieved from the Internet: <http://www.wtnh.com/Global/story.asp?S=3615729>.

"Products", Legal iGaming, [online], [Retrieved Jun. 13, 2005], Retrieved from the Internet: http://www.legaligaming.com/products.htm>.

"Introducing Foxwoods Playaway", [online], [retrieved Jul. 19, 2005], Retrieved from the Internet: <http://www.foxwoods.com/playaway/>.

* cited by examiner

500

| SESSION IDENTIFIER: 01927 505 | | | | | |
|---|---|---|---|---|---|
| WAGER AMOUNT: $.25/GAME PLAY 510 | GAME: BIG TEXAS OIL HUNT 515 | SESSION DURATION: 1,000 GAME PLAYS 520 | | | |
| PRICE: $20.00 525 | FINAL SESSION BALANCE: $63.25 530 | | | | |

| | GAME PLAY NUMBER 535 | WAGER 540 | INDICIA 545 | INDICIA IDENTIFIER 550 | PAYOUT 555 |
|---|---|---|---|---|---|
| R500-1 → | 1 | $0.25 | NONWINNING COMBINATION | O-000001 | 0 |
| R500-2 → | 2 | $0.25 | NONWINNING COMBINATION | O-000001 | 0 |
| R500-3 → | 3 | $0.25 | CHERRY/CHERRY/CHERRY | O-000007 | 20 |
| R500-4 → | 4 | $0.25 | NONWINNING COMBINATION | O-000001 | 0 |
| R500-5 → | 5 | $0.25 | NONWINNING COMBINATION | O-000001 | 0 |
| R500-6 → | 6 | $0.25 | NONWINNING COMBINATION | O-000001 | 0 |
| R500-7 → | 7 | $0.25 | ANY/ANY/CHERRY | O-000003 | 2 |
| R500-8 → | 8 | $0.25 | NONWINNING COMBINATION | O-000001 | 0 |
| R500-9 → | 9 | $0.25 | ORANGE/ORANGE/BAR | O-000009 | 10 |

FIG. 5

600

| | LOCAL PLAY IDENTIFIER 605 | GAME DEVICE IDENTIFIER 610 | GAME PLAY TYPE 615 | WAGER PER GAME PLAY 620 | ACTIVE PAY COMBO(S) 625 | NUMBER OF GAME PLAYS REMAINING 630 | TIME REMAINING 635 |
|---|---|---|---|---|---|---|---|
| R600-1 | L-102001 | GD-000054 | REEL SPIN (5 PAYLINE) | $0.25 | ALL | 15 | N/A |
| R600-2 | - | GD-000054 | REEL SPIN (1 PAYLINE) | $0.25 | BAR-BAR-BAR | 3 | N/A |
| R600-3 | L-102002 | ANY | POKER HAND | $0.25 | ROYAL FLUSH | N/A | 5 MINS. |
| R600-4 | L-102003 | GD-000001; GD-000999 | BONUS ROUND | N/A | GEM-GEM-GEM | 2 | N/A |

FIG. 6

700

| | DISC IDENTIFIER 705 | DISC PAYOUT 710 | DISC PRICE 715 | BONUS GAME ROUNDS OFFERED 717 | DATE SOLD 720 |
|---|---|---|---|---|---|
| R700-1 | D-1003210-87912487 | $15.00 | $20.00 | 2 | 01/06/06 12:22 PM |
| R700-2 | D-1003210-87912487 | $18.00 | $20.00 | 3 | 01/06/06 12:38 PM |
| R700-3 | D-891266-101421011 | $0.00 | $20.00 | 5 | 01/06/06 12:40 PM |
| R700-4 | D-891266-101421011 | $72.50 | $20.00 | 1 | 01/06/06 12:56 PM |
| R700-5 | D-771043-213412879 | $72.50 | $20.00 | TBD | -- |

FIG. 7A 700 (CONT.)

| | ACTIVATION CODE 725 | PLAYER IDENTIFIER 730 | DISC STATUS 735 | BONUS GAME RESULT(S) 740 | BONUS GAME STATUS 745 | TOTAL PAYOUT VALUE 750 | |
|---|---|---|---|---|---|---|---|
| | XY90-ZF42-9962-0651 | N/A | PURCHASED | $10.00 | PLAYED | $25.00 | R700-1 |
| | Z410-9124-BC21-EG3X | P-10421087 | PURCHASED | TBD | PENDING | TBD | R700-2 |
| | BB12-4XQ2-GF33-47WY | P-71032109 | PURCHASED | $22.00 | PENDING | $22.00 | R700-3 |
| | XXF9-417B-GAB3-DY06 | P-71023100 | REDEEMED | $5.00 | FORFEIT | $72.50 | R700-4 |
| | -- | -- | AVAILABLE | TBD | PENDING | TBD | R700-5 |

FIG. 7B

FIG. 11A
1105
CASHOUT TICKET
CASINO XYZ
CASHOUT TICKET
CONTRACT # GC-01927
BALANCE AFTER 1,000 SPINS: $20.75
INSERT THIS SIDE UP
INSERT THIS SIDE UP

METHODS AND APPARATUS FOR DETERMINING HYBRID WAGERING GAME SESSIONS

This application claims the benefit of U.S. Provisional Application Ser. No. 60/685,604, filed May 27, 2005 and entitled METHODS, SYSTEMS AND APPARATUS FOR PROVIDING GAMBLING RESULTS THAT MAY BE VIEWED REMOTELY, and claims the benefit of U.S. Provisional Application Ser. No. 60/666,393, filed Mar. 29, 2005 and entitled METHODS, SYSTEMS AND APPARATUS FOR PROVIDING GAMBLING RESULTS THAT MAY BE VIEWED REMOTELY.

The entirety of each of the above-identified applications is incorporated by reference herein for all purposes.

BRIEF DESCRIPTION OF THE FIGURES

Various embodiments of the present invention are described herein with reference to the accompanying drawings. In the drawings, like reference numerals indicate identical or functionally similar elements. The leftmost digit(s) of a reference numeral typically identifies the figure in which the reference numeral first appears. As will be understood by those skilled in the art, the drawings and accompanying descriptions presented herein indicate some exemplary arrangements for stored representations of information. A number of other arrangements may be employed besides the tables shown. Similarly, the illustrated entries represent exemplary information, but those skilled in the art will understand that the number and content of the entries can be different from those illustrated herein. A brief description of the drawings follows.

FIG. 5 is a table illustrating an example record of an example session database in accordance with some embodiments described herein.

FIG. 6 is a table illustrating an example local game play active sessions database in accordance with some embodiments described herein.

FIGS. 7A and 7B show a table illustrating an example available DVDs database in accordance with some embodiments described herein.

DETAILED DESCRIPTION OF EMBODIMENTS

Introduction to Some Embodiments

Figure 1:
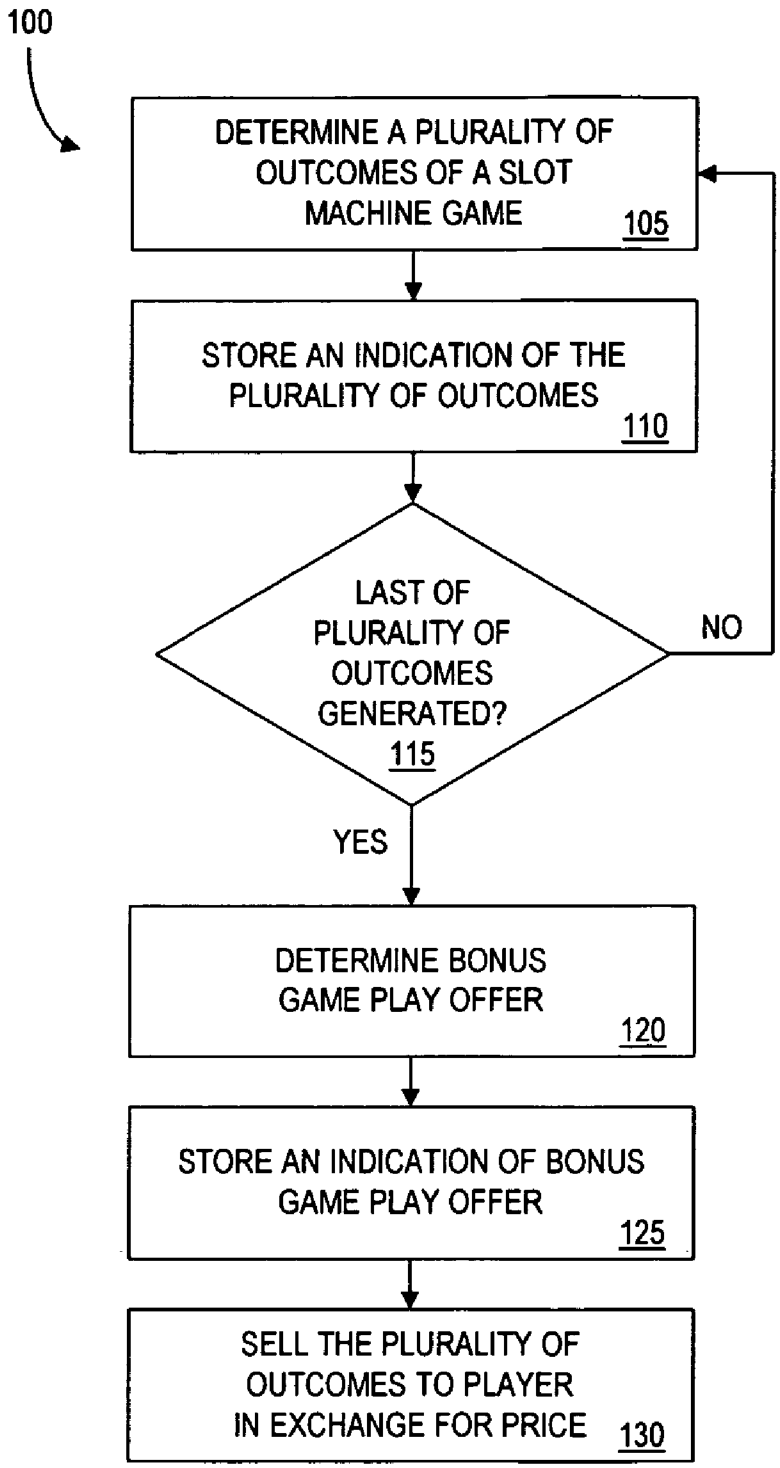
FIG. 1 is a flowchart of an example process according to some embodiments described herein.

In accordance with one or more embodiments, a method provides for determining a plurality of outcomes of a wagering game and storing an indication of the plurality of outcomes. The method further includes, in association with the stored indication of outcomes, providing an offer to execute one or more additional or bonus game plays that must be executed by utilizing a wagering game device located in a legalized gambling jurisdiction. The method further provides for selling, after the last of the plurality of outcomes has been generated, the plurality of outcomes and the conditional offer for additional game play to the player in exchange for a price or other value. The plurality of outcomes and the conditional offer may be provided to the player, for example, by being recorded on a tangible medium (e.g., a DVD), the tangible medium being provided to the player. In another embodiment, the plurality of outcomes and the conditional offer may be provided to the player by being stored on a server device and providing the player access to the server device (e.g., such that the player may access the outcomes and the offer via the Internet). Such embodiments may be characterized as hybrid wagering game session contracts because the player purchases a plurality of predetermined wagering game outcomes that may be viewed remotely, such as in the comfort of his home, and is provided with an offer to determine at least one additional wagering game outcome by executing "local game play" using an electronic game device, for example, in a casino in a legalized gambling jurisdiction. It should be noted that the results of any such local game play may not be predetermined, and thus in some embodiments a player may accept the offer for local game play by utilizing an electronic game device in a casino to play a wagering game of chance or to play a wagering game of skill.

An outcome, as the term is used herein unless indicated otherwise, refers to a result of a game play, which may be indicated by a payout (i.e., a prize or benefit to be provided as a result of the game play) and/or one or more indicia representative of the result. For example, an outcome may comprise the set of indicia (or payout corresponding thereto) that may be displayed along a payline of a reeled slot machine. In another example, an outcome may comprise a roulette number that is a result of a roulette spin. In some embodiments, more than one set of indicia may represent the same result or outcome.

In one embodiment, an outcome may be represented via indicia of a media file. A media file may comprise graphical and/or audio data. The graphical data may comprise a still or animated image of one or more indicia. In some embodiments, more than one media file may correspond to a particular outcome or result. For example, more than one media file may correspond to an outcome that results in zero credits being added to a credit meter balance.

A game, as the term is used herein unless indicated otherwise, comprises a wagering activity conducted in accordance with a particular set of rules via which a prize or benefit may be won in exchange for consideration.

A game play, as the term is used herein unless indicated otherwise, refers to a single instance or round of a game. A game play may result in a single outcome (e.g., set of indicia and corresponding payout, if any).

A type of game, as the term is used herein unless indicated otherwise, refers to a category of games that share one or more characteristics.

In accordance with one or more embodiments, a method provides for causing a plurality of actual outcomes to be generated on a gaming device operable to facilitate a wagering game and determining data indicative of the plurality of actual outcomes. The method further provides for determining, based on the data, a plurality of representations (e.g., images and/or other video and/or audio), each representation representing an outcome to be stored on a tangible medium, each representation thereby comprising a representative outcome. The method further provides for causing the plurality of representative outcomes be stored on a tangible medium and making the tangible medium available for sale.

An actual outcome, as the term is used herein unless indicated otherwise, is an outcome directly determined by a Gaming Device (GD). For example, an actual outcome may comprise the random number determined by the random number generator of a GD, the particular set of indicia that corresponds to the random number based on the probability table used by the GD and/or the payout that corresponds to the random number.

A representative outcome, as the term is used herein unless indicated otherwise, is an indication of an actual outcome, the representation being determined based on the actual outcome and, in some embodiments, by a device other than a GD. For example, an Assembly System (AS) may determine, based on a random number determined by a GD, a media file to represent the actual outcome determined by the GD. The media file may comprise a graphical representation of a set of indicia and this set of indicia may be a representative outcome corresponding to the actual outcome determined by the GD.

It should be understood that, for a particular set of outcomes, the set of actual outcomes may correspond to the same sum of payouts as does the corresponding set of representative outcomes.

In some embodiments, the outcome in a set of actual outcomes that corresponds to a set of representative outcomes may (i) differ in number; (ii) differ in order (i.e., the actual outcomes may have been generated in a first order while the representative outcomes may be presented in a second order); and/or (iii) differ in indicia or form of indicia.

A session, as the term is used herein unless indicated otherwise, is a plurality of game plays conducted for the purpose of determining a plurality of outcomes to be sold to a player. For example, a session may refer to a plurality of game plays executed by a GD, based on which plurality of game plays (e.g., representative outcomes and/or actual outcomes) a video representation of outcomes is created and recorded onto a DVD or other tangible medium, or based on which plurality of game plays the video presentation is otherwise made available to a player. A session may be completed over a plurality of distinct time periods (e.g., some of the outcomes comprising the session may be generated at a first date and/or time while more of the outcomes comprising the session may be generated at a second date and/or time). Further, a session may be executed on a plurality of GDs (e.g., simultaneously or in parallel fashion and/or at various times). A session may be deemed to be completed once an end event defining the end of the session has occurred (e.g., a predefined number of outcomes has been generated, outcomes have been generated for a predefined period of time, a credit meter balance as reached a predefined value, etc.). In some embodiments, a session may be deemed to be completed once one of a plurality of possible end events occurs, whichever end event occurs first.

It should be noted that although the term DVD is used herein to refer to a tangible medium on which an indication of a plurality of outcomes may be recorded and which tangible medium may be sold to a player, this term is used for purposes of brevity only and should not be taken in a limiting fashion. All references to a DVD likewise include any other form of tangible medium that may be appropriate and practicable for recording an indication of outcomes (e.g., a video presentation) for subsequent remote viewing by a player. For example, paper (e.g., a flip-through book), a CD-ROM, a VHS tape, flash memory, a memory stick, a digital video tape, an MP3 file, or any other tangible medium for recording information may be used. Further, practicable variations of such media are contemplated (e.g., DVD-R, CD-R, CD-RW, etc.). It should be understood that the use of the term DVD is a reference to any and all such tangible mediums.

In accordance with one or more embodiments, a method provides for receiving, from a player, a request for a payout corresponding to a plurality of outcomes previously sold to the player, wherein the payout is a function of a sum of payouts of the plurality of outcomes, and wherein the plurality of outcomes had been sold to the player as a package without providing to the player an indication of the payout. A payout corresponding to a DVD that is a function of a sum of payouts of the plurality of outcomes or an aggregate of the payouts may be, in some embodiments, the "redemption value" of the DVD or other medium via which session information is remotely viewable. The method further provides for offering at least one additional game play, such as a bonus game play, wherein the game play must be executed by using an electronic game device located in a legalized gambling jurisdiction. For example, the electronic game device may be a video slot machine located on the gaming floor of a casino that is licensed to operate in a legalized gambling state. The DVD redemption value thus may be a "pending" final credit balance which may increase or decrease depending on the outcome of the additional game play. In some embodiments, the method may further provide for verifying a legitimate purchase of the plurality of outcomes by the player, verifying the payout and providing the payout to the player. In some embodiments, the method may further provide for storing an indication of the payout having been provided to the player and/or verifying that the payout has not previously been provided to the player.

The term "redemption value" is used herein to refer to a monetary amount or prize that a player may redeem a purchased DVD for. This term refers, unless indicated otherwise, to a value that is a function of a sum of payouts (which may be a single payout in some instances), the payouts being the payouts corresponding to the outcomes or a set of the outcomes represented on the DVD. The value may be, for example, a function of (i) the starting credit meter balance at the beginning of the session executed to determine the outcomes represented on the DVD, (ii) a sum of wagers posted for the game plays comprising the session; (iii) a sum of wagers posted for a portion of the game plays comprising the session; and (iv) the payouts won as a result of game plays comprising the session. For example, assuming a session is executed with a starting balance of $5.00, twenty game plays are executed during the session at a wager of $0.25 per game play, and three of these game plays result in a payout greater than zero (the first payout being $4.00, the second payout being $12.00 and the third payout being $3.00), the ending credit meter balance at the end of the session is $19.00. Thus, in some embodiments the redemption value of the DVD may be the ending credit meter balance, which is $19.00 in the above example. In other words, a player who purchases this DVD for $20.00 may redeem the DVD for $19.00. In some embodiments, the redemption value of the DVD may correspond to an intermediate credit meter balance, for example, a credit meter balance that is shown after the fifteenth of fifty game plays or outcomes comprising a session.

In accordance with some embodiments, provided are apparatus, systems and methods for enabling casino patrons to view gambling results remotely. In one or more embodiments, a player may purchase a session of game plays from a casino. Using a gaming device located within the casino, the session may then be executed on the player's behalf according to parameters of the session (e.g., number of game plays, wager per game play, payout combinations active, game, gaming device or type of gaming device, etc.). For example, a slot machine may be configured to rapidly generate a plurality of outcomes on the player's behalf. In some embodiments, files representing the generated outcomes may then be stored on media (e.g., a CD-ROM or DVD). The player may then remotely view the previously generated outcomes at a later time (e.g., using one or more devices such as home computers, televisions, DVD players, PDAs, cellular phones, and so on), so as to experience wins and losses associated with the session.

In further embodiments, a Web site maintained by a casino property (or third party) may function to (i) receive requests to view session results (e.g., from remote players), (ii) retrieve session results (e.g., from a session database), and (iii) output a video presentation based on the session results. Accordingly, in one or more embodiments, the creation of a video presentation may ultimately be performed as a Web site interprets stored session result data and outputs animations accordingly. Such embodiments may be advantageous in that session result data may be output in a variety of manners (e.g., an outcome of "Bar-Bar-Orange" may just as easily be shown as any other outcome with a comparable payout amount, such that a variety of different game symbol appearances may be substituted for the "Bar" and "Orange" symbols), so as to accommodate players who request different visual themes associated with game plays executed as part of a session. Such an embodiment may also enable, for example, a player purchasing a session at a casino, logging on to a home computer, and choosing several different slot machine "skins" for which to view session results. The Web site may also function to provide an offer for bonus game play, wherein the player is provided with an opportunity to execute additional wagering game play by using a GD on casino premises to determine one or more wagering game outcomes.

Example Process

Referring now to FIG. 1, illustrated therein is a flowchart of an example process 100 that may be performed in accordance with one or more embodiments. It should be noted that, as is true for all processes described herein, process 100 may, in some embodiments, be performed by a variety of devices and/or persons. For example, one or more of the steps described may be performed by a GD (described in detail with reference to FIG. 4), one or more of the steps may be performed by a Casino Server (CS), one or more of the steps may be performed by a AS, one or more steps may be performed by another device (e.g., CPD, POS, or another device) and/or one or more of the steps may be performed by a person (e.g., a casino attendant or player). Further, the steps may be performed in an order different from that described. Further still, additional or different steps may be included and some steps may be omitted or modified, as appropriate and/or practicable.

In step 105, a plurality of outcomes of a slot machine game is determined. Determining the plurality of outcomes may comprise, for example, determining a plurality of actual outcomes. For example, if step 105 is being performed by a GD, determining a plurality of outcomes may comprise generating a plurality of random numbers, each random number comprising an outcome. If step 105 is being performed by another device (e.g., CS 305 or AS 310, both described below with respect to FIG. 3), step 105 may comprise determining an indication of a plurality of actual outcomes generated by a GD. For example, such an indication may be received via an electronic transmission from a device (e.g., a GD may transmit such an indication to a CS and/or AS via a network connection). In another example, such an indication may be received via a printed document (e.g., a session results ticket, described below (particularly with reference to FIG. 11C)) may include a bar code or other encoded information readable by a CS and/or AS, for determining the indication.

An indication of the plurality of outcomes may comprise, for example, one or more of the following information:

(i) a sum of payouts won as a result of the plurality of outcomes;

(ii) an ending credit meter balance at the end of a session comprising the plurality of outcomes;

(iii) a set of indicia representative of one of the plurality of outcomes (e.g., a result of a roulette spin, a plurality of symbols representing a hand of video poker, a plurality of symbols that may be displayed along a payline of a reeled slot machine, etc.);

(iv) a game for which the plurality of outcomes was determined;

(v) a sum of wagers posted for the plurality of outcomes;

(vi) a price of the session;

(vii) a beginning credit meter balance at the beginning of a session comprising the plurality of outcomes;

(viii) a player associated with the plurality of outcomes (e.g., in embodiments in which a player requests a session prior to it being executed);

(ix) a casino attendant associated with the plurality of outcomes (e.g., the casino attendant who authorized, supervised and/or executed the session comprising the plurality of outcomes);

(x) a unique identifier of a session comprising the plurality of outcomes (e.g., such that information regarding the plurality of outcomes may be determined by accessing an appropriate database based on the unique identifier);

(xi) a unique identifier corresponding to an outcome of the plurality of outcomes;

(xii) an identifier of a media file corresponding to an outcome of the plurality of outcomes;

(xiii) a time and/or date at which an outcome of the plurality of outcomes was generated;

(xiv) a gaming device on which the plurality of outcomes was generated;

(xv) a type of gaming device on which the plurality of outcomes was generated;

(xvi) an offer to determine a wagering game result associated with at least one local game play, such as an offer to play one or more bonus rounds on a particular type of electronic game device at the casino:

(xvii) an activation ID used to determine sale of a session; and (xviii) a redemption ID used to determine redemption of a session.

In some embodiments, determining a plurality of outcomes may comprise determining a plurality of representative outcomes. For example, if step 105 is being performed by an AS, determining a plurality of outcomes may comprise determining an indication of a plurality of outcomes (e.g., the payouts corresponding to each outcome of the plurality of outcomes, a sum of payouts corresponding to the plurality of outcomes, or any other of the information listed above) and selecting representative outcomes to represent a plurality of actual outcomes generated by a GD.

It should be understood that in some embodiments a plurality of outcomes are generated (e.g., a session of game plays is executed to determine a plurality of outcomes to be recorded on a DVD) prior to any player expressing any interest in purchasing the plurality of outcomes. For example, an entity (e.g., casino, GD manufacturer and/or other entity) may create (or cause to be created) DVDs, each DVD having recorded therein a video representation of a plurality of outcomes, and place the created DVDs on a casino floor for purchase by players.

In some embodiments, a player may purchase, request or otherwise agree to a session (e.g., the player may request or order a DVD of outcomes to be created on behalf of the player). In such embodiments, methods for providing gaming contracts and/or flat rate gaming sessions may be applied to embodiments described herein. Many such methods are described in commonly-owned, co-pending U.S. Provisional Application No. 60/627,670, filed Nov. 12, 2004, entitled "GAMING DEVICE OFFERING A FLAT RATE PLAY SESSION AND METHODS THEREOF"; U.S. Provisional Application No. 60/400,211, filed Aug. 10, 2004, entitled "SYSTEMS, METHODS AND APPARATUS FOR ADMINISTERING GAMING CONTRACTS"; U.S. application Ser. No. 10/636,520, filed Aug. 7, 2003, entitled "SYSTEM AND METHOD FOR COMMUNICATING GAME SESSION INFORMATION"; U.S. application Ser. No. 10/435,986, filed Aug. 7, 2003, entitled "SYSTEM AND METHOD FOR REMOTE AUTOMATED PLAY OF GAMING DEVICES"; U.S. patent application Ser. No. 10/001,089, filed Nov. 2, 2001, entitled "GAME MACHINE FOR A FLAT RATE PLAY SESSION AND METHOD OF OPERATING SAME"; U.S. Pat. No. 6,077,163, filed Jun. 23, 1997, entitled "GAMING DEVICE FOR A FLAT RATE PLAY SESSION AND METHOD OF OPERATING SAME"; and U.S. Provisional Application No. 60/637,338, filed Dec. 17, 2004, entitled "GAMING DEVICE OFFERING A FLAT RATE PLAY SESSION AND METHODS THEREOF"; the entirety of each are incorporated herein by reference for all purposes.

Hybrid Gaming

In some embodiments, a player may purchase a hybrid gaming session that includes two components. The first component is a tangible medium that includes a video presentation of predetermined wagering game outcomes that is viewable at a remote device, wherein the remote device may be separate from the device that generated the session (as described above). The second component involves providing an offer to determine a result associated with at least one local game play (for example, a bonus game offer), and requiring the use of an electronic gaming device (GD) located within a legal gambling jurisdiction such as a casino to obtain a result of the local game play. In some embodiments, the term "local game play" connotes game play for which an outcome or outcomes has not yet been determined or generated with regard to the time the predetermined wagering game outcomes of the video presentation have been determined. For such embodiments, local game play outcomes are not predetermined, and local game play outcomes occur after the wagering game outcomes of the video presentation have been determined. For example, the local game play outcomes may be determined "live" as the player utilizes a local GD, and such an the offer to determine local wagering game play results may be executed either before or after the player views the video presentation.

For example, a player purchases a DVD containing a wagering game session and inserts it into a DVD player. The session of wagering game outcomes is played and viewed by the player on his television, and he is also provided with at least one offer to execute one or more additional local game plays (in accordance with the hybrid gaming session) by using a GD at the casino. In this example, the local game plays have not yet been determined. However, in some embodiments, the local game plays may have been predetermined at least to a certain extent (and possibly offered or advertised as a "bonus round") to ensure that the player will win at least a nominal prize or award as an enticement for the player to visit the casino. For example, the offer for local game play may make it clear that the player will win at least 5 credits if he travels to the casino and uses a specified local GD, and may also hit a jackpot for as much as 10,000 credits or more (and such a range or such limits can be set as desired by the casino).

For example, as described herein, an automated game session may be executed according to certain parameters, and a game disc may then be created based on the session. In the session, it may have been determined that a player purchasing that DVD will ultimately achieve a final session balance of 61 credits, and will be provided with an offer or offers to execute additional game plays at an electronic gaming device at the casino. This DVD thus will have a final session balance that may be thought of as a "pending" final session balance, because the player may yet be entitled to one or more bonus game plays (e.g., such as bonus rounds) which may alter a true final contract balance or final session balance that is payable to the player (e.g., as a result of the pending local game plays, the final session balance payable to a player may increase, decrease (in some embodiments), or remain the same).

Of course, it should be noted that such "pending" local game plays may be executed at any time, such as before, after or during the "remote" viewing of indications of game results (e.g., a player may execute one or more local game plays by using a GD before returning home to watch a game disc; a player may view a plurality of game result indications on a mobile computing device or cellular phone while sitting at a slot machine and executing local game play; and so on). However, some restrictions may apply, for example, the offer for any additional local game play may expire 30 days from purchase of the DVD.

A player may execute local game play in a variety of manners. In some embodiments, a player may utilize a GD available on a casino floor to execute one or more rounds of such local game play. For example, a player may approach a gaming device of a casino floor and execute five rounds of local game play of a flat rate contract/session. In such cases, players interfacing with GDs on a casino floor to execute the local game play portion of the hybrid gaming sessions contract may be presented with several choices or options (e.g., upon an initial hand of cards being dealt to a player in a video poker game). For example, several choices may be output to a player (e.g., a touch-screen depicts three boxes from which a player may choose one). A bonus payout amount may then be based on the players choice.

For example, in some embodiments, a player may use a GD to purchase a hybrid gaming session, and therefore purchase a number of pre-paid rounds of local game play that could be executed by using the GD. In other embodiments, a player may purchase such a hybrid gaming session in an alternate manner (e.g., by using a kiosk, visiting a slot club booth, purchasing the hybrid gaming sessions contract online, and so on). Accordingly, in some embodiments, a player may be provided with means for executing local game play that may include one or more wagering game rounds or spins as part of such a pre-paid hybrid gaming sessions contract without needing to provide further funds. For example, a player may provide a code or other identifier, such that a GD may determine data regarding one or more of such rounds of local game play to be provided to the player based on the identifier.

In some embodiments, for example, a player may request a hybrid gaming session by (i) actuating an input device of a gaming device, kiosk or other device described herein (e.g., the player actuates an icon of a touch-sensitive display screen advertising "Purchase a DVD" or other similar text), (ii) indicating such a desire verbally to a casino representative (e.g., in person or over the phone), and/or (iii) filling out and submitting forms or other paperwork, and so on.

Thus, in some embodiments, a hybrid gaming session includes both a remote session, wherein a player needn't be present to execute one or more game plays associated with the session (e.g., a player purchases 1,000 spins of a slot machine for a flat price of $15), and an offer to execute one or more additional local game plays by using a GD located in a legalized gambling jurisdiction. For example, after receiving a request to execute such a remote session, a casino attendant may execute (or cause to be executed) the session on the players behalf using a GD on casino premises. The player may then remotely view data associated with the session (e.g., representative outcomes determined based on the results of the session) at a later time without necessarily gambling outside of casino premises (e.g., the player simply views results which have already been generated in a legal jurisdiction). Those familiar with the current legal framework concerning gambling in the Unites States will appreciate the advantages of such a system (e.g., for one, it allows players to place legal slot machine bets and watch the results from home). In order to accept the offer for additional game plays, however, the player would either have to travel to the casino and use a GD. But in some embodiments, the player may be permitted to authorize the casino attendant to execute any local game plays that may have been offered, and may be permitted to direct such representative to play using a particular strategy if such local game play requires decisions and/or selections to be made during such game play.

The number of additional or bonus rounds of local game play offered to a player who purchased a DVD (that the player must execute "locally", such as by use of a GD within a casino) may be indicated in a variety of manners. For example, information regarding such local game play (e.g., the number of rounds included in such game play, wager amounts and/or active pay combinations associated with such game play, eligible gaming devices, and so on) may be indicated to a player when purchasing a hybrid gaming session (i.e. at the time a player purchases a DVD containing a video presentation of predetermined wagering outcomes, or by purchasing a code that may be used to access a Web site to view such predetermined outcomes). In some embodiments, however, the number of local game plays and other information may not be provided to the player when purchasing the hybrid gaming session, but may instead be generated at a later time, for example, when the player inputs data to a GD to accept the offer for local game play.

For example, when purchasing a game disc or when presenting hybrid gaming session identifying indicia, players may be shown information regarding such local game play (e.g., such data may appear on a display screen, brochure or other document, on the game disc or on the packaging thereof, and so on). Thus, when purchasing a hybrid gaming session (e.g., purchasing a game disc such as a DVD that includes a bonus game offer), a player may learn of a manner in which one or more local game plays may be executed and may be provided with other pertinent information.

In some embodiments, a player may provide a code or identifier associated with the local game play, and a manner may be determined in which to provide such game play to a player. For example, it may be determined that a player may be entitled to two bonus rounds of any gaming device if his identifier is within a particular range of identifiers. Should a player provide such a code or identifier on an eligible gaming device, such bonus rounds may then be provided (e.g., automatically, upon the players request, and so on). Thus, in some embodiments, a GD in a casino, for example, may be configured to (i) receive a code or identifier associated with local play, (ii) determine a manner in which one or more game play rounds are to be provided based on the code or identifier, (iii) determine whether or not it is possible to provide one or more rounds of such game play (e.g., determine whether the gaming device is an eligible gaming device), and (iv) provide the game play (e.g., enable the player to play two bonus rounds).

Figure 12:
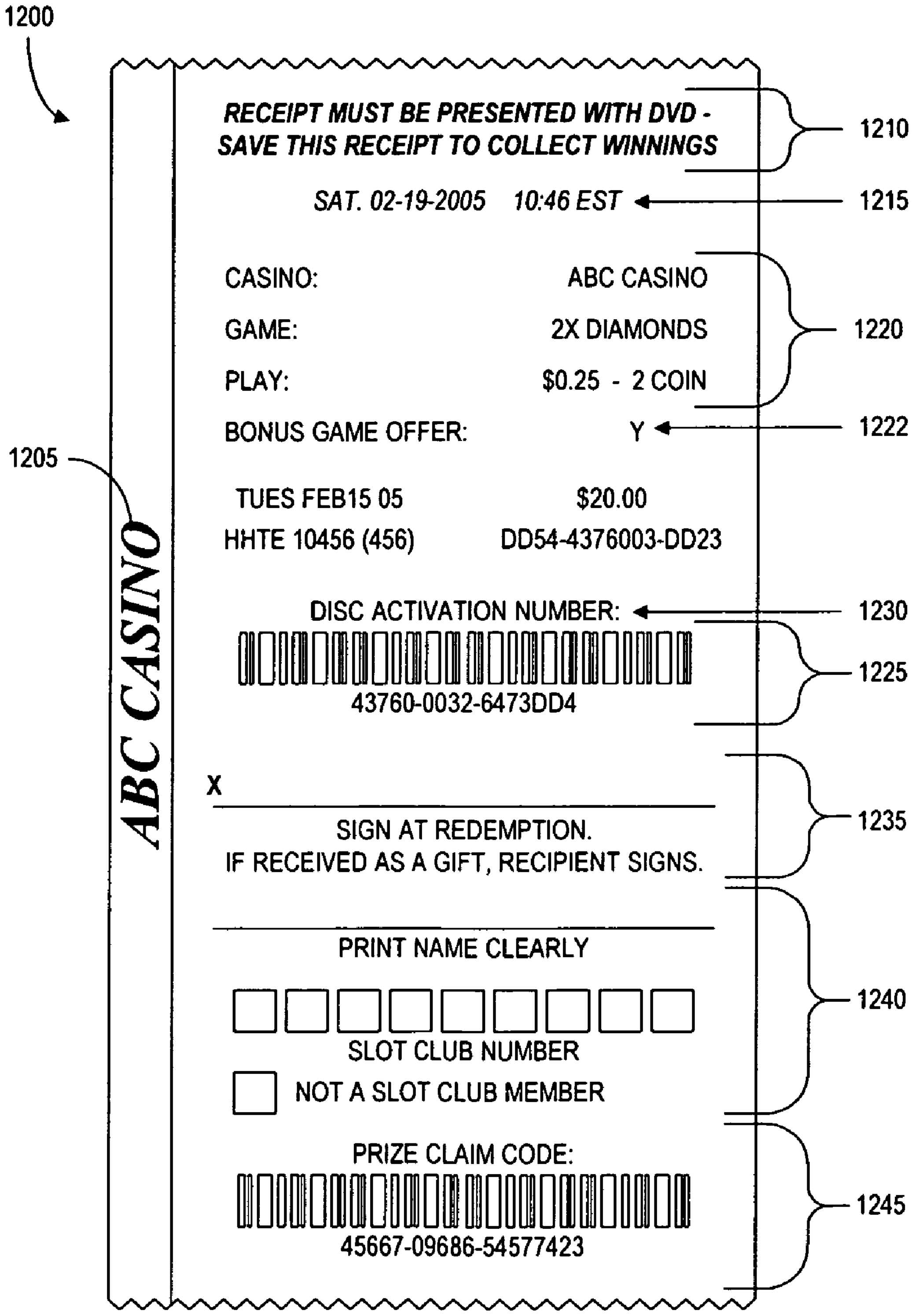
FIG. 12 is an example of a receipt that may be output upon a purchase of a DVD, in accordance with some embodiments described herein.

Such a code or identifier associated with local game play may be received in a variety of manners. For example, a player may be provided with a personal identification number (PIN) or other code that the player may enter using a keypad or touch-screen of a gaming device. In another example, a player tracking card, smart card, or other type of card may encode such a code or identifier. In yet another example, a barcode of a cashless gaming ticket may encode such an identifier. In yet another example, a purchase receipt or wagering game receipt provided when a player buys a wagering game DVD (e.g., as depicted by FIG. 12) may appear similar to a cashless gaming ticket as known in the art, and thus may be readable by a TITO device (e.g., or a gaming device and/or kiosk), ticket scanner, and so on. In this manner, a player may purchase a game disc (or other manner of viewing indications of game results of a remote gaming contract), and receive a ticket (e.g., an additional ticket, a purchase receipt resembling a cashless gaming ticket, and so on) that the player may insert into a gaming device so as to enable local game play.

Hybrid gaming sessions, which may be thought of as hybrid remote and local gaming contracts, and the methods whereby players purchase game discs that indicate one or more bonus games that a player may be entitled to play on a local GD in a casino, for example, may have various advantages. For example, a player may finish a game disc or DVD with a negative balance (e.g., the final indication of game result outcomes on the DVD is a balance of less than zero credits), but the player may turn such a negative balance into a positive balance by executing the local game play offered with the DVD through play of the bonus game (e.g., such offers to play bonus games are typically associated with a high expected value per game play). Thus, players may experience the positive psychological advantage of ending such a gambling experience on an "upswing." Further, methods of providing bonus games during which players may exercise choice (e.g., as opposed to passively viewing game result indications from a DVD for which players may not exercise choice) may serve to enrich a gaming experience for players who view having such choice as an important component of a gaming experience.

Pricing of Hybrid Gaming Sessions

It may be desirable for a casino or other entity desiring to produce and to sell hybrid gaming sessions to consider the expected value players may receive from such hybrid remote and local game play when determining the number of DVDs to produce, and when determining how to price such DVDs when offering them for sale. For example, an expected value associated with local game play offered to a player may be considered when determining a flat price associated with a hybrid gaming session that applies to one or more DVDs. In some embodiments, the number of rounds of local game play a player may be offered may be predetermined (e.g., a reference run used to generate the wagering game outcomes for storage on the DVD also indicates a number of bonus-game triggering game result indications which a player may receive). Accordingly, an expected value associated with receiving offers for such additional wagering game play may be the same if such bonus game play rounds were generated in advance so that indications thereof are provided for remote viewing, or if generated at a casino by a player using a GD, so long as the probabilities, pay combinations and other game characteristics remain constant (e.g., irrespective of whether a player uses a local GD to play a bonus game or views results of such a bonus game that was previously generated on the player's behalf, the bonus game still has the same expected value, and therefore the same approximate influence on the cost of providing the DVDs representing such hybrid gaming sessions). In some embodiments, the expected value may be equal to the probability of a bonus game triggering event multiplied by the average payout provided for such bonus game play outcomes.

Thus, a casino may consider the expected value of providing such remote and local game plays to players when deciding how to price such DVDs containing both remote and local game play. For example, a casino desires to produce 20,000 DVDs to sell for $25.00 each, wherein over the entire production run of DVDs there is an average payout for the video presentation of wagering game outcomes of $15.00, and each DVD includes at least one offer for local game play (such as a bonus game offer) that averages a payout of $7.00 to the player. Given these numbers, the casino can calculate the winning outcome probabilities of both the video presentation outcomes and the local game play outcomes to ensure that such payouts will occur and to ensure that the casino will make a profit. In this example, it may be determined that each DVD should include 300 spins of a double-diamond slot game of twenty-five cents per spin, three payout lines per spin, and includes three bonus-game triggering events. Of course, other variables may be considered and other types of wagering games could be used both for providing the video presentation and for providing any local game plays. In addition, a casino or other third party provider may utilize other price points and/or considerations to arrive at a purchase price for the hybrid gaming session DVDs. For example, a casino may decide that such DVDs may be loss leaders, and thus price them below the actual cost to provide them to players. One possible reason to proceed in this manner is the casino desire to entice players to actually visit the casino gaming floor (which they will do in order to accept the offer for additional local game play that they are entitled to), as the casino expects such players will gamble more (continue to gamble) when they are on casino premises.

However, in other embodiments, a number of rounds of local game play that a player may receive may not be predetermined at the time a hybrid gaming sessions contract is sold. In some embodiments, for example, after purchasing a DVD, a player may be instructed to utilize a local GD to receive a random number of additional or bonus game plays which can also be executed by that local GD. For example, a player purchasing a hybrid gaming session by paying for a DVD of wagering game outcomes may receive an offer for a "mystery" number of bonus rounds, to be determined randomly by a GD when the player goes to the casino and uses the GD. For example, a player may approach a GD, provide an identifier or code indicating that the player is eligible or due to receive a random number of bonus rounds or other local game play at that GD, and the GD may be configured to randomly determine the number of game plays or rounds (such as reel spins) or bonus rounds (which may be guaranteed winning combination spins) to which the player may be entitled (e.g., the GD generates a random number within a certain range of random numbers, and compares the generated random number to a table indicating an associated number of local game plays or bonus rounds). In some embodiments, there may be a cap on the maximum number of additional wagering game rounds that may be provided to players, and the casino may also exercise control over other parameters that factor into determining the payouts and the price to charge for the DVD. In some embodiments, the same GD that determines the number of bonus game play rounds to provide may also be configured to provide such local game play (e.g., enable the player to play such bonus rounds). In other embodiments, a GD that is separate from the GD that determines the number of bonus game play rounds, is used to provide the additional game play.

Accordingly, the cost of providing such a random number of bonus rounds or other game plays for DVDs that are produced according to such hybrid gaming sessions may be determined by (i) simulating the average number of bonus rounds or local game play such players may receive, and (ii) simulating the average amount paid to players as a result of such local game play or bonus rounds. As described above, the casino or other entity desiring to offer hybrid gaming sessions may start by defining price points, such as how much they wish to charge players to purchase each DVD of a series of DVDs corresponding to a particular type wagering game (for example, the price a casino wishes to charge for each DVD of a 50,000 DVD manufacturing run). The casino may also factor in what the expected value of such a DVD is to the player both for the video presentation and for any offer or offers for local game play, what the average payout the casino is willing to make for the video presentation outcomes, and what average payout the casino is willing to make for winning outcomes generated by a player during local game play. Such calculations can then be used to design a hybrid gaming session for selling a DVD that will include both video presentations of wagering game outcomes and one or more offers for local game play. Further methods of such contract pricing are described at length in Applicant's commonly-owned, co-pending U.S. Provisional Application No. 60/637,338, filed Dec. 17, 2004, entitled "GAMING DEVICE OFFERING A FLAT RATE PLAY SESSION AND METHODS THEREOF," the entirety of which is incorporated herein by reference for all purposes.

Session Characteristics

A session may be defined by one or more parameters, including but not limited to (i) a price (e.g., how much the player pays in exchange for gaining access to the plurality of outcomes determined as a result of a session (e.g., how much a player pays for a DVD on which a video representation of the outcomes is recorded));

(ii) a session duration, which may be defined, for example, in time, number of game plays (e.g., the session ends after two hours or the session ends after 1,000 game plays) or another ending event (e.g., the session ends when the credit meter balance reaches zero or another predetermined value);

(iii) an average, minimum, maximum or specified wager amount per game play (e.g., a session parameter specifies that $0.25 will be wagered per game play);

(iv) one or more gaming devices on which game play may occur (e.g., any video slot machine, any video poker machine except "Crazy Triple Joker Poker," any "Big Texas Oil" machine, the "Big Texas Oil" machine in Room Z numbered GD-BTO-0012, and so on);

(v) active pay combinations and/or a payout schedule to be used during the execution of game plays comprising the session (e.g., a session parameter specifies that an outcome of "BAR-BAR-BAR" pays 1,500 coins, and so on);

(vi) a date and/or a time (e.g., of day) during which the session may be executed (e.g., between 6 and 10 a.m. on Jan. 1, 2006);

(vii) a refund rate or amount payable to a player (e.g., the player will receive a refund of 50% of net losses incurred due to the session);

(viii) a manner in which game play or the game results thereof will be made available to players (e.g., the casino will provide a DVD comprising video renderings of outcomes generated previously by a gaming device on the casino floor; the casino will enable the player to play one or more gaming devices on the casino floor in person, such that the player may be present when game play occurs; the casino will provide a code which a player may later use online to access video renderings of outcomes previously generated by a gaming device on the casino floor; etc.);

(ix) an offer or offers to obtain one or more additional wagering game rounds (and outcomes) by using a GD which is located in a legalized gambling jurisdiction (for example, an offer to play three "bonus rounds" on a "Triple-Genie" video slot machine on the casino floor); and (x) other stipulations related to game play (e.g., a number of paylines of a slot machine game that should be bet on, a strategy for holding/discarding cards in a poker game, wager per payline, etc.).

It should be noted that, in some embodiments, when requesting that a session be executed, a player may provide various contact information (e.g., postal address, phone number, e-mail address, and so on), such that players may be provided with the results of the session via the contact information (e.g., a code my be e-mailed to the e-mail address, the code for accessing the results online or a DVD may be mailed to the postal address, etc.).

In embodiments in which a session is executed prior to any player expressing an interest in the session (e.g., embodiments in which DVDs of sessions are massively produced and made available for purchase), an entity such as a casino, GD manufacturer and/or other entity may define the parameters and values thereof defining a session. For example, such an entity may program a GD to execute 500 sessions being defined by a set of particular parameters (and values thereof). In addition, such an entity may program a GD to apply an offer or offers to play one or more additional game plays on a local GD to all such DVDs, or to a subset of such DVDs. Such offers may be to execute such local game play for free, or may include terms such as requiring payment of a nominal additional cost to play. In addition, certain parameters concerning the offers, such as the number and the duration of the offered local game play may apply, and the GD may be programmed to add such parameters on a random or pseudo-random basis. Moreover, the additional game plays may include one or more bonus rounds for execution on a GD, wherein a bonus round conventionally requires no monetary outlay and is associated with a guaranteed prize or award (which may be monetary, or in the form of food or merchandise coupons or vouchers, and/or casino comps and the like).

In some embodiments, step 105 (or another or additional step) may comprise storing an indication of parameters defining a session in association with the session (e.g., in association with a unique session identifier in a record of an appropriate database). In one or more embodiments, a unique session identifier (e.g., numeric or alphanumeric identification code) may be associated with each session that is executed or that is scheduled for execution. In some embodiments, such information may be stored electronically. For example, various parameters and values thereof may be stored in a record of a database, each record defining a session executed, available for execution and/or scheduled to be executed. It should be noted that such a database may be stored in a variety of locations, including but not limited to within a GD and/or CS. Alternately or additionally, a physical, non-electronic record of such session parameters may be kept. For example, if a player has filled out a paper form indicating various session parameters, the form may be filed away or saved such that it may later be used when executing the session. In another example, both a physical and an electronic record may be kept (e.g., a casino attendant may enter desired session parameters and values thereof using a computing device such that they are recorded in a database, then use a software application of the computing device to print a physical piece of paper indicating the desired parameters and values thereof).

In summary, irrespective of whether a session is prompted by a request from a player or is part of a mass production process, step 105 comprises determining a plurality of outcomes comprising the session. The step may comprise one or more subroutines, such as a subroutine for (i) determining one or more parameters (and values thereof) defining a session comprising the plurality of outcomes; (ii) generating the plurality of outcomes; (iii) determining an indication of the plurality of outcomes (which may comprise determining an indication of a plurality of actual outcomes and/or determining an indication of a plurality of representative outcomes); (iv) decoding or interpreting the indication to determine a plurality of representative outcomes; (v) selecting a plurality of wagering game media files, wherein each such media file corresponds to an outcome of the plurality of outcomes; (vi) determining an indication of an offer to execute one or more rounds or spins of local game play; and/or (vii) selecting one or more local game play offer media files, wherein each such media file may correspond to an offer to execute at least one additional round of local game play on a GD located in a legalized gambling jurisdiction.

It should be noted that when reference is made to an "outcome" herein, such reference may refer to an actual outcome and/or a representative outcome. In step 110, an indication of the plurality of outcomes is stored. Storing an indication of the outcomes may comprise, for example, one or more of (i) storing an indication of the outcomes in a memory (e.g., a mass storage device) of a device such as a GD, CS or AS; (ii) recording (or causing to be recorded) an indication of the plurality of outcomes on a DVD; and (iii) printing (or causing to be printed) an indication of the plurality of outcomes on a document (e.g., a session results ticket). It should be understood that an indication of a plurality of outcomes may comprise any and all of the information described with respect to step 105.

For example, storing an indication of outcomes may comprise a GD transmitting an indication of the plurality of outcomes to a CS and the CS in turn transmitting the indication (or another indication based on the indication received from the GD) to an AS. Step 110 may further comprise the AS creating a video representation of the plurality of outcomes (e.g., by selecting a plurality of media files, each media file corresponding to one of the plurality of outcomes) and recording the media files onto a DVD.

In one or more embodiments, step 110 may comprise storing a result of a session (e.g., an indication of outcomes determined for the session) in an electronic manner. For example, as described, data associated with a session may be stored electronically in a session database (such as the session database 500 illustrated in FIG. 5). In some embodiments, session data may be stored on a smart card (e.g., a smart card inserted into a reader device in communication with a GD) or another portable storage medium.

It should be appreciated that session data may be stored electronically in a variety of formats. For example, as depicted by FIG. 5, various data may be stored as records of a database entry associated with a session identifier. For example, in one embodiment, a database may store text indicating any or all of a wager amount, outcome, outcome identifier and payout amount associated with a particular game play number (e.g., the first game play of a session is game play "1"). In some embodiments, an indication of a plurality of outcomes or other data associated with a session may be stored electronically in an encoded fashion. For example, a bit function representing an outcome may be stored in a database (e.g., "BAR-LEMON-CHERRY" is stored as 0129-2938-3847, each four-digit sequence representing a particular symbol).

Alternately or additionally, storing an indication of the plurality of outcomes may comprise outputting the indication in some physical, non-electronic fashion. For example, in some embodiments, a GD may actuate a printer device to print a bar code encoding the indication of the plurality of outcomes (e.g., an indication of a session result). For example, a GD may print upon a conventionally sized TITO ticket a high-density barcode encoding an indication of the plurality of outcomes associated with an executed session. For example, text, numerals or other symbols stored within a session database (e.g., a series of outcome identifiers) may be encoded such that they are represented graphically by a barcode such as a high-density barcode.

In step 115, it is determined whether the last of the plurality of outcomes of a session have been generated. In some embodiments, a session is not considered to be completed (and thus the results of the session not ready for sale or other provision to a player) until the last of the outcomes comprising the session have been generated. Accordingly, it may be determined whether the last of the outcomes have been generated. For example, a parameter of a session defining the duration of the session may be determined (e.g., a number of outcomes) and compared to the data comprising the indication of the plurality of outcomes. If the data indicates that the number of outcomes defined by the parameter is the same as the number of outcomes indicated by the indication, it may be determined that the last of the plurality of outcomes has been generated. In another example (e.g., one in which step 115 is being performed by a GD), determining whether the last of the plurality of outcomes have been generated may comprise determining whether the session has been completed by determining whether the end event defined by a parameter of the session has occurred (e.g., determining an elapsed time since a beginning of the session).

In some embodiments an indication of a plurality of outcomes may not be received by a particular device performing step 115 unless and until the last of a plurality of outcomes has been generated. In such embodiments, step 115 may be superfluous. Alternatively, an affirmative determination to step 115 may be determined if it is determined that the indication of the outcomes has been received.

In one embodiment, step 115 may further comprise determining whether the last of representative outcomes corresponding to actual outcomes of a session have been determined. For example, if step 115 is being performed by a device creating a video representation of the outcomes or selecting media files for the plurality of outcomes, each media file comprising a representative outcome, step 115 may comprise determining whether the last of the representative outcomes has been determined (e.g., whether a representative outcome for each of a plurality of actual outcomes comprising a session has been determined).

If it is determined that the last of the plurality of outcomes has not been generated (e.g., the session comprising the plurality of outcomes is not yet complete), the process returns to step 105, in which the remainder of the plurality of outcomes (or more of the plurality of outcomes) are determined. Otherwise, the process 100 continues to step 120.

In step 120, at least one bonus game play offer, which may be an offer for local game play at a casino, is determined. Determining the bonus game play offer may comprise, for example, determining how many rounds of additional game play of a particular type should be offered. Alternately, determining an offer for bonus game play may include generating a plurality of random numbers, wherein each random number is associated with a number of rounds of a wagering game. Such an indication of local game play may be received via a printed document that may include a bar code or other encoded information readable by a CS and/or AS, for determining the indication, which may specify certain requirements such as which GD or group of GDs located on a casino gaming floor may be used to execute local game play.

In some embodiments, determining the parameters for the offer to play additional wagering game rounds, or bonus game play, may include determining one or more actual outcomes. For example, it may be determined that one or more bonus rounds should be offered to each player who purchases a DVD, and that each such player will win at least a nominal prize. A prize database may be utilized that contains entries corresponding to a range of possible awards and/or prizes to be awarded, for example, when the player uses a GD located at the casino.

In some embodiments, a player may select a strategy as a value of a parameter in defining a session to be executed on behalf of the player. In some embodiments in which DVDs of sessions are mass produced prior to any request for a session being received from a player, a description of a DVD available for purchase may include a description of a strategy used in executing the session, to make decisions on behalf of a player. This may be true for sessions of video poker games or other games typically involving player decisions. For example, a session for a draw video poker game may be executed using a perfect strategy or near-perfect strategy in deciding which cards to hold for a given initial hand.

It should also be understood that, in some embodiments, a reference game play result that has been used to generate a video presentation may comprise a "bonus round" or other point in which a decision from a player is typically required (e.g., a draw video poker game typically requires a player to decide which cards to hold in a given initial hand of cards). Commonly, some GDs offer entrance to a bonus round upon the occurrence of a triggering condition, such as the receipt of a bonus-triggering event or outcome (e.g., "Bonus-Bonus-Bonus"). In some cases, such bonus rounds occurring on GDs may require no additional input or choice from a player. For example, a player may achieve a bonus-triggering outcome, and accordingly a display screen may depict an animated sequence that resolves in a number of additional "bonus"

credits that the player has won. In some embodiments, such non-interactive bonus presentations may be incorporated into the video presentation (e.g., during a video presentation of a reeled slot machine game, after the reels spin and depict a bonus-triggering outcome, the video presentation depicts an animated bonus sequence and reveals an amount of bonus credits). In such an embodiment, such "bonus round" outcomes are part of the video presentation on the DVD and in addition to any offer or offers for local game play described above.

In some embodiments, players viewing video presentations that present such "bonus rounds" or other decisions may offer no interactivity. For example, a video presentation depicts three boxes, one of which is highlighted and/or selected during the video presentation without receiving player input, such that a payout amount is subsequently revealed. In other embodiments, players may have a perceived influence over such bonus round outcomes or other decisions (e.g., players may be given an opportunity to "select a box" using an input device, though the result may already have been determined before the players selection and, for example, assigned to all options the player may choose). It should again be noted that such players watching video presentations at remote locations may have no actual influence over associated game play results, as any game play may have previously occurred (e.g., in a legal jurisdiction).

In some embodiments, a progressive "win" may occur during the execution of a session. Such a progressive win achieved during a session being executed may be handled in a variety of manners.

For example, in one embodiment in which a session is being executed on behalf of a particular player, the player may be instantly notified of the progressive win (e.g., the player is called before he is even provided with the video presentation). In other embodiments, the player may not be notified, but rather may learn of such a progressive win by watching a video presentation.

In step 125, an indication of the bonus game play offer is stored along with the plurality of outcomes. Storing an indication of the bonus game play offer may include, for example, one or more of (i) storing an indication of the number of additional wagering game outcomes (the offer for local game play) to be provided by a GD in a memory (which may be the same mass storage device that stores the indication of the plurality of outcomes); (ii) recording (or causing to be recorded) an indication of the offer or offers for bonus game play on a DVD; and (iii) printing (or causing to be printed) an indication of the bonus game offer on a document (e.g., a session results ticket). It should be understood that an indication of an offer for bonus game play may comprise other data as required or desirable for keeping a record of the offers, and/or for tracking such offers. For example, data may be stored in a database concerning the type of GD that may be used for bonus game play, where the GD is located, the amount of outcomes offered, and the wagering amount provided or required (i.e., such bonus game play may be free of charge, or there may be a nominal charge, or there may be a charge but the player may be notified that a more favorable probability table will be in use to determine outcomes). It should also be understood that some or all of such data may be printed in readable or non-readable form on a sessions results ticket or other receipt.

In step 130, the plurality of outcomes and the offer for bonus game play (if such an offer is present) is sold to a player in exchange for a price. Of course, it should be understood that in some embodiments the plurality of outcomes along with the offer for local game play may be provided to a player without receiving a price therefore. For example, a DVD of wagering game outcomes and an offer for local game play may be provided as a reward (e.g., for loyalty to a casino or certain desirable play behavior), gift or incentive. Further, it should be understood that the price received in exchange for such a DVD may be a monetary amount (e.g., U.S. dollars) or may be in another form of consideration. For example, a player may agree to perform an activity or engage in a behavior in exchange for the DVD. For example, a player may answer survey or marketing questions and/or commit to returning to a casino within a predetermined time frame.

Selling the plurality of outcomes and the offer for local game play to a player in exchange for a price may comprise, for example, selling a DVD to the player, the DVD having recorded thereon a video representation of the plurality of outcomes and the offer for local game play. In another example, selling the plurality of outcomes to a player may comprise providing access to the player to the plurality of outcomes in another manner. For example, a code may be provided to the player, the code being associated with an indication (e.g., a video presentation) of the predetermined plurality of outcomes and the offer for local game play as stored on a server device (e.g., a server device operable to facilitate a Web site). The player may enter the code (e.g., online) and thus gain access to the indication of the outcomes and the offer.

In some embodiments, selling the plurality of outcomes along with the offer for local game play to a player may comprise providing an indication of the plurality of outcomes to a player who has previously ordered or requested that the plurality of outcomes be generated, and may have already paid for the outcomes. In such embodiments, selling the plurality of outcomes to the player may comprise communicating (e.g., transmitting) an indication of the outcomes (or an indication of an availability of the outcomes) and the offer for local game play to the player. For example, a DVD may be mailed to the player or a code or other information (e.g., an executable file that displays representative outcomes and the offer when opened or run) may be e-mailed to the player.

In one embodiment, selling the plurality of outcomes along with the offer for local game play to a player may occur at a POS of a casino. For example, a player may request to purchase a DVD of outcomes at the POS. The sale of the DVD may involve various procedures for ensuring the security and legitimate sale of the DVD.

In some embodiments, providing the player access to a video presentation may comprise storing or transmitting the video presentation electronically such that it may be accessed or viewed by the player. For example, in one embodiment, providing (and, e.g., creating) a video presentation including an offer for local game play may comprise storing various media files on a server that may be accessible by purchasers via computing devices such as personal home computers (of course, other computing devices, such as PDAs, cellular phones, and so on are contemplated). Accordingly, providing access to such a video presentation may comprise allowing a player to access such stored files. For example, in one embodiment, a player may be provided with a code that may be entered (e.g., using a form of a Web page) to gain access to such a video presentation. Such a code may comprise a session identifier. For example, after being given a code, the player may visit a Web page and enter the code. If the code is valid (e.g., as determined by a server, the session has been executed and the code has been legitimately provided to the player and is associated with the session), the player may then use a Web interface (e.g., a virtual slot machine created using Macromedia Flash or a similar program) to view the stored video presentation associated with the purchased session and the offer for local game play. For example, the player may press a "spin" button of such a virtual slot machine, and upon doing so, a server may be operable to (i) determine a game play number (e.g., if it is the first time the player has pressed the spin button, the game play number is "1," and so on), (ii) access a database or other memory structure based on the session identifier so as to determine one or more media files in association with the game play number, and (iii) output the appropriate media files via the Web interface. In such embodiments, the offer for local game play may include a guaranteed minimum prize or award along with the possibility of winning a large prize or award so as to entice the player to visit the casino.

In some embodiments, as also described, a video presentation of a plurality of outcomes comprising a session may be output via tangible media such as a DVD or CD-ROM. Accordingly, in some embodiments, such tangible media may be provided, shipped or mailed to a purchaser of a hybrid contract gaming session. For example, the tangible media may be handed to the player upon the player purchasing the session, may be mailed to a mailing address indicated by a player, may be stored in a centrally-accessible database or in written form, etc.

It should be understood that the various steps of process 100 may occur at different locations. For example, a plurality of outcomes and the offer for local game play may be generated at a casino and transmitted to a DVD assembly facility that is remote from the casino. The DVD assembly facility may then create a DVD having recorded therein a video representation of the plurality of outcomes along with the offer for local game play. The DVDs assembled at such a DVD assembly facility may then be transported to another location (e.g., to a casino, to be made available for sale to players or directly to a players home if the player has previously ordered a DVD).

Life Cycle of a DVD

Figure 2:
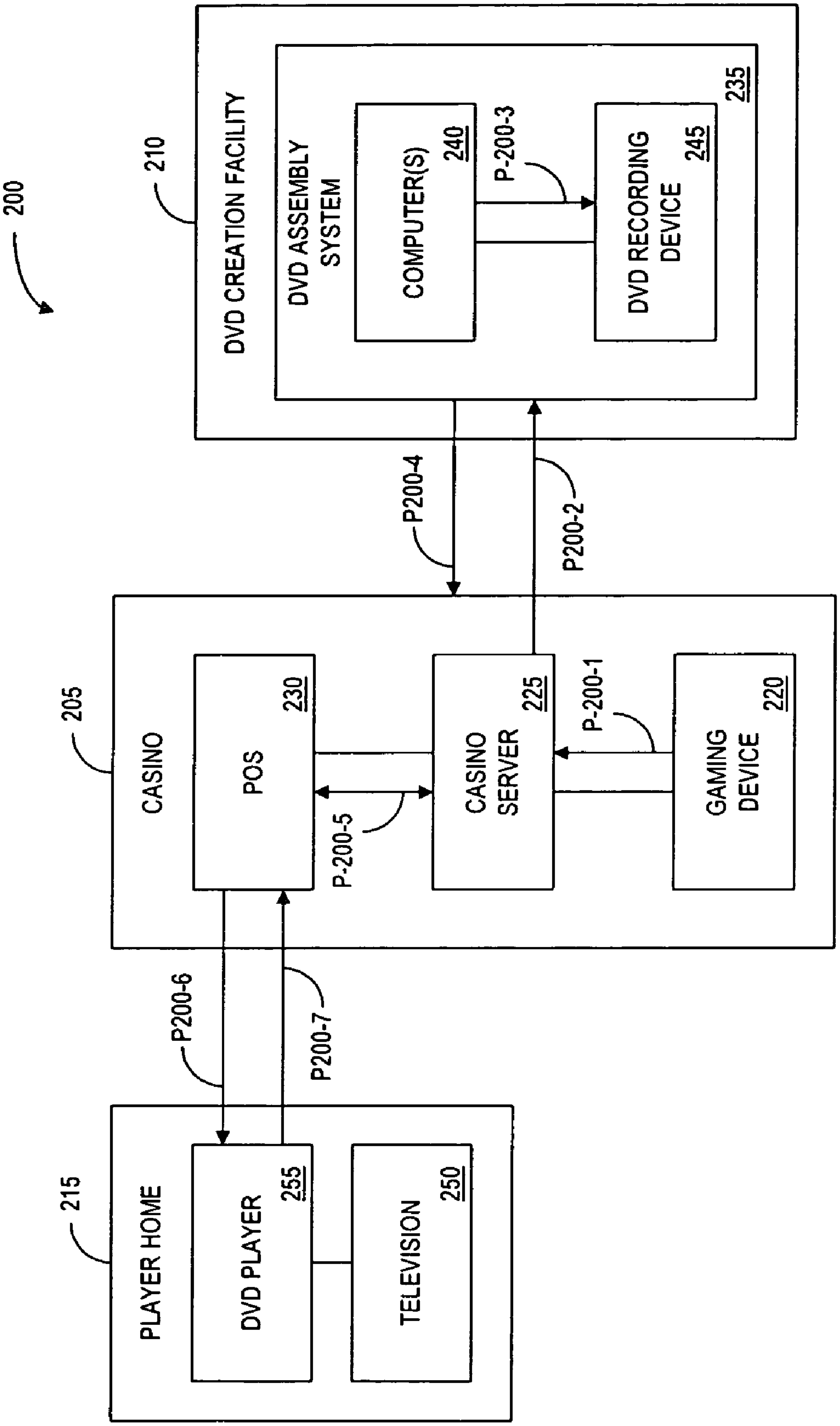
FIG. 2 is a block diagram of an example "life cycle" of a DVD according to some embodiments described herein.

FIG. 2 is a simplified block diagram of an example "life cycle" of a DVD according to some embodiments described herein. The block diagram illustrates the various entities and processes that may be involved in at least one embodiment described herein. It should be noted that FIG. 2 is provided herein to illustrate one possible implementation of some embodiments.

As illustrated in FIG. 2, in accordance with some embodiments three distinct locations may be involved in providing a DVD of outcomes (and an offer for local game play) to a player. The first location is a casino 205, at which a player may purchase and redeem a DVD. The second location is a DVD creation facility 210, at which a DVD of outcomes and at least one offer for local game play may be created based on outcomes determined by a GD. The third location is a player's home 215 or other location remote from a casino, at which location a player may view a DVD of outcomes and one or more offers for local game play.

The casino 205 may include a CS 225 that facilitates the sale and redemption of DVDs of outcomes. The CS 225 is in communication with a GD 220 at which outcomes are created, based on which outcomes a video presentation of outcomes for the DVD will be created. The CS 225 is also in communication with a POS 230, at which a player may purchase a DVD of outcomes.

The DVD creation facility includes a DVD assembly system 235 (DVD AS 235). The DVD AS 235 is comprised of a computer 240 and a DVD recording device 245.

The player home 215 may include a TV 250 in communication with a DVD player 255. It should be understood, of course, that if a tangible medium other than a DVD is used to provide a video presentation of outcomes to a player, the player home 215 may include devices appropriate for reading and outputting the video presentation to a player (e.g., if the outcomes are stored on a CD-ROM, the player home may include a PC operable to read and output the information recorded on the CD-ROM).

A player's obtainment of a DVD of outcomes may begin with a process P-200-1, in which process GD 220 generates a plurality of outcomes for a session and communicates (e.g., transmits) an indication of the plurality of outcomes to CS 225. In an alternate embodiment, GD 220 may communicate an indication of the plurality of outcomes directly to AS 235 (e.g., in lieu of or in addition to communicating the indication to CS 225). It should be noted that, as described, a player may have requested the plurality of outcomes or session prior to the outcomes being generated. In such embodiments, a player's obtainment of a DVD of outcomes may instead begin with a process in which a player approaches a POS 230 to request the plurality of outcomes (and, e.g., provides the desired parameters and values thereof for the session comprising the plurality of outcomes). However, for purposes of simplicity, FIG. 2 illustrates an embodiment in which DVDs are mass produced, without the creation of a DVD being dependent on a player requesting a purchase of a particular session.

Once the GD 220 (or another device since, as described herein, any reference to a particular device performing a particular function is not meant to be limiting since the function may be performed by another device, as desired and practicable) transmits an indication of the plurality of outcomes, which will be referred to as session result data at least for purposes of FIG. 2, the CS 225 communicates the session result data to DVD AS 235. For example, the CS 225 may electronically communicate the session result data in an encrypted fashion to CS 225. The session result data may include, for example, an indication of one or more of (i) a game for which the plurality of outcomes were generated; (ii) a price of the session; (iii) a beginning credit meter balance for the session; (iv) an ending credit meter balance for the session; (iv) a number of game plays included in the session; (v) a number of game plays associated with an offer for additional local game play; (vi) a wager per game play; (vii) a sum of payouts obtained for the session; (vii) particular outcomes (e.g., sets of indicia and/or payouts) obtained during the session; (viii) a strategy employed during the session (e.g., if any decision-making is required during a game play); and/or (ix) a session identifier.

The computer 240 may then create a video presentation based on the received session result data. For example, the computer 240 may select or create appropriate media files (e.g., video clips, each video clip corresponding to a particular representative outcome to be included in the video presentation) based on the received session result data. The computer 240 may also select or generate one or more offer media files associated with offers for local game play for inclusion in the video presentation. The computer 240 may also determine an order in which the media files are to be put together in the video presentation. Such an order may be determined, for example, based on an order in which outcomes were generated by GD 220 (which order may be included in the session result data received). In another example, the order may be determined based on another desired characteristic. For example, it may be desirable to represent the outcomes such that the majority of outcomes corresponding to large payouts occur towards the end of the video presentation or such that payouts that correspond to payouts greater than zero are substantially evenly interspersed among outcomes that correspond to payouts of zero credits. It may also be desirable to represent an offer for local game play after certain triggering events, such as after a jackpot outcome (for example, a message may be inserted such as "Congratulations, you qualify for a bonus round of triple-diamond slots game play on specially designated gaming devices located on the gaming floor of the StarSpots Casino in Little Big River, Kans."), or to place such an offer after the conclusion of the last outcome of the session.

It should be understood that a video presentation created in accordance with some embodiments may include data other than the mere representation of outcomes obtained as a result of a session. For example, inserted pauses to mimic a time at which a player would normally pull a slot machine handle or otherwise initiate the next game play may be interspersed between each video clip representing an outcome, to approximate the experience a player may have while playing a GD on a casino floor. In addition, as described above, one or more offers for additional game play to be executed on a GD located in a legalized gambling jurisdiction may be interspersed between pre-selected outcomes of a session if desired and/or if appropriate. This additional data may be, in some embodiments, additional video data, or in other embodiments, navigation data such as DVD pause commands. In another example, audio and/or video of messages may also be included (e.g., congratulatory messages appear upon an outcome corresponding to a large payout being displayed, or and offer or offers to determine a result or results associated with local game play, for example, at a GD in a casino located in a legalized gambling jurisdiction).

Once the computer 240 creates a video presentation (e.g., selects the media files to be included in the video presentation and the order thereof), the computer 240 may, in process P-200-3, direct the DVD recording device to record the video presentation onto a DVD. The DVD recording device records (e.g., stamps) the video presentation onto a DVD.

Once the DVD is created (which, in some embodiments, may include storing the DVD in a jewel case, including marketing materials with the DVD, labeling the DVD with unique identifiers (e.g., in the form of barcodes) as appropriate, and wrapping the DVD in secure packaging), the DVD is transported from the DVD creation facility 210 to the casino 205 in process P-200-4. For example, a shipment of DVDs created in accordance with the above processes may be shipped to the casino. Additionally, data indicative of the DVDs created and being shipped may be communicated to the casino 205. For example, an indication of a unique DVD identifier that corresponds to a unique session identifier of a session based on which the DVD was created may be communicated. Such information may be communicated electronically and/or via printed form (e.g., as documents included in the shipment).

Once the DVD arrives at the casino 205, it is made available for purchase to players. For example, the DVD may be placed on a display of DVDs on a casino floor (e.g., next to a GD that is operable to facilitate a game based on which the outcomes of the DVD were generated), behind a casino counter, in a casino hotel room, etc. Information regarding the DVD is stored in CS 225. For example, the unique DVD identifier (which may also be included on the DVD and/or DVD packaging) may be stored in an available DVDs database 445, along with other information associated with the DVD (e.g., a redemption value of the DVD and a status of the DVD (e.g., whether it has yet been sold and/or redeemed)).

A player who desires to purchase the DVD may then request to purchase the DVD at POS 230. For example, a player may select the DVD from a display on a casino floor and bring it to POS 230. In another example, the DVD may be available at a merchant associated with the casino and POS 230 and the player may select the DVD from a shelf of the merchant and present it for purchase at POS 230. In yet another example, the DVD may be located behind an employee counter of a POS 230 and the player may request to purchase the DVD by informing a casino attendant, who selects the DVD from behind the counter for the player. The purchase of the DVD is facilitated in process P-200-5, in which process the POS 230 communicates with CS 225 to verify that the DVD has not previously been purchased and is available for sale. The process P-200-5 may include other steps for ensuring that the DVD is sold in a secure manner. For example, an identifier of the player may be received and/or an activation code for the DVD may be received from CS 225. Once the player provides the appropriate price for the DVD, the player is provided with the receipt and DVD and the purchase is complete.

The player may then take the DVD home in process P-200-6 and view the video presentation of outcomes at his leisure. One or more offers may be included for additional and/or free game play at a GD located at a casino, for example. The player may subsequently return to the casino to accept the offer for the local game play and to request a payment of the redemption value of the DVD, in process P-200-7. For example, the player may go to a casino, input a code or other session identifier provided at time of purchase of the DVD into a GD to execute the free local game play that was offered with the DVD. The player may then visit POS 230 in order to redeem the DVD and to redeem any awards and/or prizes resulting from the local game play. For example, if the ending credit meter balance of a session, which the DVD redemption value is a function of, is greater than zero, the player may obtain the redemption value by returning to the casino with the DVD and receipt, and at the same time execute the offer for local game play and collect any winnings from such additional game play as well.

Upon receiving a request to collect a redemption value of a DVD at a POS 230, a process P-200-8 is performed for verifying and authorizing the provision of the redemption value to the player. For example, a legitimate purchase by the player of the DVD may be verified. Additionally, it may be verified that the redemption value has not previously been collected. In addition, any local game play winnings associated with the offer for local game play may be added during the redemption process. In some embodiments, any losses resulting from local game play may be subtracted from any positive credit balance associated with the video presentation on the DVD. In some other embodiments, a negative balance associated with the video presentation of wagering game outcomes of the DVD and any negative balance generated from accepting the offer for local game play are considered to be a zero balance, so that the player is not penalized from any such outcomes. An example redemption process for redeeming a redemption value of a DVD and any winnings from associated local game play is described in detail herein with respect to FIG. 10.

Of course, it should be understood that a player need not view the video presentation in order to collect the DVD redemption value. As described herein, in some embodiments a player may be allowed to collect the redemption value of a purchased DVD without ever opening the DVD and/or viewing the video presentation of the DVD. In such a case, the player may be informed that she is entitled to additional local game play at a GD on the gaming floor, for example, by a casino representative. It should also be noted that, in some embodiments, a player need not return to the casino in order to collect the DVD redemption value. For example, in some embodiments the DVD redemption value may be provided to the player who purchased the DVD after a predetermined period of time from the purchase of the DVD passes (e.g., one month after the DVD is purchased, a check for the redemption value is mailed to the player if the player has not yet collected the redemption value). In some embodiments, a player may request to collect the redemption value of a DVD without being required to visit the casino (e.g. a player may call or e-mail the casino or send in his DVD and receipt therefore via postal mail in order to collect the redemption value). In either of these cases, the player may be orally notified or notified in writing (i.e. by letter or by email) of the offer for additional local game play, and may be given a deadline for executing such local game play, after which date the offer expires.

In some embodiments, in addition to an offer for local game play such as free execution of a bonus round on a GD on the casino wagering game floor, a player may be provided with a benefit for returning to a casino after purchasing a DVD, even if the DVD redemption value is zero or the credit meter balance associated with the session based on which the DVD was created was negative or zero. For example, a player may be provided with free game plays, comp points, discounts, or other prizes.

Systems

Figure 3:
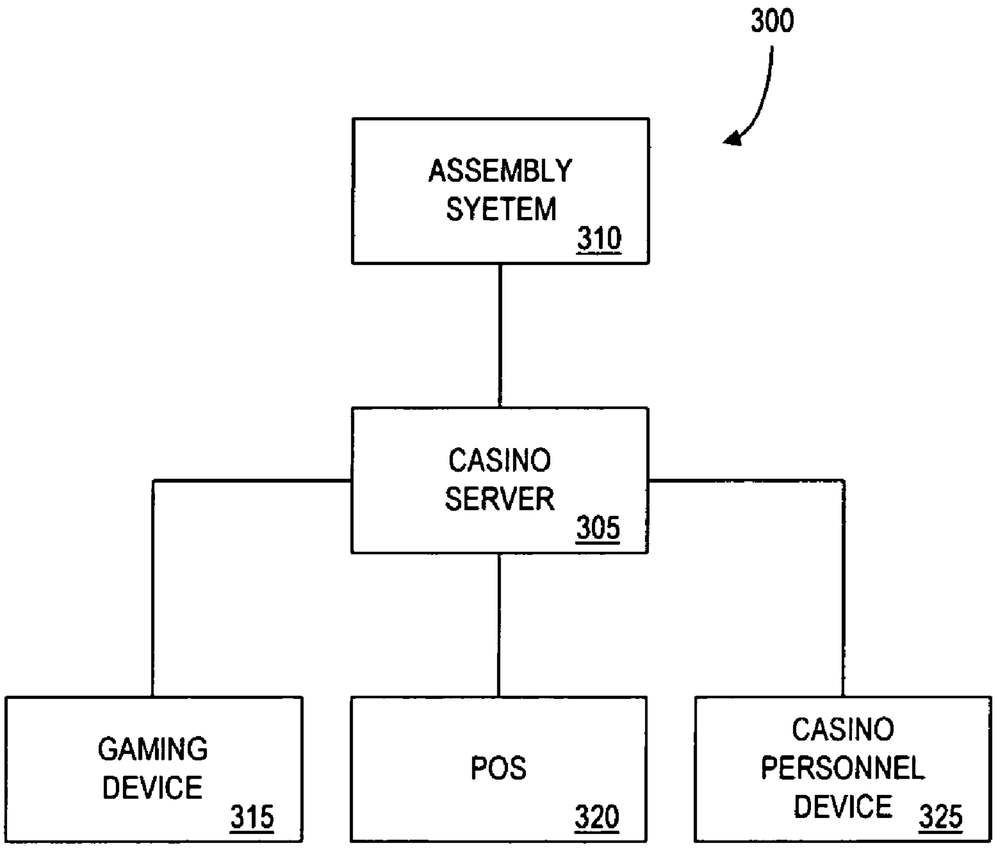
FIG. 3 is a block diagram of an example system in accordance with some embodiments described herein.

Referring now to FIG. 3, illustrated therein is a block diagram of an embodiment 300 of an example system that may be utilized to implement one or more embodiments described herein. Embodiment 300 is referred to as system 300 herein. The system 300 comprises a casino server 305 (CS 305).

The CS 305 is operable to communicate with an assembly system 310 (AS 310). The AS 310 may be operable, for example, to assemble or otherwise create or facilitate DVDs or other tangible media storing outcomes in accordance with embodiments described herein. In one embodiment, AS 310 may be located in a location remote from a casino in which a CS 305 is located. In other embodiments, AS 310 may be located in the same location as CS 305. In one embodiment, some or all of the functions described herein as being performed by AS 310 may instead or in addition be performed by CS 305 and/or another device. In some embodiments CS 305 and AS 310 are operated by the same entity, irrespective of whether they are each located in the same location or remote locations (e.g., a casino may operate both). In other embodiments, CS 305 is operated by a first entity (e.g., a casino) while AS 310 is operated by a second entity (e.g., a manufacturer of gaming devices).

The CS 305 is further operable to communicate with one or more gaming devices 315 (GD 315). A GD 315 may be operable, for example, to generate a plurality of outcomes in accordance with embodiments described herein. A GD 315 may comprise, in one embodiment, a GD on a casino floor that is also operable to be used by a player in a conventional manner. In other embodiments, GD 315 may comprise a modified GD (MGD) that may be configured to generate sessions for use in creating DVDs. Although only a single GD is shown, any number of GDs may be used. An example embodiment of a GD 315 is described herein with respect to FIG. 4.

The CS 305 is further operable to communicate with a Point-of-Sale 320 (POS 320). Although only a single POS is shown, any number of POSs may be used. The CS 305 is further operable to communicate with a casino personnel device 325 (CPD 325). A CPD may be used, for example, by an employee of a casino to facilitate one or more embodiments described herein. Although only a single CPD is shown, any number may be used.

In some embodiments, various casino locations (e.g., change booths, customer service counters, kiosks, shops, restaurants, etc.) may utilize POS terminals to facilitate various processes described herein. For example, in some embodiments, a player may purchase a DVD containing a plurality of outcomes previously generated by a GS 315 via a POS 320. In another example, a player may request at a POS 320 that a plurality of outcomes be generated in accordance with one or more parameters specified by the player and stored on a DVD to be provided to the player. Thus, in some embodiments, a POS may be utilized to (i) receive from a player a request to purchase a DVD of outcomes; (ii) verify and/or authorize the sale of the DVD; (iii) accept payment in exchange for the DVD; and/or (iv) provide a payout corresponding to the DVD upon a player's authorized redemption of the DVD. In some embodiments, a POS 320 may be operable to communicate with CS 305 to authorize the sale and/or redemption of a DVD. In some embodiments, a POS 320 may be configured to read from and/or write to one or more databases of the present invention (e.g., an available DVDs database). In some embodiments, a POS 320 may comprise various hardware and software described herein with respect to other devices (e.g., a keyboard, processor, display, etc.). In some embodiments, a POS 320 may be operable to communicate with a device in addition to CS 305. For example, POS 320 may be operable to communicate with an inventory/reservation system (e.g., a computer terminal at a theatre communicates with an inventory database to determine a number of unsold seats for a certain event). In some embodiments, CS 305 may function as an inventory/reservation system.

In some embodiments, various casino employees may be equipped with or otherwise utilize one or more CPDs. A CPD 325 may comprise, for example, a PDA or other computing device (e.g., a personal computer terminal). A CPD 325 may comprise various input devices (e.g., a keypad, a touch-sensitive display screen, a card reader, an infrared bar code scanner, etc.), various output devices (e.g., an LCD screen), a processor, a memory and/or a communications port, as described herein with respect to other devices. In some embodiments, a CPD 325 may be operable to communicate with a GD 315, CS 305, another server, a kiosk, a peripheral device, AS 310 and loran inventory/reservation system of a casino-maintained property (e.g., a hotel). Thus, a CPD 325 may be configurable to, among other things, (i) read from and/or write to one or more databases of the present invention, (ii) assist in payments made to players (e.g., a representative "scans" a receipt for a purchased DVD and determines a value associated with the receipt, and if the receipt is valid, provides payment equal to the value; the representative may also be authorized to provide payment equal to any winnings associated with local game play results associated with an offer for local game play provided to the player on the DVD), (iii) assist in payment made by players (e.g., a casino representative may receive a payment from a player for purchasing a DVD as described herein and obtain an activation code for the DVD to provide to the player); (iv) cause a GD to generate a plurality of outcomes for storage on a DVD in accordance with embodiments described herein; and/or (v) execute or assist in the execution of various other processes described herein. In one or more embodiments, a CPD may be operable to read data from and/or write data to one or more of the databases described herein. A memory of a CPD may store a program for executing processes described herein, or portions thereof.

The CS 305 may communicate with any and all of AS 310, GD 315, POS 320 and CPD 325 directly or indirectly, via a wired or wireless medium such as the Internet, LAN, WAN or Ethernet, Token Ring, or via any appropriate communications means or combination of communications means. For example, in one embodiment communication among any and all of the devices of system 300 may occur over the Internet through a Web site maintained by computer on a remote server or over an on-line data network including commercial on-line service providers, bulletin board systems and the like. In yet other embodiments, communication among any of the devices of system 300 may occur over RF, cable TV, satellite links and the like.

It should be noted that the lines connecting the various devices of system 300 do not imply that the devices are operable to communicate via a particular network. For example, AS 310 may not be located on a network that CS 305, GD 310, POS 320 and CPD 325 are located on.

Further, any and all of the CS 305, AS 310, GD 315, POS 320 and CPD 325 may comprise a computing device (or one or more computing devices), such as those based on the Intel® Pentium® processor.

In some embodiments, communication among some or all of the devices 300 may occur over a network. Some, but not all, possible communication networks that may comprise the system 300 include: a LAN, a WAN, the Internet, a telephone line, a cable line, a radio channel, an optical communications line, and a satellite communications link. For example, GD 315 may communicate with CS 305 over a LAN while CS 305 may communicate with AS 310 over a WAN or via a cable line.

Possible communications protocols that may be part of the system 300 include: Ethernet (or IEEE 802.3), SAP, ATP, Bluetooth™, and TCP/IP. Communication may be encrypted to ensure privacy and prevent fraud in any of a variety of ways well known in the art.

A variety of communications protocols may be part of the system 300 or another system operable to facilitate the embodiments described herein, including but not limited to: Ethernet (or IEEE 802.3), SAP, SAS™, SuperSAS™, ATP, Bluetooth™, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, content management, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communication may be encrypted to ensure privacy and prevent fraud in any of a variety of ways well known in the art.

In some embodiments, a CS 305 may not be necessary and/or preferred. For example, one or more embodiments may be practiced on a stand-alone GD 315 (e.g., one operable to output a DVD of outcomes, and/or one associated with a device operable to output a DVD of outcomes) and/or a GD 315 operable to communicate with AS 310 directly. In such embodiments, any functions described as performed by the CS 305 or data described as stored on the CS 305 may instead be performed by or stored on one or more GD 315 and/or AS 310.

It should be understood that referring to CS 305 as a "casino" server is not meant to imply that a casino controls, or exclusively controls, this device or all functions thereof. For example, in one embodiment CS 305 is a device operated by an entity other than a casino (e.g., an entity that also operates AS 310 or controls some functions of AS 310). CS 305 may be any device operable to facilitate the creation of a DVD that stores a plurality of outcomes in accordance with embodiments described herein.

In one embodiment, CS 305 may in turn be in communication with another electronic device that is distinct from a GD 315 and/or AS 310, which electronic device may be operable to (i) direct the CS 305 to perform certain functions and/or (ii) read data from and/or write data to the CS 305. For example, the CS 305 may comprise a slot server or Data Collection Unit (DCU) that controls and/or communicates with a bank of slot machines, which slot server or DCU is in turn in communication with a casino server that is in communication with a plurality of such slot servers or DCUs.

In another embodiment, the CS 305 may be operable to communicate with a GD 315 via another electronic device (e.g., a DCU), such as a server computer operable to communicate with a plurality of slot machines. For example, in one embodiment, the CS 305 may be operable to communicate with a plurality of computing devices, each computing device operable to communicate with a respective plurality of gaming devices.

It should be noted that, in some embodiments, one or more of the devices described with respect to system 300 may be combined (or the functions described with respect to may be combined as being performed by) a single device. For example, CS 305 and AS 310 may comprise the same device or a single device may perform the functions described herein as being performed by the two devices as embodying two distinct devices. In another example, GD 315 may comprise CS 305 and/or AS 310 and may, in some embodiments, perform some or all of the functions described herein as being performed by CS 305 and/or AS 310, and vice versa.

Figure 4:
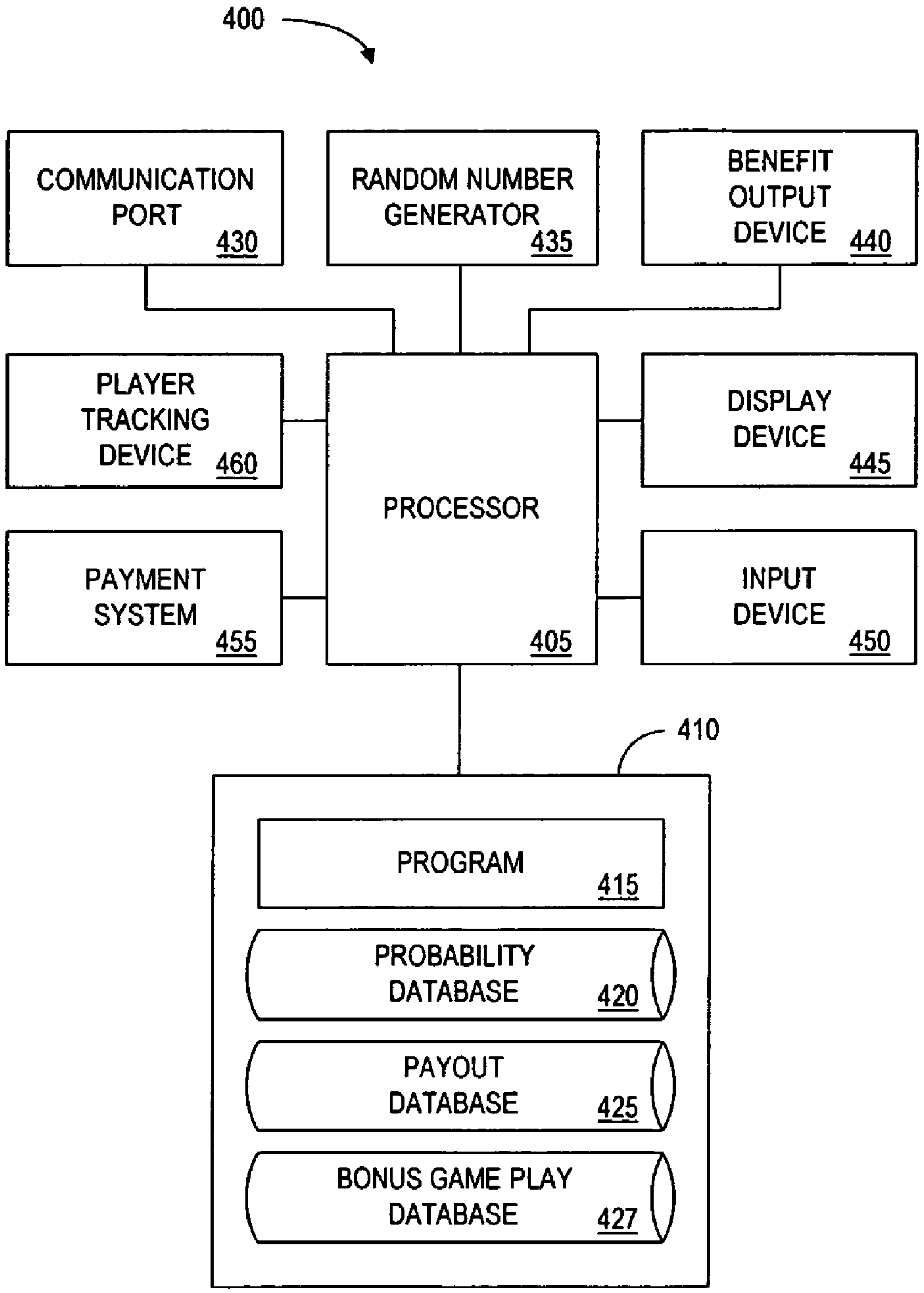
FIG. 4 is a block diagram of an example gaming device (GD) in accordance with some embodiments described herein.

FIG. 4 is a block diagram of an example embodiment 400 of a GD (e.g., GD 315). Embodiment 400 is referred to herein as GD 400. The GD 400 may be implemented as a system controller, a dedicated hardware circuit, an appropriately programmed general-purpose computer, or any other equivalent electronic, mechanical or electro-mechanical device. The GD 400 may comprise, for example, a slot machine, a video poker terminal, a video blackjack terminal, a video keno terminal, a video lottery terminal, a pachinko machine or a table-top game. In some embodiments, the term "slot machine" is used to refer to a GD and is meant to encompass any and all of the example devices listed herein. In various embodiments, a GD may comprise, for example, a personal computer (e.g., which communicates with an online casino Web site), a telephone (e.g., to communicate with an automated sports book that provides gaming services), or a portable handheld gaming device (e.g., a personal digital assistant, Nintendo™ GameBoy™ device, Sony™ PSP™ device, or other appropriate device). In some embodiments, the GD 400 may comprise a device operable to facilitate a table game (e.g., a device operable to monitor a blackjack game, such as size of a player's wager, cards received and/or decisions made). In some embodiments, a user device such as a PDA or cell phone may be used in place of, or in addition to, some or all of the GD 400 components depicted in FIG. 4.

Further, a GD 400 may comprise a personal computer or other device operable to communicate with an online casino and facilitate game play at the online casino. In one or more embodiments, the GD 400 may comprise a computing device operable to execute software that simulates play of a reeled slot machine game, video poker game, video blackjack game, video keno game, video roulette game, or lottery game.

The example GD 400 comprises a processor 405, such as one or more Intel® Pentium® processors. The processor 405 is in communication with a memory 410. The memory 410 may comprise an appropriate combination of magnetic, optical and/or semiconductor memory, and may include, for example, Random Access Memory (RAM), Read-Only Memory (ROM), a compact disc and/or a hard disk. The memory 410 may comprise or include any type of computer-readable medium. The processor 405 and the memory 410 may each be, for example: (i) located entirely within a single computer or other device; or (ii) connected to each other by a remote communication medium, such as a serial port cable, telephone line or radio frequency transceiver. In one embodiment, GD 400 may comprise one or more devices that are connected to a remote server computer for maintaining databases.

The memory 410 stores a program 415 for controlling the processor 405. The processor 405 performs instructions of the program 415, and thereby operates in accordance with embodiments of the present invention, and particularly in accordance with the methods described in detail herein. The program 415, as well as any other program for controlling a processor described herein, may be stored in a compressed, uncompiled and/or encrypted format. The following description of program 415 applies equally to all programs for directing a processor described herein. The program 415 includes program elements that may be necessary, such as an operating system, a database management system and "device drivers" for allowing the processor 405 to interface with computer peripheral devices. Appropriate program elements are known to those skilled in the art, and need not be described in detail herein.

According to an embodiment, the instructions of the program 415 may be read into a main memory from another computer-readable medium, such from a ROM to RAM. Execution of sequences of the instructions in program 415 may cause processor 405 to perform one or more process steps described herein. In alternate embodiments, hard-wired circuitry may be used in place of, or in combination with, software instructions for implementation of the processes of the present invention. Thus, embodiments described herein are not limited to any specific combination of hardware and software. In some embodiments, the execution of sequences of the instructions in a program of a peripheral device associated with GD 400 may cause processor 405 to perform some or all of the process steps described herein.

The memory 410 may also store one or more databases. For example, memory 410 may store one or more of a probability database, such as probability database 420, one or more of a payout database, such as payout database 425, and/or one or more of a local game play database associated with offers to determine wagering game results associated with local game play portions of hybrid gaming sessions, such as bonus game play database 427.

In one or more embodiments, as described, data may be stored in a memory of another device (e.g., a database of CS 305 or a database of another device). In one or more embodiments, GD 400 may be operable to access the data thereof or have information associated with the data stored therein downloaded or otherwise made available to GD 400 as necessary and/or appropriate. For example, GD 400 may access a memory of another device to determine one or more parameters for generating a plurality of outcomes in accordance with one or more embodiments (e.g., how many outcomes are to be generated for a particular session). In some embodiments, GD 400 may be operable to write data to a memory of another device.

Note that, although the databases 420, 225 and 427 are described as being stored in GD 400, in other embodiments some or all of these databases and/or data thereof may be partially or wholly stored (in addition to or in lieu of being stored in the memory 410) in another device. Such other device may comprise, for example, CS 305, a POS 320, a CPD 325, another device and/or a combination thereof.

The processor 405 is operable to communicate with a communication port 430. The communication port 430 may be utilized, for example, to transmit information to (or receive information from) another device, such as CS 305, another GD, a CPD 325, a POS 320, AS 310, another device, or a combination thereof.

The processor 405 is also operable to communicate with a random number generator 435 (RNG 435), which may be a component of GD 400. The RNG 435 (as well as any other random number generator described herein), in accordance with at least one embodiment, may generate data representing random or pseudo-random values (referred to as "random numbers" herein). The RNG 435 may generate a random number every predetermined unit of time (e.g., every second) or in response to an initiation of a game on the gaming device. In the former embodiment, the generated random numbers may be used as they are generated (e.g., the random number generated at substantially the time of game initiation is used for that game) and/or stored for future use.

A RNG, as used herein, may be embodied as a processor separate from but working in cooperation with processor 405. Alternatively, a RNG may be embodied as an algorithm, program component, or software stored in the memory of a GD or other device and used to generate a random number.

Note that, although the generation or obtainment of a random number is described herein as involving a RNG of a GD, other methods of determining a random number may be employed. For example, a GD owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor 405 is also operable to communicate with a benefit output device 440, which may be a component of GD 400. The benefit output device 440 may comprise one or more devices for outputting a benefit to a player of GD 400. For example, in one embodiment, GD 400 may provide coins and/or tokens as a benefit. In such an embodiment the benefit output device 440 may comprise a hopper and hopper controller, for dispensing coins and/or tokens into a coin tray of GD 400.

In another example, GD 400 may provide a receipt or other document on which there is printed an indication of a benefit or other information (e.g., a cashless gaming receipt that has printed thereon a monetary value, which is redeemable for cash in the amount of the monetary value, a check cashable for monetary value, etc.). In such an embodiment, the benefit output device 440 may comprise a printing and document dispensing mechanism. In yet another example, GD 400 may provide electronic credits as a benefit (which, e.g., may be subsequently converted to coins and/or tokens and dispensed from a hopper into a coin tray). In such an embodiment, the benefit output device 440 may comprise a credit meter balance and/or a processor that manages the amount of electronic credits that is indicated on a display of a credit meter balance. The processor may be the processor 405 or another processor. In yet another example, GD 400 may credit a monetary amount to a financial account associated with a player as a benefit provided to a player. The financial account may be, for example, a credit card account, a debit account, a charge account, a checking account, and/or a casino account. In such an embodiment the benefit output device 440 may comprise a device for communicating with a server on which the financial account is maintained. Note that, in one or more embodiments, GD 400 may include more than one benefit output device 440 even though only one benefit output device is illustrated in FIG. 4.

The processor 405 is also operable to communicate with a display device 445, which may be a component of GD 400. The display device 445 may comprise, for example, one or more display screens or areas for outputting information related to game play on the gaming device, such as a cathode ray tube (CRT) monitor, liquid crystal display (LCD) screen, or light emitting diode (LED) screen. In one or more embodiments, GD 400 may comprise more than one display device 445.

The processor 405 may also be in communication with one or more other devices besides the display device 445, for outputting information (e.g., to a player or another device). Such other one or more output devices may also be components of GD 400. Such other one or more output devices may comprise, for example, an audio speaker (e.g., for outputting a message to a player, in addition to or in lieu of such a message being output via a display device 445), an infra-red transmitter, a radio transmitter, an electric motor, a printer (e.g., such as for printing cashless gaming vouchers), a coupon or product dispenser, an infra-red port (e.g., for communicating with a second GD or a portable device of a player), a Braille computer monitor, and a coin or bill dispenser. For certain types of GDs, common output devices include a CRT monitor on a video poker machine, a bell (e.g., that rings when a player wins), an LED display of a player's credit balance, an LCD display of a PDA for displaying keno numbers.

The processor 405 is also operable to communicate with an input device 450, which is a device that is capable of receiving an input (e.g., from a player, casino personnel or a device) and which may be a component of GD 400. An input device may communicate with or be part of another device (e.g. a CS 305, AS 310, POS 320, CPD 325, another GD, etc.). Some examples of input devices include: a bar-code scanner, a magnetic stripe reader, a computer keyboard or keypad, a button (e.g., mechanical, electromechanical or "soft", as in a portion of a touch-screen), a handle, a keypad, a touch-screen, a microphone, an infrared sensor, a voice recognition module, a coin or bill acceptor, a sonic ranger, a computer port, a video camera, a motion detector, a digital camera, a network card, a USB port, a GPS receiver, a RFID receiver, an RF receiver, a themometer, a pressure sensor, an infrared port (e.g., for receiving communications from with a second gaming device or a another device such as a smart card or PDA of a player), and a weight scale. For certain types of GDs, common input devices include a button or touch screen on a video poker machine, a lever or handle connected to the GD, a magnetic stripe reader to read a player tracking card inserted into a GD, a touch screen for input of player selections during game play, and a coin and bill acceptor. Input device 450 may comprise any of the above-described input devices or any combination thereof (i.e., input device 450 may comprise more than one input device).

In some embodiments, a GD 400 may comprise components capable of facilitating both input and output functions (i.e., input/output devices). In one example, a touch-sensitive display screen comprises an input/output device (e.g., the device outputs graphics and receives selections from players). In another example, processor 405 may communicate with a "ticket-in/ticket-out" device configured to dispense and receive cash-out tickets. Such a device may also assist in (e.g., provide data so as to facilitate) various accounting functions (e.g., ticket validation and redemption). For example, any or all of a GD, POS, kiosk and CPD maintained at a cashier cage may (i) comprise such a benefit input/output device, and/or (ii) communicate with a central server (e.g., CS 305) that manages the accounting associated with such ticket-in/ticket-out transactions (e.g., so as to track the issuance, redemption and expiration of such tickets). One example of ticket-in/ticket-out technology that may be adapted or utilized to implement embodiments described herein is the EZ Pay™ system, is manufactured by International Gaming Technology, headquartered in Reno, Nev.

Of course, as would be understood by one of ordinary skill in the art, GD 400 may comprise various combinations of any or all of the component devices described herein. For example, in one or more embodiments, the gaming device may include more than one display device, one or more other output devices, several input devices, and so on (e.g., two display screens, two audio speakers, a headset, a ticket-in/ticket-out device and several buttons). Further, GD 400 may include additional or different components from those described herein.

The processor 405 is further operable to communicate with a payment system 455, which may be a component of GD 400. The payment system 455 is a device capable of accepting payment from a player (e.g., a bet or initiation of a balance) and/or providing payment to a player (e.g., a payout). Payment is not limited to currency, but may also include other types of consideration, including products, services, and alternate currencies. Payment system 455 may be considered to be an example of an input device 450 and/or an example of a benefit output device 440 in some embodiments.

Exemplary methods of accepting payment by the payment system 455 include (i) receiving hard currency (i.e., coins or bills), and accordingly the payment system 455 may comprise a coin or bill acceptor; (ii) receiving an alternate currency (e.g., a paper cashless gaming voucher, a ticket, a coupon, a non-negotiable token), and accordingly the payment system 455 may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity.

Processor 405 is further operable to communicate with a player tracking device 460, which may be a component of GD 400. Player tracking device 460 may, in some embodiments, be considered an example of an input device 450 and/or an example of a payment system 455 (e.g., in embodiments in which a player provides a payment by providing a player identifier that also functions as a monetary account identifier). Player tracking device 460 may, in one or more embodiments, comprise a reader device operable to read information from and/or write information to a card such as a smart card and/or a player tracking card, such that (i) players may be identified, and (ii) various data associated with players may then be determined. For example, previous wagering, coin-in and/or cash-out behaviors previously engaged in by the player may be determined based on information associated with the player identifier. In another example, previous strategies employed in a video poker game may be similarly determined. In yet another example, DVDs previously purchased by a player may be determined (e.g., for purposes of providing a player a payment associated with the DVD). Similarly, a number of cashable credits available to the player may be determined, a number of promotional credits that may not be redeemed for cash but that are associated with the player may be determined, a code or other indication of a benefit to be provided to the player may be determined, a number of accumulated loyalty points associated with the player may be determined, a number of accumulated game elements such as symbols, cards or hands associated with the player may be determined, etc.

In one embodiment, the player tracking device 460 may comprise (i) a card reader (e.g., a port into which player tracking cards may be inserted), (ii) various input devices (e.g., a keypad, a touch-screen), (iii) various output devices (e.g., a small, full-color display screen), and/or (iv) combinations thereof (e.g., a touch-sensitive display screen that accommodates both input and output functions). Various commercially available devices may be suitable for such an application, such as the NextGen™ interactive player tracking panel manufactured by IGT™ or the iVIEW™ display screen manufactured by Bally Gaming and Systems™.

Of course, other non-card-based methods of identifying players are contemplated. For example, a unique identification code may be associated with the player. The player may then be identified upon entering the code. For example, the code may be stored (e.g., within a database maintained within a GD 400 and/or CS 305) such that the player may enter the code using an input device of a GD, and accordingly allow the player to be uniquely identified. In other embodiments, player biometrics may serve as identification means (e.g., a player is identified via a thumbprint or retinal scan of the player). In further embodiments, a barcode of a cashless gaming ticket may encode a player identifier.

Thus, as described, various data associated with a player may be tracked and stored (e.g., in an appropriate record of a centrally-maintained database), such that it may be accessed as desired. Further, various statistics may be measured in association with a player (e.g., coin-in statistics, win/loss statistics, buy-in amount for a play session) and similarly accessed.

In one embodiment, a GD may allow a player to play a game of skill rather than a game of chance. Such an embodiment may be more appealing to certain players or may be permitted in areas where it is illegal to gamble on games of chance.

In one embodiment, GD 400 may be operable to facilitate downloadable games such that games available for play on GD 400 may be stored on a server device (e.g., CS 305 or another device) and downloaded to the GD 400. In one embodiment, software components of GD 400 may be remotely modified and/or updated by another device (e.g., CS 305 or another device). For example, a payout or probability table stored in the memory of GD 400 may be altered, modified or updated remotely, hot fixes may be applied to software stored by GD 400 and/or new versions of software may be downloaded to GD 400. Similarly, GD 400 may be programmed to retrieve any or all such updates from another device, as appropriate and preferred. Any of the above (e.g., downloading of a game, updating of software, modification of a payout or probability table) may occur, for example, based upon an occurrence of an event (e.g., a scheduled event), an indication being received from qualified casino personnel or other personnel (e.g., a regulator), and/or upon a request from a player. In one embodiment, GD 400 may comprise a thin client device controlled be a server device (e.g., CS 305 or another device).

In some embodiments, a GD comprises a simplified gaming device or SGD. An SGD, as the term is used herein, may comprise a device operable to generate an outcome based on a random number but that is not designed to be located on a casino floor for interaction with a player. For example, an SGD may be programmed to perform functions different from that of a more conventional type of GD and/or to not perform some of the functions conventionally performed by a GD (e.g., display an indication of an outcome determined based on a random number). Further, a SGD may include components different from those normally included in a more conventional type of GD and/or fewer such components. For example, in some embodiments an SGD may not include a benefit output device 440 and/or player tracking device 460. For example, in some embodiments Applicants envision that a plurality of outcomes for storage and sale via a DVD, including offers to execute additional local game play, may be generated by a SGD that comprises a processor running in conjunction with an emulator of a wagering game, the SGD being located in a location other than a casino floor frequented by players. Such an SGD may not, for example, include a cabinet designed to attract a player and may not be operable to output coins, tokens or other benefits. Such an SGD may, however, be programmed to generate a large number of outcomes (e.g., substantially simultaneously) without displaying any of the outcomes so generated, which is unlike a conventional type of gaming device.

Local Game Play-Only GD

In some embodiments, it may be advantageous to provide a GD 400 that is specifically designed to facilitate local game play of hybrid gaming sessions (e.g., rather than a conventional GD used for purposes of typical play on a casino floor). For example, in one or more embodiments, a local GD, which is located on a casino gaming floor in a legalized gambling jurisdiction, may be configured for providing only additional wagering game or local bonus game play associated with a DVD that is of a certain type (for example, an electronic game device configured to play a "Double-Triple-Diamond" type of wagering game). In some embodiments, such a local game play-only GD may also include special displays or other indicia to indicate to casino patrons that it is designated for only that purpose, and may include other components to provide excitement (i.e. flashing lights, audio alarms, flat panel display messages, and the like) to draw attention to such bonus game play and/or to draw attention to the players utilizing such a GD.

For example, as described herein, an automated game session may be executed according to certain parameters, and a game disc such as a DVD may then be created based on the session. The session may include a determination that a player ultimately achieves a final session balance of 73 credits, but also achieves four bonus-triggering outcomes. Thus, the DVD may indicate (i) a pending final contract/session balance of 73 credits and (ii) a number (e.g., four) indicating additional rounds or spins of local game play offered (which may be "bonus rounds"), that may be executed by a player in a legal gambling jurisdiction, for example, by using a GD in a casino in Atlantic City, N.J. Accordingly, in some embodiments, a local GD may comprise a "Bonus-Round-Only" GD, or a "DVD Bonus Game" only GD, which may be configured only to (i) determine a number of local game play spins and/or bonus rounds available to a player, (ii) determine one or more types of local game play available to a player, (iii) provide play option output that may be associated with the type of game play (which may be based on game availability and/or player selection), (iv) receive input from players in association with such output, (v) determine payouts or other results in association with such local bonus game play (e.g., based in part on player input), and (v) output any associated payouts or results. Such a bonus-game-only GD may include a bonus game play database 427 to store data associated with such additional wagering game play, which may also include the bonus game offer or offers that appear on DVDs.

A variety of such devices are contemplated. For example, in some embodiments, a player may utilize a local GD enabling the player to choose from a variety of "DVD Bonus Game" options. For example, the local GD may be configured to offer a menu screen presenting the player with a variety of different game options. For example, a player may use a touch-screen to select a desired graphical theme or style associated with a bonus round (e.g., the player may select a bonus game themed after an auction, bank robbery, race, etc.). In some embodiments, the probabilities and/or payouts of such bonus games may be similar. For example, regardless of whether a player chooses a first graphical theme or a second graphical theme, a player may be presented with four options to select, each option corresponding to a different payout amount, such that the number of options and/or payout amounts may be the same with respect to the first and second graphical themes. In another example, a player may choose from a plurality of different bonus games, each such game offering the same expected value (e.g., an average payout of the same amount of credits).

In some embodiments, a "DVD Bonus Game"—only GD may enable a player to play only one type of wagering game. For example, a "DVD Bonus Only" Wheel of Fortune™ GD may enable players only to execute bonus rounds of such a game. In one or more such embodiments, a code or identifier provided to a player upon purchase of a DVD may simply encode a number of game plays which the player may be entitled to execute, rather than encode or indicate one or more database records storing various other types of data (e.g., wager amounts per game play, active pay combinations, and so on). For example, a player may purchase a Wheel of Fortune™ DVD, and view indications of game result outcomes such that a pending session balance of 75 credits is indicated. The DVD may also include an indication of a number of additional wagering game spins which a player may be entitled to execute in person at a casino (e.g., two indications of game result outcomes on the DVD depict a result of "Wheel-Wheel-Wheel," and a final summary screen of the DVD indicates "Congratulations! You won 75 credits and a bonus game of two additional free spins! Return to the casino to play the bonus game"). Accordingly, the player may then utilize the "DVD Bonus Only" Wheel of Fortune™ GD at the casino to execute the game plays to which the player is entitled. The GD may determine that the player is entitled to such play by receiving a code or identifier of a card, ticket, receipt, and the like (e.g., a player inserts a wagering game receipt received during purchase of the DVD, which may be in the form of a cashless gaming ticket In some embodiments, the number of bonus mends to which the player is entitled may have been determined before any such receipt was issued, and thus a barcode, for example, printed on the receipt may indicate the number of bonus rounds).

In some embodiments, such local game play-only (or bonus game play-only) GDs that facilitate the local game play portion of a hybrid gaming session may provide payment to players based on any winnings achieved during the local game play (e.g., if a player wins 125 credits by spinning the wheel of a Wheel of Fortune™ GD, the GD outputs a cashless gaming ticket indicating a balance of 125 credits, or any other equivalent form of payment may be made, such as cash, coins, crediting an electronic account, and so on). Such local game play-only GDs may alternately or additionally provide payment in association with game results players may have viewed remotely as part of the hybrid gaming session (e.g., in addition to outputting the 125 credits a player won during a bonus game, the device outputs a 75-credit payout from an associated DVD or like game disc). In other embodiments, such a local game play-only GD may be configured to output local game result data such that the data may be considered when settling a remote gaming session by, for example, during the redemption process for a wagering game DVD. Methods for redeeming DVDs having a positive credit meter balance along with providing payouts for winnings associated with local game play results are described in detail below.

Databases

Various databases that may be useful in one or more embodiments will now be described. Example structures and sample contents of each of (i) a session database (ii) a local game play active sessions database, and (iii) an available DVDs database are shown in FIGS. 5 through 7B, respectively. The specific data and fields illustrated in these drawings represent only some embodiments of the records stored in the databases described herein. The data and fields of these databases can be readily modified, for example, to include more or fewer data fields. A single database also may be employed to combine one or more of these databases. Note that in the databases, a different reference numeral is employed to identify each field of each database. However, in at least one embodiment, fields that are similarly named (e.g., session identifier fields) may store similar or the same data in a similar or in the same data format.

As will be understood by those skilled in the art, the schematic illustrations and accompanying descriptions of the sample databases presented herein are exemplary arrangements for stored representations of information. Any number of other arrangements may be employed besides those suggested by the tables shown. For example, the embodiments described herein could be practiced effectively using fewer or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of one or more embodiments and likewise, object methods or behaviors can be used to implement the processes of one or more embodiments.

Referring now to FIG. 5, illustrated therein is a tabular representation 500 of an embodiment of a record of session database, such as may be stored in a memory of CS 305 and/or a memory of another device. Tabular representation 500 is referred to herein as session database record 500.

Session database record 500 includes a number of example records or entries, including entries R500-1 through R500-9, each defining a game play of a particular session that may be stored, for example, on a DVD. Those skilled in the art will understand that the record 500 may include any number of entries.

The session database record 500 also defines a number of fields. The fields specify: (i) a unique session identifier 505; (ii) a wager amount per game play 510 (e.g., a specific wager per game play wherein the wager is the same for each game play of the session, an average wager per game play, etc.); (iii) a game 515 that specifies a game for which the game plays of the session are conducted; (iv) a session duration 520 that defines a duration of the session or an end event that causes the session to end; (v) a price 525 to be paid in exchange for the game plays of the session; (vi) a final session balance 530 that may comprise an indication of a number of credits or monetary value of a credit meter balance upon completion of a session (also referred to as an end credit meter balance herein); (vii) a game play number 535 that identifies each particular game play of the session; (ix) a wager 540 that was posted for each particular game play (if the wager per game play does not vary, this field may be omitted in light of field 510); (x) an indicia 545 that is determined as a result of each game play; (xi) an indicia identifier 550 that identifies (e.g., uniquely) the indicia of field 545 (alternatively, this may be an outcome identifier); and (xii) a payout 555 that corresponds to a benefit, prize or monetary value won as a result of a corresponding game play.

In some embodiments, the payout field 555 may store payouts as determined by a GD based on a random number, or as determined by another device (e.g., AS 310) based on an indication of a plurality of outcomes (e.g., based on an indication of a result of a session). For example, in some embodiments AS 310 may receive an indication of (i) a beginning credit meter balance for a session; (ii) an ending credit meter balance for the session; (iii) an indication of wagers posted for the session; (iv) a number of game plays comprising the session; and (v) an indication of an offer for local game play to be displayed to a player. The AS 310 may then determine a plurality of payouts and, in some embodiments, the order in which the payouts and the offer for local game play (such as a bonus round to be executed at a GD located on casino premises) are to be presented via a video presentation, based on such data. Accordingly, in such embodiments AS 310 may utilize session database record 500 to store the determined payouts and/or the order of the payouts as they are to be presented via a video presentation.

It should be understood that the payout field may store a value of a payout amount corresponding to a particular outcome, and the payout field may be stored in any form practicable and desirable. For example, a payout value may be represented as a number of credits. Alternatively, a payout value may be stored to represent a dollar value.

Accordingly, it should be understood that in various embodiments the session database record 500 may be populated by a GD, a CS and/or a AS. Further, it should be understood that in various embodiments the record 500 may be utilized by a GD, CS and/or AS for different purposes. For example, a GD and/or CS may utilize record 500 to store an actual outcome of each game play of a session. In another example, an AS may utilize record 500 to store representative outcomes determined for a session.

FIG. 6 is a tabular representation 600 of an example embodiment of a local game play active sessions database (which may be, for example, stored in a memory of a CS 305 or a memory of another device). Tabular representation 600 is referred to herein as a local game play active sessions database 600.

The local game play active sessions database 600 includes a number of example records or entries, including records R600-1 through R600-4, each of which may define a session that is currently active (e.g., is in the process of being executed or has been scheduled to be executed). Those skilled in the art will understand that the local game play active sessions database 600 may include any number of entries.

The local game play active sessions database 600 also defines fields for each of the entries or records. In this example embodiment, the fields specify: (i) a local game play identifier 605 that uniquely identifies the offers to execute local game play associated with one or more hybrid gaming sessions contracts (for example, an offer for local game play that may be, in some embodiments, associated with a DVD); (ii) a GD identifier 610 that identifies a local GD or type of GD (for example, a bonus round-only gaming device of the "Double-Sapphire" game type) on which the local game play session is to be executed (which, in some embodiments, may include a plurality of GDs or types of GDs); (iii) a game play type identifier 615 that identifies the type of game for which the outcomes of the session are to be determined; (iv) a wager per game play 620 (such as twenty-five cents per reel spin); (v) one or more active payout combinations 625 (e.g. the player can only receive a payout for an outcome of "BAR-BAR-BAR" or for a "ROYAL FLUSH"); (iv) a number of local game plays remaining 630 (for example, as shown in row R600-1, a player is entitled to fifteen (15) more spins or rounds of wagering game play on a local GD that provides a 5-payline reel spin); and (v) a time remaining 635 that may store an indication (which may be an estimate) of how much Ume remains before the session is completely executed, and/or that defines a time limit (in some embodiments, the time remaining to execute a round of local game play is not applicable (N/A)).

The active sessions database 600 may be utilized, for example, to track information concerning play of additional wagering game sessions associated with hybrid gaming sessions that have begun to be executed and/or that are scheduled to be executed on a GD. For example, a GD or CS may use such a database to track an indication of results of local game play sessions that are part of one or more hybrid gaming sessions that are for sale and/or have been purchased by players. Once such a bonus game session has been completed, the GD or CS may then communicate the indication to an AS, and/or may provide such data to another device so that one or more other databases can be updated with the latest information.

FIGS. 7A and 7B illustrate a tabular representation 700 of an example embodiment of an available DVDs database (for example, an available DVDs database stored in a memory of a CS 305 and/or in a memory of another device). Tabular representation 700 is referred to herein as available DVDs database 700.

The available DVDs database 700 includes a number of example records or entries, including records R700-1 through R700-5, each defining a DVD that is available for purchase or that was available for purchase. Those skilled in the art will understand that the available DVDs database 700 may include any number of entries.

The available DVDs database 700 also defines fields for each of the entries or records. The fields specify: (i) a disc identifier 705 that uniquely identifies a DVD; (ii) a disc payout or redemption value 710 that indicates a payment that may be provided to a player who purchases the corresponding DVD, upon redemption of the DVD; (iii) a disc price 715 to be paid by a player upon purchase of the DVD; (iv) a bonus game rounds offered 717 entry that designates the number of predetermined additional wagering game outcomes offered to a player who purchased the DVD, which additional reel spins or bonus rounds are to be executed as local game play (in some embodiments, this data is not applicable (N/A) because the number of additional wagering game outcomes offered to a player is not predetermined, but rather is determined in another manner); (v) a date sold 720 that indicates a date and/or time on which the corresponding DVD was sold; (vi) an activation code 725 that may be provided, in some embodiments, to a player upon the player purchasing the DVD; (vii) a player identifier 730 that identifies a player who purchases the corresponding DVD (in some embodiments DVDs may be purchased anonymously and this information may not be stored); (viii) a disc status 735 of the DVD (e.g., an indication of whether the DVD is "available" for purchase or otherwise available to be provided to a player, has been "purchased" or otherwise provided to a player, or has been "redeemed" such that the redemption value of the DVD, if any, has been provided to a player); (ix) a bonus game results 740 field that indicates any payment that may be predetermined and/or provided for local game play that has already taken place (e.g. an indication of whether the local game play resulted in a payout of some amount, such as $10.00, or an indication that the local game play results are still to be determined ("TBD"); (x) a bonus game status 745 field, which entries may indicate whether a player has accepted the offer by executing the local game play ("played"), whether the local game play offer has not yet been accepted ("pending"), or whether the player did not execute local game play either within a predetermined time period ("forfeit"), or otherwise decided to redeem the DVD without executing local game play; and (xi) a total payout value 750, which may be a combination of the game disc payout 710 and any winnings resulting from the additional local game play offered to the player and executed on a local GD in a legalized gambling jurisdiction.

The available DVDs database 700 may be utilized, for example, to track DVDs available for purchase at a casino. For example, as a DVD is provided by AS 310 or otherwise made available for sale or other provision to a player, a new record may be created in the database based on the unique DVD identifier of the DVD. The redemption value associated with the DVD may also be recorded in the newly created record (e.g., the redemption value that corresponds to the DVD identifier may be received from AS 310). The status of the DVD may be set to "available." In addition, a bonus game play indicator may be set to "TBD" to indicate that the amount of additional wagering game outcomes to be offered and/or executed by the player has not yet been determined (such as the number of spins allowed on a GD located in a casino). In some embodiments, in order to find out exactly how many additional wagering game outcomes or bonus rounds have been offered, a player must travel to the casino and input a disc identifier associated with the DVD that he purchased into a GD. That GD may then be configured to determine the amount of additional wagering game play spins or bonus rounds that the player is entitled to play, and may also provide such additional game play.

In one embodiment, the available DVDs database 700 may be utilized again when a player requests to purchase a DVD. For example, the database may be queried based on the DVD identifier on the packaging of the DVD that the player desires to purchase. It may be verified that the DVD has not previously been purchased, based on the status 730 associated with the DVD in the database. Further, an activation code may be determined (e.g., by CS 305, which may generated or select an activation code for each DVD as it is sold via a POS 320) and the activation code may be recorded in the appropriate record of the available DVDs database. For example, POS 320 may communicate with CS 305 in order to determine the activation code and verify that the DVD is available for purchase.

It should be noted that an activation code may, in some embodiments, be necessary to activate a DVD (e.g., the player may be required to input the activation code when inserting the DVD into a DVD player). In other embodiments, the activation code may be necessary for redemption of the DVD but not for viewing the video presentation of the DVD. In some embodiments the activation code may be required to execute additional wagering game outcomes associated with a DVD offer.

The activation code may be printed on a receipt provided to the player for the purchase of the DVD, or otherwise provided to the player upon the DVD being provided to the player in a legitimate manner.

The DVD database 700 may also be accessed to determine if an offer or offers for additional wagering game outcomes associated with a particular DVD or group of DVDs sold within a certain time frame have been accepted (i.e. players have used a local GD to play such bonus games). DVDs may then be identified that have outstanding offers that are dose to their respective expiration dates, and casino personnel can then notify those players (if a player identifier number is available in field 730) that they are in danger of forfeiting their chance to play such additional wagering games.

The available DVDs database 700 may be accessed yet again when a player attempts to redeem a DVD (e.g., collect the redemption value associated with the DVD). For example, as described herein, it may be verified that the DVD was legitimately purchased and that the DVD has not previously been redeemed (e.g., the status associated with the DVD is "purchased"). In addition, a total payout value 750 can be reviewed and analyzed to determine the total amounts awarded to purchasers of a certain class of DVDs, for example. It would be obvious to one skilled in the art that the data stored in the available DVDs database 700 could be updated as players redeem DVDs and execute offers for local game play, and could be analyzed to determine trends or to obtain data for other purposes, as desired.

Processes

Figure 8:
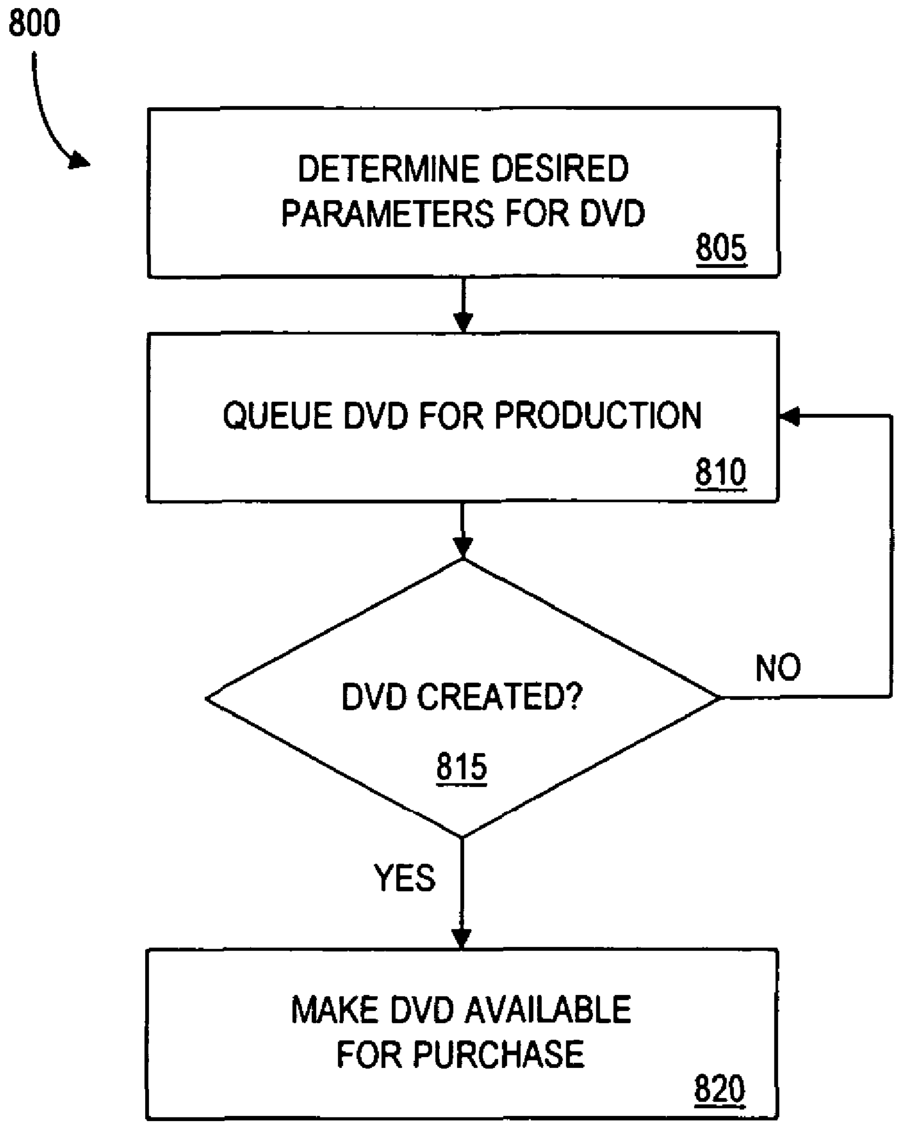
FIG. 8 is a flowchart of an example process for making a DVD available for purchase, in accordance with some embodiments described herein.

FIG. 8 is a flowchart of an example process 800 for creating a DVD. The process 800 is meant as an overview of the process of creating a DVD and does not include many detailed steps or sub-routines that may be involved in such a process.

In step 805, the desired parameters for a DVD to be created are determined. For example, an order for a DVD and/or session result data may be received. In one embodiment, some or all of the information in a session database (such as the one embodied in the example record 500 of FIG. 5) may be communicated in step 805 as an indication of the parameters of the DVD to be created.

Examples of parameters that may be determined in step 805 include, without limitation, (i) a price of the DVD (which may, in some embodiments, be the starting credit meter balance of the session based on which the DVD is to be created; (ii) a game; (ii) a gaming device; (iii) a casino; (iv) a payout schedule; (v) a strategy to be employed in making decisions on behalf of a player; (vi) an ending credit meter balance; (vii) a number of game plays or outcomes to be represented; (viii) a wager per game play; (ix) outcomes to be represented; (x) an order of outcomes to be represented; (xi) an offer or offers to play a bonus game that requires a player to go to the casino and execute such additional wagering game play by using a GD on the casino floor; (xii) advertisements, promotional or other material to be included in the video presentation to be included on the DVD; (xiii) audio to be included on the DVD; (xiv) a language preference in which the material in the DVD is to be presented; and/or (xv) one or more payouts to be represented on the DVD. It should be understood that some of the above items may be redundant with other items. It should further be understood that not all of the above-listed parameters are required to be known in order to create a DVD.

In step 810, the DVD is queued for production. For example, a record may be created in a DVD production queue. For example, a unique disc identifier may be determined and used to create a new record. At least some of the parameters determined in step 805 (and values thereof may be stored in the record. The disc identifier may be placed in a DVD production queue. A device for producing the DVDs (or at least the device performing a first step in the production process), such as AS 310, may select the DVDs to be created on a first-come-first-serve basis (e.g., based on the order submission time, based on the disc identifier, etc.).

In step 815 it is determined whether the DVD has been created. For example, it may be determined whether a record for the DVD in a DVD production queue database indicates that the production process for the DVD has been completed. It may also be determined if any offers to determine additional outcomes by local game play have been included, whether desired advertising has been provided, and/or any other desired content has been provided before deeming the DVD as being fully created.

If it is determined that the DVD has been created, the DVD is made available for purchase in step 820. For example, the DVD may be packaged in a shipment of a plurality of DVDs intended for a particular destination (e.g., a casino identified in customer identifier field of a DVD production queue database) and shipped to the destination. Otherwise, the process 815 loops until it is determined that the DVD has been created.

Purchasing a DVD

Figure 9:
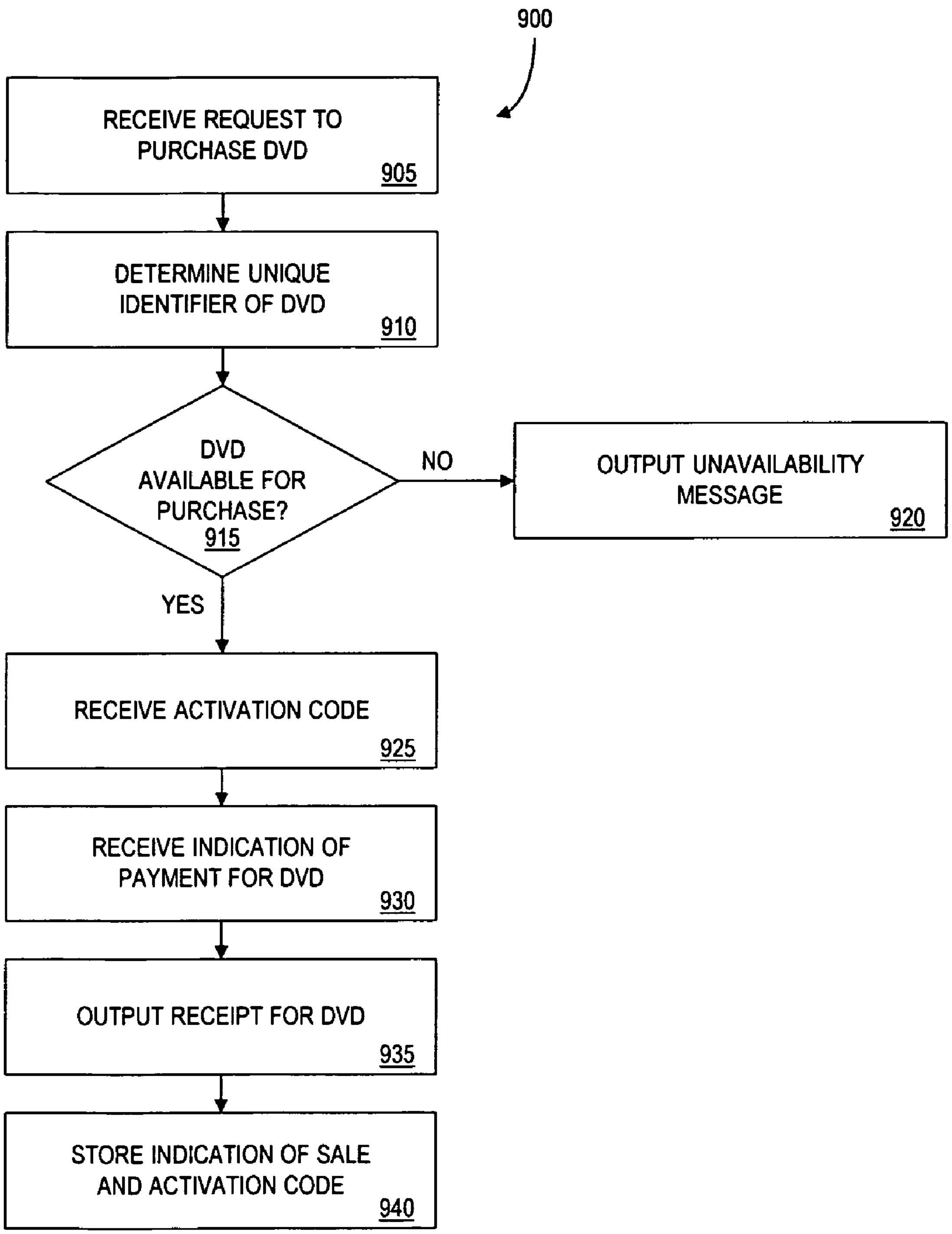
FIG. 9 is a flowchart of an example process for storing an indication of a sale of a DVD, in accordance with some embodiments described herein.

FIG. 9 illustrates a process 900 for facilitating the purchase of a DVD containing a video presentation of wagering game outcomes, or such a session in another remotely viewable form. The process 900 may be performed, for example, by POS 320.

In step 905, a request to purchase a DVD is received. For example, in one embodiment a player may select, from a display, a DVD that has recorded thereon a video presentation based on outcomes previously generated by a GD. Alternatively, the player may request that the casino attendant provide a DVD from behind a casino counter. The player may request to purchase the selected DVD. Step 905 may comprise, for example, receiving from a casino attendant into POS 320 an indication that a new transaction for the purchase of such a DVD is to be initiated. In another embodiment, step 905 may comprise receiving a request that a DVD be generated on behalf of the player. In this latter embodiment, the request may include an indication of parameters (and values thereof) defining a session based on which a video presentation is to be created and recorded onto the DVD. For example, a player may specify a game, wager amount per game play, number of game plays, and price for the session and resultant DVD.

In step 910, a unique identifier of the DVD is determined. For example, a unique disc identifier on the packaging of a DVD (or, in some embodiments, on the DVD itself) may be entered via a bar code scanner or keyboard. In embodiments in which the request for the DVD comprises a request that a DVD be generated on behalf of a player, step 910 may comprise determining or assigning a unique identifier for the DVD to be created. In one embodiment, step 910 may comprise determining a session identifier of a session associated with the DVD previously created or the DVD to be created.

In step 915, R is determined whether the DVD is available for purchase. For example, a database such as database 700 of FIG. 7 may be accessed and it may be determined whether the status of the DVD is set to "available" or other information associated with the DVD may be retrieved, based on the unique identifier received in step 915, that allows a determination of whether the DVD is available for purchase. In one embodiment, POS 320 accesses such information and determines the availability of the DVD for purchase. In other embodiments, POS 320 transmits an indication of the unique identifier to another device (e.g., CS 305), which determines the availability of the DVD for purchase and transmits an indication of the availability to POS 320. In embodiments in which the request to purchase a DVD is a request for a DVD to be created, step 915 may comprise determining whether a session as defined in the request of step 905 may be created (e.g., whether the requested combination of parameters and values thereof are approved or approvable).

If the DVD is not available for purchase, a message indicating the unavailability of the DVD for purchase is output in step 920. For example, such a message may be output to a casino attendant (who may communicate the message to the player requesting to purchase the DVD) and/or directly to the player requesting to purchase the DVD. Otherwise, the process 900 continues to step 925.

In step 925, an activation code is received. The activation code may comprise, for example, a code provided to a player upon a legitimate purchase of a DVD, to be used by the player as subsequent proof of the purchase and/or to activate a video presentation recorded on the DVD. In some embodiments, the activation code may also be used to access a bonus game at a GD located in a legalized gambling jurisdiction. The activation code may simply comprise a unique transaction identifier generated or otherwise determined by POS 320. In other embodiments, an activation code may be distinct from a transaction identifier. In some embodiments, a unique activation code may be generated at the time of a purchase of a DVD (e.g., using an algorithm created for this purpose). In other embodiments, an activation code may be selected from a list of previously generated and available activation codes. In some embodiments, an activation code may be encrypted. In some embodiments, the activation code associated with the DVD at the time of purchase of the DVD may be stored in a record of a database associated with the DVD (e.g., in association with the disc identifier and/or other unique identifier already associated with the DVD).

It should be noted that, in some embodiments, an activation code may be determined and associated with a particular DVD during the manufacturing process.

In step 930, an indication of payment for the DVD is received. For example, an operator of POS 320 may indicate an amount and form of payment received for the DVD, as is known in the art of POS operations. In some embodiments, step 930 may comprise first retrieving the price of the DVD (e.g., from a database, such as database 700, or by scanning or otherwise determining a price indicated on the DVD or packaging thereof.

In step 935, a receipt for the DVD is output. An examples of such a receipt is illustrated in FIG. 12 (described in detail below). For example, POS 320 may cause a receipt to be printed. In some embodiments, the receipt for the DVD may be e-mailed to the player or provided to the player in another electronic form. In some embodiments, the activation code may be included on the receipt. In some embodiments, and indication of a bonus game offer may be included on the receipt. A copy of the receipt may be retained by the casino or other entity that sold the DVD to the player.

In step 940, an indication of the sale of the DVD is stored, along with the activation code. For example, a database such as database 700 of FIG. 7 may be accessed and the current date and time may be stored in the date sold field. The activation code now associated with the DVD may also be stored in the record of such a database. The status of the DVD may be set to "purchased" or another similar status.

Redeeming a DVD

Referring now to FIGS. 10A to 10D, illustrated therein is a flowchart of an example process 1000 for redeeming a DVD. The process 1000 may be performed, for example, at a POS 320.

In one embodiment, a player who purchases a DVD may return to the casino at which the DVD was purchased. By presenting any or all of a (i) a disc identifier, (ii) activation code, (iii) receipt and/or (iv) valid photo identification, the player may be able to redeem the DVD for the redemption value of the DVD (typically the end credit meter balance of the session on which the DVD video presentation was based). The player may, for example, collect a redemption value of a DVD from one or more of (i) a casino attendant operating a computer device (e.g., POS 320 or CPD 325), (ii) a kiosk operable to facilitate the redemption of DVDs (e.g., by receiving a session identifier and/or other relevant information via an input device, accessing a database, and determining a final session balance or redemption value associated with the DVD) (iii) a GD, and (iv) another device. A redemption value may be provided to a player, for example, in the form of cash, voucher, gaming credit, or any other form.

In some embodiments, players may be given an incentive to return to a casino to redeem DVDs, such as an offer to play an additional round of a wagering game such as a bonus round or bonus game by using a GD located in the casino, or by offering an increased DVD redemption value (e.g., casinos may recognize that drawing customers back to their property may lead to increased gambling activity and thus increased revenues). For example, if a player is due a final session balance of $63.25, the player may be offered an amount more than the final session balance (e.g., an additional $10 either in cash or in game tokens) to redeem the DVD at the casino (e.g., rather than having a check for the redemption value of the DVD mailed to the player). In addition or in the alternative, the player may be offered additional wagering game play at a local GD.

In one embodiment, a player may redeem a DVD without returning to the casino at which the DVD was purchased. For example, a player may contact a casino after viewing a video presentation (e.g., via postal mail, phone, fax, e-mail, a form of a casino Web page, etc.) and indicate a session identifier, disc identifier, activation code and/or some other information (e.g., a home phone number) by which a casino may determine a final session balance or other redemption value due to the player. In one embodiment, the player may be given an opportunity to specify whether the player prefers to be mailed a check, to have funds transferred in some electronic manner (e.g., funds are transferred electronically to a player's financial account) or to have the redemption value provided to the player in some other manner. In one or more of such embodiments, the player may also be notified that redeeming the DVD in such a manner will result in the forfeit of any bonus game rounds and any associated winnings that may have occurred had she paid a visit to the casino and accepted the offer for such bonus game play on a local GD.

In some embodiments, a player may fail to contact a casino after purchasing a session. In one such embodiment, if a player is owed a final session balance based on the purchased session, the casino may wait a predetermined period of time after the purchase of the DVD associated with the session. If this period of time (e.g., 30 days) elapses and no contact is received from the player (e.g., the player does not return to the casino to redeem the DVD, and did not otherwise contact the casino), the casino may automatically issue any funds owed to the player (e.g., by mailing a check to a provided address, transmitting the funds to a financial account associated with the player, or otherwise making payment to the player). At this time, the casino may also notify the player of any bonus game offers associated with that DVD and, for example, give the player a deadline in which to visit the casino and play the bonus game before the offer lapses. In one example, the casino may issue a bonus game session ticket acceptable by a GD at the casino for local game play, and mail it (i.e. by using regular postal mail or email) to the player at the same time funds owed for the DVD are transmitted. In another embodiment, the casino may simply issue the funds owed the player for the DVD and notify the player that any offer associated with that DVD for additional wagering game play has been forfeited.

In some embodiments, although a redemption value greater than zero may correspond to a session purchased or provided to a player and a price may be associated with the session, the player may have not yet paid the price at the time he requests the redemption value. Accordingly, in some embodiments, the price of the session may be deducted from the redemption value. If the redemption value is greater than the price, the player may be paid the difference. If however, the redemption value is less than the price, the player may be paid nothing.

In some embodiments, a session may end with a negative balance (e.g., at the end of the session, the sum of wagers deducted from a starting credit meter balance exceeds a sum of payouts added to the starting credit meter balance). In some embodiments, such negative balances associated with the DVD may be treated similarly to a balance of zero credits; in other words, the DVD redemption value of the session may be zero. In some embodiments involving hybrid gaming session contracts, a negative balance associated with the DVD (i.e., the video presentation of wagering game outcomes) may be offset by a positive balance resulting from local game play. For example, a player inputs the disc identifier for that DVD into a local GD, and that local GD determines the number of additional wagering game outcomes (such as bonus rounds) that the player is entitled to play (for example, the GD generates a random number to determine how many spins to award the player). The player then executes the local game play portion of the hybrid session gaming contract on that GD and the result is a positive balance. In this embodiment the player may have a positive total payout value because the positive balance from the bonus rounds is greater than the negative balance associated with the video presentation.

It should be noted that, in various embodiments, a player may have an opportunity to redeem a DVD without having watched the video presentation recorded on the DVD in its entirety (or at all). For example, a player may purchase a DVD containing a video presentation, but may not have a chance to watch the video presentation before his next trip to the casino. In some embodiments, it is permissible for the player to redeem the DVD irrespective of the failure to watch the video presentation. However, in other embodiments, a player may not be allowed to redeem a DVD unless the player provides a special code output upon (e.g., during) the conclusion of a video presentation recorded on the DVD (e.g., an alphanumeric code or password is displayed during or after a final game play result is depicted).

Referring again to FIG. 10A, in step 1005 a request to redeem a DVD is received. For example, a player may approach POS 320 and provide the DVD to be redeemed (and/or packaging and/or receipt or other documentation thereof) and request the redemption value of the DVD to be provided to the player. In another example, a player may contact a casino or other entity that facilitates the redemption of purchased DVDs in another manner (e.g., via telephone, e-mail, the Internet, postal mail, etc.) to request the redemption of a DVD.

In step 1010, a unique identifier of the DVD is determined (e.g., based on information provided in the request to redeem the DVD). For example, a disc identifier located on packaging of the DVD may be scanned in or typed in by a casino attendant (in such embodiments a player may be required to provide the DVD, or at least the packaging thereof, when redeeming the DVD).

In step 1015, a receipt code is received. For example, an activation code printed on the receipt may be received. In another example, a unique receipt identifier uniquely identifying the receipt and/or transaction in which the receipt was issued is received. For example, a casino attendant may scan or type in the code. That is, in some embodiments a player may be required to provide a receipt (or copy thereof) for the purchase of a DVD when requesting to redeem the DVD. In some embodiments in which the code received in step 1015 is an activation code, the activation code for a DVD may have been provided to a player in a manner other than being printed on a receipt (e.g., it may have been provided to a player via e-mail, via another printed document, verbally, etc.). Accordingly, in some embodiments in which an activation code is required to redeem a DVD, step 1015 may comprise receiving the activation code in any manner desired and practicable and not necessarily via a receipt (in which case a receipt may or may not be required to redeem the DVD).

In step 1020, it is determined whether the DVD has been legitimately purchased. For example, a database or other memory structure storing information about DVDs previously purchased may be accessed. For example, the database 700 of FIG. 7 may be accessed and it may be verified that the disc identifier and activation code correspond to one another in the database and, further, that the status of the DVD corresponding to the disc identifier is currently "purchased." In one embodiment, POS 320 or another device performing the redemption process (e.g., a kiosk of a casino) may communicate with a device storing such information (e.g., CS 305). In one embodiment, the POS 320 or other device performing the redemption process may be operable to determine whether the DVD was legitimately purchased by accessing such a database and verifying certain information. In another embodiment, the POS 320 or other device performing the redemption process may forward the information to another device (e.g., CS 305) storing information useful in verifying the legitimate purchase of the DVD and determine that the DVD was legitimately purchased upon receiving an authorization message or indication from this other device.

If it is determined that the DVD was not legitimately purchased, a message indicating an inability to redeem the DVD is output in step 1030. For example, a message indicating that the system is "unable to confirm previous purchase" may be output (e.g., to a payer attempting to redeem the DVD and/or to a casino attendant facilitating the redemption process, who in turn may communicate this information to the player) and the redemption of the DVD may be denied. Otherwise, the process 1000 continues to step 1025.

In step 1025, it is determined whether the DVD has previously been redeemed. This step may be performed to prevent "double dipping" or at attempt by a payer to redeem a DVD more than once. For example, an appropriate database may be accessed (e.g., such as the database 700 depicted in FIG. 7) to determine whether the status of the subject DVD is set to "redeemed" or to another status indicating that the DVD has previously been redeemed (or if a previous successful redemption of the DVD is otherwise stored in a memory). In one embodiment, POS 320 or another device performing the redemption process (e.g., a kiosk of a casino) may communicate with a device storing such information (e.g., CS 305). In one embodiment, the POS 320 or other device performing the redemption process may be operable to determine whether the DVD has previously been redeemed by accessing an appropriate database and confirming whether information stored in the database indicates that the DVD has previously been redeemed. In another embodiment, the POS 320 or other device performing the redemption process may forward information to another device (e.g., CS 305) storing information useful in determining whether a DVD has previously been redeemed and determine that the DVD has not previously been redeemed upon receiving an authorization message or indication from this other device. In some embodiments, the determinations of steps 1020 and 1025 may be performed in a single step and/or by a single device.

If it is determined that the DVD has already been redeemed, a message indicating an inability to redeem the DVD is output in step 1030. For example, a message indicating "previously redeemed" or another appropriate indication may be output (e.g., to a payer attempting to redeem the DVD and/or to a casino attendant facilitating the redemption process, who in turn may communicate this information to the player) and the redemption may be denied. Otherwise, the process 1000 continues to step 1035.

In step 1035 it is determined whether any bonus round play was offered with the DVD. Such bonus round play includes the examples discussed herein concerning the offer or offers for additional wagering game play (such as additional reel spins or bonus rounds) that a player may accept by using a local GD, for example, on the gaming floor of a casino. If bonus round play was not offered, then in step 1040 of FIG. 10B the redemption value of the DVD is determined. For example, a record of a database associated with the DVD may be accessed and the redemption value may be read from the database. In some embodiments, the redemption value may be encoded on the DVD itself and/or packaging thereof and/or on a wagering game receipt and may be read therefrom (e.g., in addition to or in lieu of accessing a database storing such information). Next, in step 1045 the redemption value is provided to a player.

As described, a redemption value may be provided to a player in many different forms and in a variety of different manners, such as in cash handed to the player by a casino attendant or dispensed from a kiosk. In another example, a cashless gaming receipt that may be redeemed at a casino booth or be used for wagering at a GD may be provided, the value of the receipt being based on the redemption value. In yet another example, a check may be mailed to a player. In another example, an electronic and/or financial account associated with the player may be credited based on the redemption value. In some embodiments, a redemption value may correspond to a physical prize to be provided to the player (e.g., a coupon, piece of jewelry, discount booklet, gift certificate or other tangible item). In such embodiments, step 1045 may comprise authorizing a casino attendant to provide the prize to the player.

Step 1045 may further comprise storing an indication of the successful redemption of the DVD in a memory (e.g., a status field of the database 700 of FIG. 7 may be set to "redeemed"), to prevent the player from redeeming the DVD a second time. Alternatively, such a step of storing an indication of the successful redemption of a DVD may be a distinct step of process 1000.

Figure 10A:
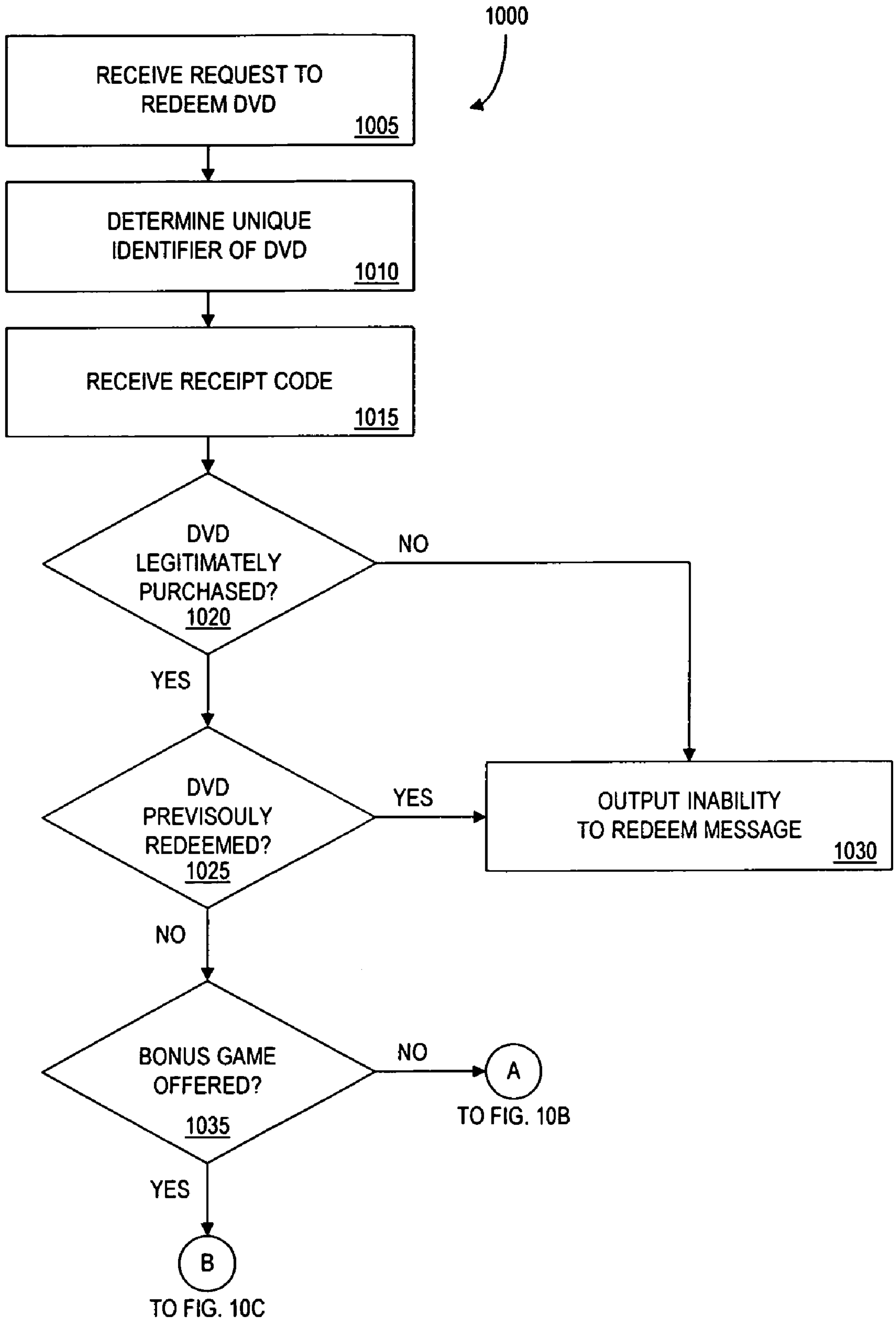
FIGS. 10A, 10B, 10C and 10D represent a flowchart of an example process for providing a payment corresponding to a DVD redemption value and any bonus game winnings, in accordance with some embodiments described herein.
Figure 10B:
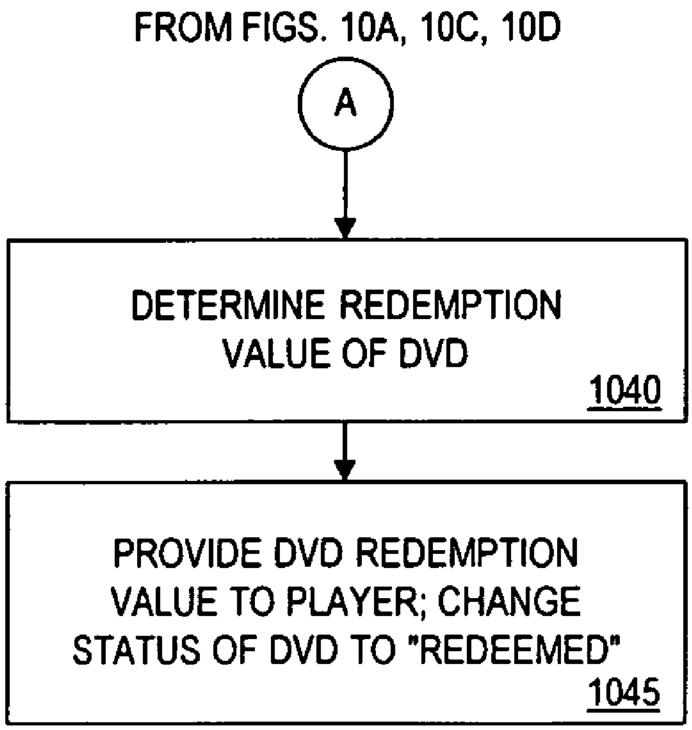
Figure 10C:
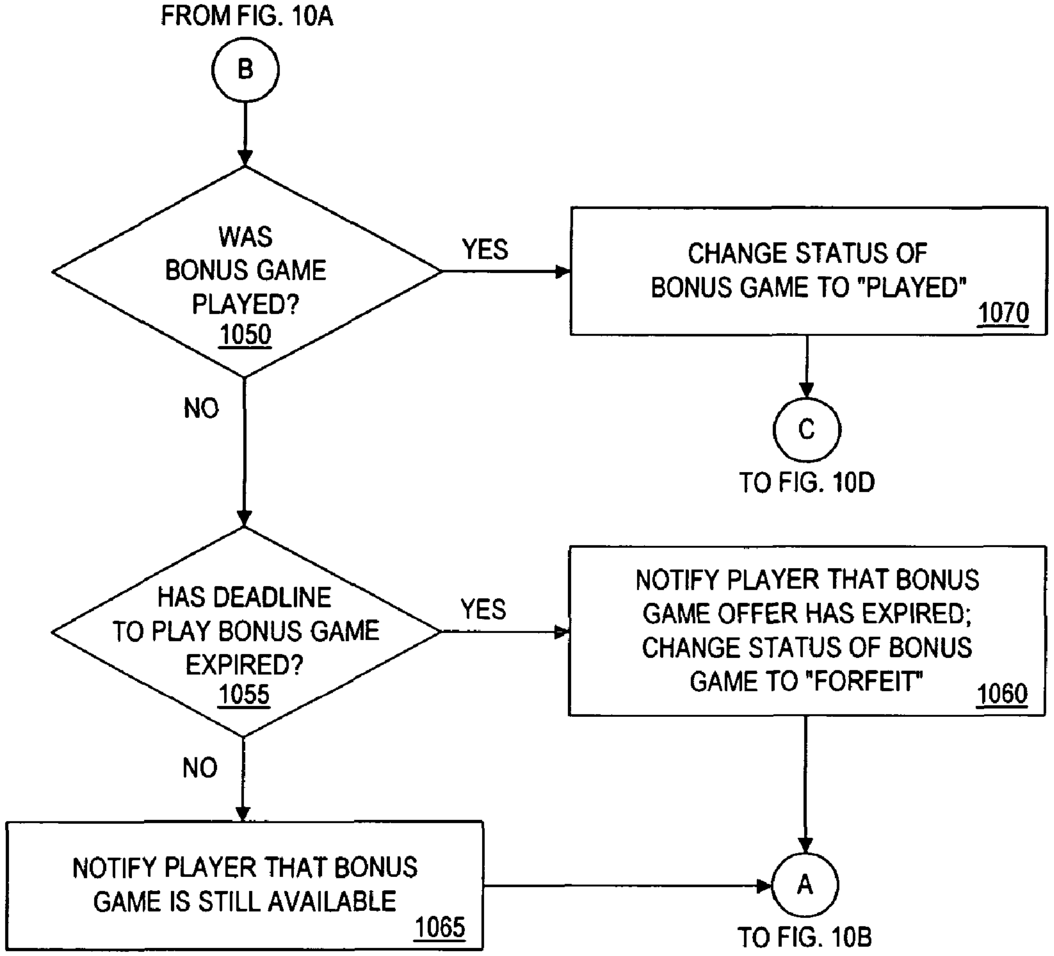
Figure 10D:
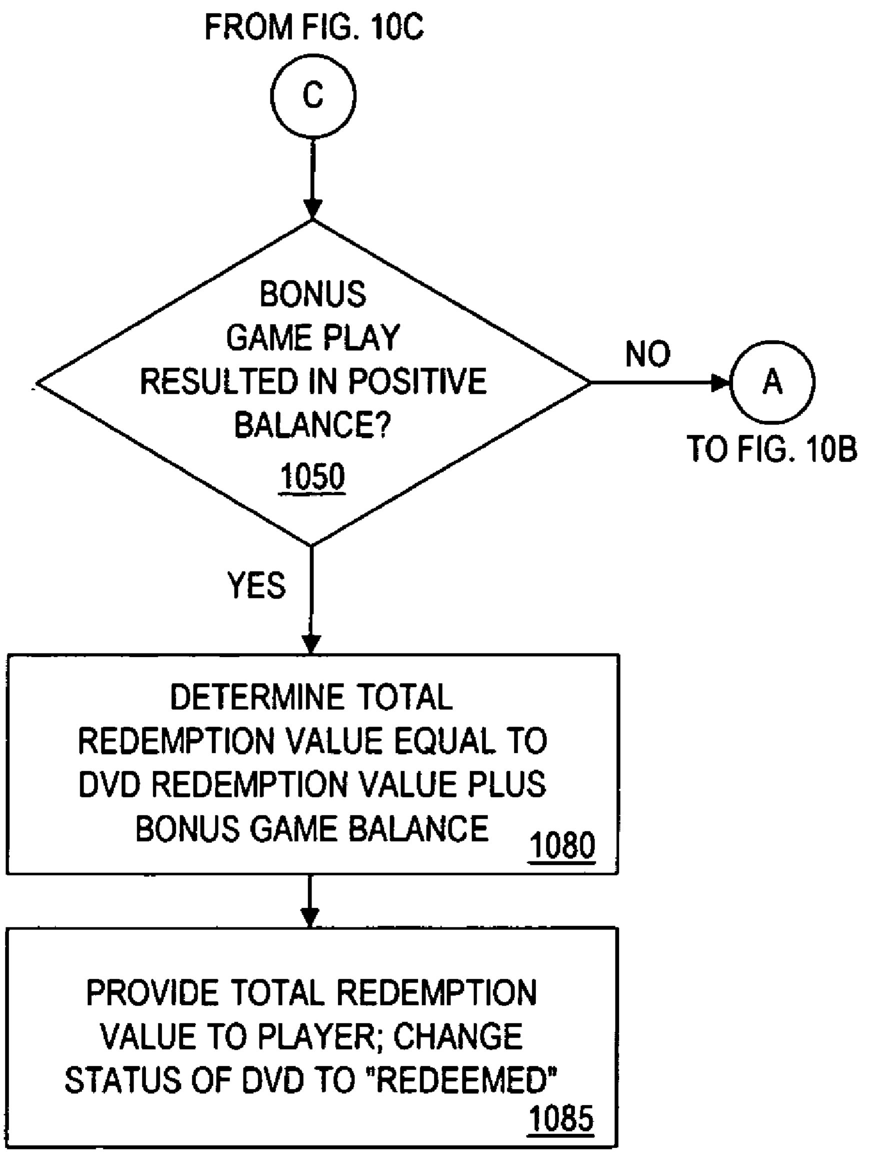

Again referring to step 1035 of FIG. 10A, if a bonus game was offered, then the process proceeds to step 1050 of FIG. 10C wherein it is determined whether the bonus game was played. If not, the process proceeds to step 1055 where it is determined whether any existing deadline to play the bonus game expired. If the deadline did expire, then in step 1060 the player may be notified and the bonus game status is changed to "forfeit" (e.g., a status field of the database 700 of FIG. 7 may be set to "forfeit"), and the process proceeds to steps 1040 and 1045 shown in FIG. 10B as described above. If in step 1055 it is determined that the deadline for playing the bonus game has not expired, then in step 1065 the player is notified that the bonus game is still available, and the process proceeds to steps 1040 and 1045 shown in FIG. 10B as described above.

In some embodiments, in step 1065 the player would not only be notified that the bonus game is still available, he would be warned that if he proceeds with the DVD redemption process without first accepting the offer to play the bonus game then he will forfeit his entitlement to such additional wagering game outcomes. The player may be notified in step 1065 of the availability of the bonus game by a casino representative, or by mail, or by email, or by a display associated with a kiosk, or by a display associated with a POS device, or by a display of a GD, and the like. Alternatively, in step 1065, the player may be issued a bonus game play ticket, or bonus game play code, or other bonus game play voucher that represents the unplayed wagering game outcomes (i.e. the bonus game), and such a bonus game play voucher may be configured for input to a local GD to obtain the bonus game play. Such a bonus game play voucher may or may not have an associated deadline for executing the local game play.

Returning again to FIG. 10C, if in step 1050 it is determined that the bonus game was played, then the process proceeds to step 1070 wherein the status of the bonus game is changed to "played" (e.g., a status field of the database 700 of FIG. 7 may be set to "played"), or the status field may be changed in another manner, for example, a number may be input that indicates the amount of any winning outcomes obtained by the player. Next, the process moves to step 1075 shown in FIG. 10D wherein it is determined whether the bonus game play resulted in a positive balance (i.e. if the player won any money, award or prize). If a positive balance did not result from playing the bonus game, then the process continues to steps 1040 and 1045 shown in FIG. 10B wherein the DVD is redeemed as described above.

Again referring to FIG. 10D, step 1075, if the bonus game play did result in a positive balance, then in step 1080 a total redemption value that is equal to the positive balance plus the DVD redemption value is calculated. In some embodiments, a centrally-accessible database may be accessed to obtain the amount of credits or currency payable to a player as a result of bonus game play, so that the amount of credits and/or currency may be considered when calculating a total hybrid gaming sessions contract balance associated with a remote session gaming (i.e. the player views a video presentation of wagering game outcomes on a DVD) and local game play (i.e. the player executes game play on a GD at the casino). For example, the purchase receipt given to the player may include one or more barcodes that may be scanned by a representative using a casino personnel device, and a display screen of the casino personnel device displays (i) an amount of credits payable from remote play (e.g., 75 credits payable from the DVD), (ii) an amount of credits payable for local game play at a GD (e.g., 125 credits won from one or more bonus rounds), and/or (iii) a total amount of credits payable to the player for both local and remote play (e.g., a final hybrid gaming session balance). The total amount of credits payable to the player may also then be entered into a database (such as the database 700 of FIG. 7). Next, in step 1085, the total redemption value or total payment is then provided to the player, and the DVD status is changed to "redeemed" (as explained above with regard to step 1045 of FIG. 10B).

Gaming Tickets and/or Wagering Game Receipts

Figure 11A:
FIGS. 11A, 11B and 11C illustrate examples of a cashout ticket, a video ticket, and a results ticket, respectively, that may be output in accordance with some embodiments described herein.
Figure 11B:
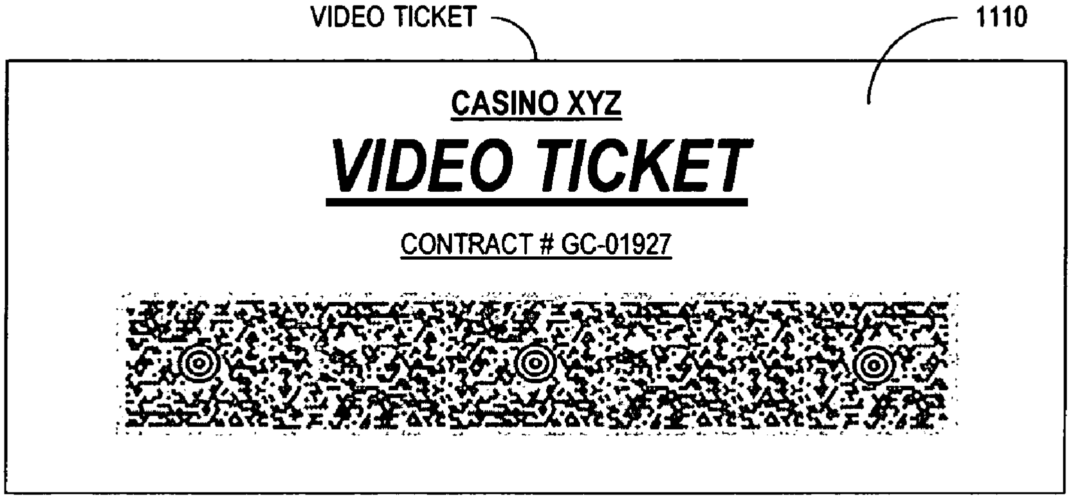
Figure 11C:
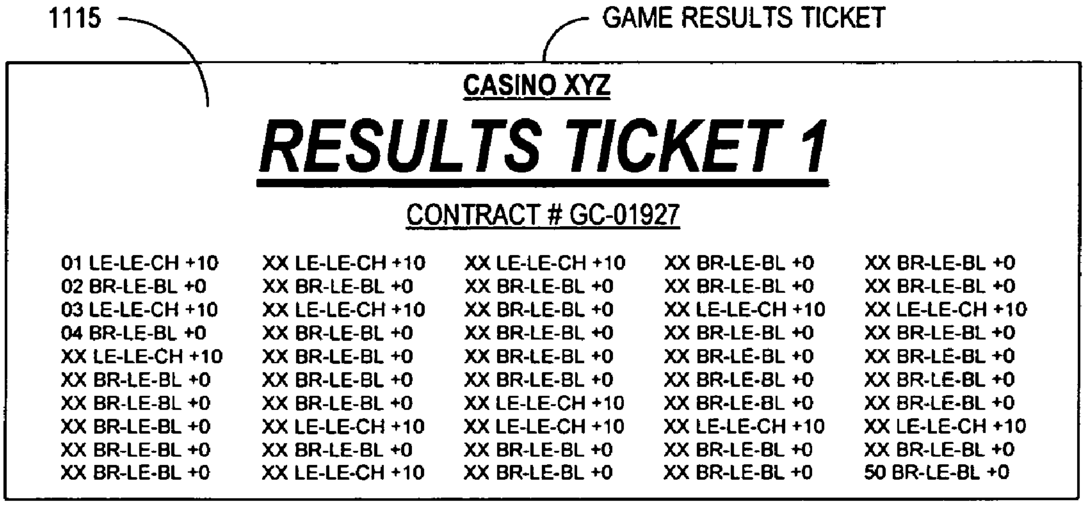

Referring now to FIGS. 11A, 11B and 11C, illustrated therein are three distinct examples 1105, 1110 and 1115, of tickets that may be printed by a GD, each ticket having an indication of a result of a session printed thereon. A ticket such as one of the three tickets 1105, 1110 and 1115 may be printed, for example, for auditing purposes, placed in a DVD jewel case for a player to use to redeem a payment associated with the DVD, and/or used to provide an indication to a device (e.g., AS 310) of one or more outcomes of a session, the latter for purposes of creating a video representation of the outcomes for recording onto a DVD. Such tickets are referred to as "session results tickets" herein, as they typically store an indication of one or more results (e.g., payouts, sum of payouts) of a session.

Of course, a session results ticket may store an indication of other information associated with a session as well, such as an indication of one or more parameters defining a session and/or values thereof. Examples of such other information include, without limitation, (i) an end credit meter balance of the session; (ii) a price of the session; (iii) a beginning credit meter balance for the session; (iv) a number of outcomes generated for the session; (iv) a player associated with the session; (v) a casino attendant associated with the session; (vi) a time and/or date at which the session was initiated and/or completed; (vii) a gaming device at which the session was conducted; (viii) a game for which the outcomes of the session were generated; (ix) a casino at which the ticket was generated and/or is redeemable; (x) a bonus game offer to play additional wagering game spins or rounds, and the type of game and GD to be used in order to benefit from the bonus game offer; and (xi) a unique session identifier associated with the ticket.

In some embodiments, an authorized person (e.g., casino employee) may specify that a GD print a conventional "cashout ticket" 1105 indicating a balance of credits and/or currency at the conclusion of the execution of a session.

In one or more embodiments, an indication of a result of a session may be printed in an encoded or encrypted form or a form that is readable by a device but not easily discernable by a person. For example, a high-density barcode (e.g., see video ticket) may encode a result of a session. Such encoded data may then be used to render a video presentation of outcomes, which may be viewed remotely by a player who has purchased a DVD on which outcomes representative of the result of the session are recorded. For example, text, numerals or other symbols or indicia stored within a session database (e.g., a series of outcome identifiers) may be encoded such that they are represented graphically by a barcode such as a high-density barcode.

In some embodiments, various parameters or settings of a GD and/or session may be set to "default" (e.g., a GD automatically prints a cashout ticket, video ticket and game result ticket upon the conclusion of an executed session). In some embodiments, an authorized person (e.g., a casino employee executing the session or causing the GD to execute the session) may alter one or more of these parameters from the default sessions. In other embodiments, such an authorized person may not be authorized to alter certain settings.

In some embodiments, an entity (e.g., an operator of a AS 310) may determine session result data from a session results ticket. For example, if the session results ticket includes an indication of a session result encoded in barcode form, the session result may be determined by scanning a barcode of a session result ticket (e.g., such as the bar code of example session results ticket 1115. Such a barcode may encode, for example, a session identifier, a series of outcome identifiers and one or more associated GD identifiers.

In one embodiment, a device (e.g., AS 310) may comprise software to create a video representation of outcomes for recording onto a DVD based on session result data, such as may be determined from a session results ticket. For example, AS 310 may receive session result data associated with a session in a manner such that AS 310 need not communicate via an electronic network with a casino for purposes of obtaining such session result data, but may rather be operable to receive session result data via session result tickets. The AS 310 may be further operable to assemble video representations of outcomes based on such tickets and supply such video representations (e.g., in the form of DVDs on which such video representations are recorded) to players and/or casinos for subsequent sale to players.

FIG. 12 illustrates an example of a wagering game receipt 1200 that may be provided to a player upon a purchase of a DVD by the player. The receipt 1200 includes a name of a casino (in area 1205) that may indicate the casino at which the DVD was purchased, the casino at which the DVD may be redeemed, and/or the casino at which the session upon which the outcomes represented on the DVD were generated.

Area 1210 includes a printed message informing the player that the receipt 1200 must be presented in order for the corresponding DVD to be redeemed, as is consistent with some embodiments described herein. The receipt 1200 also includes (in area 1215) an indication of the date and time at which the DVD was purchased. Area 1220 of the receipt includes an indication of session information describing various parameters (and values thereof) defining the session upon which the DVD video presentation is based. For example, the example session information indicated on receipt 1200 is the name of the casino (e.g., casino at which the DVD was purchased, at which the DVD may be redeemed and/or at which the outcomes represented on the DVD were generated), the game for which the outcomes represented on the DVD were generated (Double Diamond), and an indication of the wager per game play (25 cents—2 coin) posted for each game play represented on the DVD. Of course, different and/or additional session information may be indicated on such a receipt. In addition, an indication 1222 that a bonus game offer was included with the DVD may be printed on the receipt in human readable and/or in machine readable form.

Printing a readable bonus game offer indication 1222 on the wagering game receipt 1200 may be advantageous because it may serve as a reminder to the player to execute the offered local game play. The bonus game offer indication 1222 may also remind the player, when she is ready to collect the redemption value for the DVD, to visit the casino and use a local GD to execute the bonus game play that she is entitled to. Casino representatives may also be trained to review the wagering game receipts when presented to them, and to ask the player if she took advantage of the bonus game play. If the player responds that she did not engage in any such bonus game play, the casino representative may be trained to react in any of several manners. For example, the bonus game indication 1222 printed on the wagering game receipt shown in FIG. 12 recites: "Bonus Game Offer Y", which may be a code recognizable to the casino representative (i.e. the offer comprises three spins of electronic game machine Y, which is a bonus game-only GD near the west side cashiers booth on the gaming room floor). The casino representative can thus encourage the player to play the bonus game and offer to lead her to the GD. In addition, or alternately, the casino representative may offer to provide a bonus game voucher to the player so that she can redeem the DVD by surrendering the wagering game receipt 1200, but still play the bonus game by using such a bonus game voucher at a local GD. In another embodiment, the casino representative may warn the player that redeeming the DVD before playing any offered bonus game will result in forfeit of the bonus game play.

The receipt 1200 also includes additional data (in area 1225) that may comprise encoded information and/or human readable information corresponding to the DVD and/or session (e.g., a redemption value, POS and/or casino attendant associated with the sale, session and/or DVD type, price of the DVD, etc.). A disc activation number in area 1230 may appear in both bar code and human readable form. The disc activation number may comprise, for example, a disc activation code as described herein.

The receipt 1200 also includes a signature line (in area 1235) that may comprise a line on which a player may be required to sign her name upon redeeming a DVD (e.g., as a measure preventing the player from claiming that the player has not redeemed the DVD and/or to discourage the player from attempting to re-use the receipt to again redeem the DVD). Another line and/or boxes may be included in area 1240 to be filled in by a casino attendant and/or a player upon a DVD being redeemed. For example, information relating to the authorization of the redemption, the date and/or time of the redemption, and/or the signature of the casino attendant facilitating the redemption may be filled in.

The receipt further includes a prize claim code (in area 1245). The prize claim code may comprise, for example, a barcode and/or a serial number that corresponds to a location to find pertinent information stored in a database. For example, the barcode may be scanned to obtain a prize claim code that may be a pointer to a record of a database that stores an indication of the redemption value of the DVD. In some embodiments, the prize claim code may comprise a disc identifier and/or a session identifier, as these are described herein.

ADDITIONAL DESCRIPTION OF SOME EMBODIMENTS

In some embodiments, after a player has purchased a hybrid gaming sessions contract, an opportunity may still exist for elements of randomness, player selection and/or player skill to be involved while game results are viewed remotely. In other words, in some embodiments, not all game results and/or payouts associated with a DVD may be predetermined and/or generated in advance.

For example, in some embodiments, as described, a player may purchase a DVD, and watch indications of game results associated with the DVD in a location remote from a GD and/or the computer on which the game results were executed or simulated (e.g., the player watches the DVD at home, in a hotel room, and so on). Thus, in some embodiments, an opportunity may exist for elements of randomness, player selection and/or player skill to be involved during or after indications of game results are viewed via such a DVD.

For example, in one or more embodiments, a DVD may comprise a plurality of indications of game results that a player may view and/or collect any winnings associated therewith. However, in some embodiments, a DVD may alternately or additionally comprise one or more game results and/or payouts that require an additional element of randomness or skill for a player to attain. In one specific example, a game disc may comprise 500 predetermined indications of game results, all of which a player may view and/or collect any winnings associated therewith. Such a game disc may additionally comprise a plurality of game results and/or payouts that may require an additional element of randomness or skill for a player to attain. For example, a disc comprises 500 "hidden," "inactive" "standby" and/or "locked" indications of game results or payouts, which a player may or may not be entitled to view and/or collect winnings associated therewith, unless the player activates, locates, unlocks, provides payment for, chooses or otherwise obtains the right to benefit from such game results or payouts. A variety of methods by which players may obtain the right to benefit from such game results or payouts (e.g., via any one or more of randomness, player selection and/or skill) will now be described.

In one example, a game disc may offer an interactive bonus round during which a player may indicate, select or otherwise choose a game element, and a game result and/or payout may be accessed or otherwise determined based on the choice. For example, a player may view a slot machine-themed game disc in DVD format, and a particular indication of a game result may reveal that a player is eligible for a wagering game bonus round (e.g., animated reels spin are displayed and resolve to a "Bonus-Bonus-Bonus" indication). Accordingly, a player may be presented with an opportunity to select an element in such a bonus round such that a game result and/or payout may be determined based on the selection. For example, a player may be presented with a screen similar to a DVD menu screen, in that a player may utilize an input device of a DVD player (e.g., arrow keys and/or an enter key of a remote control) to select a particular element for viewing. For example, a player may be shown a screen of a plurality of numbered gift boxes from which a player select one. Based on the player's selection (e.g., the player uses the arrow keys of a DVD remote control to highlight a particular box to choose, and then presses an enter button to choose the box), a particular game result and/or payout stored on a game disc may then be accessed. For example, a player may choose a particular numbered box, and the selection of the box may represent the selection of a particular chapter or track of a DVD which may then be shown to a player, the chapter or track presenting a particular indication of a game result and/or payout. For example, a player's selection of "Box #1" may instruct a tracking and/or optical mechanism of a DVD player to access a chapter or track that features an animated and/or static presentation of the contents of Box #1 (e.g., a chapter or track is shown that depicts an audio and video presentation of a box opening to reveal 125 credits). Of course, it should be understood that players may select various other game elements or indicia other than boxes so as to select or determine a particular game result and/or payout, including but not limited to selecting reels, symbols, cards, characters, locations, numbers, words, shapes or other objects.

In some embodiments, such a selection of a bonus round element may result in an increase in a player's credit balance. For example, a player may have accumulated a first amount of credits (e.g., 175 credits) before such a selection is made, and after the selection, a player's credit balance may increase by one of several predetermined amounts (e.g., depending on which of four boxes the player chooses, a player's credit balance may increase by one of four possible payout amounts), such that a second credit balance may then be output to a player. A variety of methods of outputting such a second credit balance are contemplated. In one embodiment, any bonus selections to which a game disc player may be entitled may occur after any predetermined indications of game results have been viewed. For example, a player may have purchased a 500-spin game disc, and the player may have viewed all 500 slot machine spins, such that a player has accumulated a credit balance of 175 credits. The player may then be entitled to one or more bonus rounds involving a selection as described (e.g., each game disc may comprise a predetermined number of bonus rounds which a player may play at the end of a disc). After making a selection of such a bonus game, it may be determined that a player is entitled to an additional amount of credits, such that a total amount of credits owed to the player may increase. Accordingly, because a first balance of credits achieved by viewing previously-generated indications of game results may be predetermined (e.g., it is known before any player even purchases a game disc that a credit balance will be 175 after 500 game result indications have been viewed), and the number of options a player may select during one or more bonus games may be finite (e.g., each of four bonus rounds comprises four possible payout amounts), it may be relatively easy to facilitate displaying a second credit balance to a player. For example, continuing with the above hypothetical situation in which a first credit balance is 175 and a player may earn one of four possible payout amounts by selecting a box of a bonus round, after the player has made a selection, one of only four possible second credit balances may be shown to a player. Therefore, in such an example, a game disc may store four indications of such second credit balances, such that an appropriate indication may be accessed and output to a player after a selection has been completed. Such indications of second credit balances may be stored in a variety of formats, as described previously with respect to storing indications of game results on a game disc (e.g., four different media files depicting indications of a second credit balance are stored on a game disc, and a proper media file is accessed based on a player's selection). Such a process of (i) determining a first credit balance, (ii) determining a selection of a bonus element, (iii) determining a game result and/or payout amount based on the selection, and (iv) determining a second credit balance to be indicated may continue until a player has completed any available bonus rounds. For example, as a result of a first bonus round selection, a player may have achieved one of four possible second credit balances. Then, as a result of a second bonus round selection, a player may achieve one of 16 possible third credit balances (e.g., four possible second credit balances multiplied by four possible third credit balances). Thus, in some embodiments, such a game disc may comprise a plurality of media files stored in a "pick-a-path" navigation format, such that selecting one particular media file for viewing yields various secondary media files which may then be viewed, and so on. An example of a DVD in such a format is the "Scourge of Worlds" interactive DVD distributed by Rhino Entertainment (e.g., the DVD offers "900 possible story combinations"). Of course, variations of the above embodiments are contemplated. For example, a first and second game disc may comprise different numbers of bonus games (e.g., depending on associated game result data, a first previously-generated automated game session yielded four bonus-triggering outcomes, whereas a second previously-generated automated game session yielded five bonus-triggering outcomes). In another example, such selections of bonus round elements may be performed by a player before any or all indications of previously-generated game results have been viewed. For example, after accumulating a first credit balance, and selecting a bonus element so as to achieve a bonus payout and second credit balance, the player may continue viewing previously-generated indications of game results such that the second credit balance may then be further adjusted.

Various alternate or additional methods are contemplated for involving elements of randomness, player selection and/or player skill during or after indications of game results are viewed via a game disc. For example, in some embodiments, each time a game disc outputs an indication of a "bonus-triggering" game result, a code may additionally be output. In another example, one or more of such codes may be output at the conclusion of a game disc, or at any other time. A player may then utilize the code or codes to select one or more choices of a bonus game provided by some other medium.

For example, a player may access a Web site and provide such a code (e.g., enter the code in an appropriate form and click on a "submit" button). The player may then be presented with a Web page enabling the player to select one or more choices of one or more bonus games (e.g., the player clicks on one of four boxes, each box concealing a bonus amount of credits that a player may win). As described, the player may earn one or more payouts in association with such bonus games. Accordingly, indications of such payouts may be output and/or stored in a physical and/or electronic format. For example, in one embodiment, a player may be able to print a page using a home computer, the page comprising (i) a written indication of a number of credits and/or currency the player has won (e.g., "You won 150 bonus credits!"), and/or (ii) one or more indicia representing a number of credits and/or currency a player has won. For example, such a printout may comprise a barcode and/or a numeric or alphanumeric code encoding a number of credits or cash winnings that a player may be entitled to claim (e.g., "WN1867-293-NH" represents 150 credits). Thus, a player may provide such a printout (e.g., when redeeming any winnings associated with a game disc) at a casino or other location to claim any bonus winnings. For example, the player may provide a printout, a barcode of which may be scanned to determine bonus winnings payable to a player, along with a game disc, packaging thereof and/or a purchase receipt. The packaging, game disc, and/or the receipt may include one or more barcodes that may be scanned to determine a final session balance due to a player.

In another example, rather than directly encode an amount of bonus credits and/or winnings payable to a player, a barcode and/or numeric or alphanumeric code associated with such a printout may encode an identifier (e.g., a "bonus session identifier"), such that a database may be accessed to determine a payable amount of credits and/or winnings due to a player. Thus, in addition or as an alternative to enabling a player to utilize such a printout, an amount of credits and/or winnings payable to a player as a result of such an online bonus game may be stored in a database, such that the database may be accessed when a player attempts to claim the credits and/or winnings. For example, in some embodiments, a player may have provided a player identifier when accessing such a Web site (e.g., the player enters a player tracking number by reading his card and typing the number into a form of a Web page), such that the amount of bonus credits and/or winnings payable to the player may then be stored in association with a player identifier. In this manner, a player may simply identify himself (e.g., by providing a player tracking card and/or photo identification at a desk or booth located within a casino) in order to receive any bonus credits and/or winnings due the player.

In another example, a code may be output in conjunction with a "bonus-triggering" game result of a game disc (but a "bonus code" may be output at any other time), and a player may be provided with a telephone number (e.g., an "800" number is provided on game disc packaging). The player may then (i) call the number, such that the player may then be issued a series of voice prompts via an interactive voice response unit (IVRU), (ii) enter the code as indicated by the game disc (e.g., using a touch-tone phone), (iii) be provided with audio options for selecting a particular bonus game or other gambling game element (e.g., a box, a set of reels, etc. may be selected by entering a number via a touch-tone phone), and (iv) receive results based on the selection (e.g., "you won 150 credits"). As described, such credits and/or winnings payable to a player may then be stored in a database for purposes of facilitating redemption (e.g., within a casino). Alternately or additionally, an IVRU may output a code with a player may write down, such that the code may be used when redeeming the credits and/or winnings.

As explained above, in some embodiments, a game disc may comprise one or more indications of game results which a player may or may not be entitled to view and/or collect winnings associated therewith, unless the player obtains the right to benefit from such game results or payouts. In some embodiments, the granting of access to such indications of game results may be determined in a random manner, or by a combination of randomness and player choice. For example, in some embodiments, a player may have purchased a game disc entitling the player to 500 animated slot machine spins. However, more than 500 indications of game results may be stored on the disc (e.g., 700 or more are stored on the disc). Accordingly, the 500 indications of game results that the player may view may be determined in a random manner (e.g., each time a player is to view an indication of a game result, a random indication of a game result is selected from a pool, and accordingly that particular game result indication is removed from the pool such that it may not be accessed again). In another example, a player may achieve a bonus-triggering game result indication (e.g., such as "Bonus-Bonus-Bonus"), and therefore the player may receive one of several possible bonus payout amounts (e.g., a payout amount or game result is randomly selected from a pool). Should a game disc be provided in DVD format, various methods of randomly determining and outputting DVD content are well known. For example, the commercially-available DVD game SceneIt™, marketed by Screenlife, LLC of Seattle, Wash., uses such technology. Useful technology is additionally described in U.S. Patent Application No. 2004/0022520 to Kinzer et al., filed May 13, 2003, entitled "DVD Random Shuffle Method," the entirety of which is incorporated herein by reference for all purposes.

In other embodiments, a separate device or physical accessory may be utilized to determine a game result in a random manner. For example, a player viewing a game disc may achieve a bonus-triggering game result indication (e.g., such as "Bonus-Bonus-Bonus"), and a separate device may then be actuated to generate a game result in a random manner. Various methods of actuating such a separate device are described herein (e.g., a personal computer outputs a signal to a separate device via a USB connection, a separate device receives an encoded audio signal from a television and decodes the signal, and so forth). In one example, a physical wheel device may be actuated to spin and land randomly on one of several possible game results, each indicating a payout. Of course, a variety of other separate devices may determine such game results or payouts in a variety of manners. For example, a separate device comprising a video screen may randomly determine a bonus round game result and output such a game result via the video screen.

Of course, in order for players to benefit from such game results generated by separate devices, an indication of the game result and/or payout achieved must be made available when a player attempts to redeem such winnings. A variety of examples or making such game results data (e.g., payout data) available are contemplated. For example, in some embodiments, such a separate device may communicate electronically with one or more databases (e.g., a separate device transmits data via a USB connection to a client computer, such that the data may then be transmitted to a centrally-accessible database for storing such game results). In other embodiments, such a separate device itself may store such game result data (e.g., in a database) such that the device itself may be utilized when determining payouts due to players (e.g., such data is accessed via a communications port of the separate device). In further embodiments, such a separate device may comprise a printer, such that game result data may be output via a substrate (e.g., the printer prints a piece of paper comprising a barcode, which may be scanned by a casino agent to determine a payout due to a player).

In some embodiments, the granting of access to such indications of game results may be determined based on player skill. For example, a player may receive an opportunity to play a game of skill so as to attain access to one or more otherwise inaccessible game result indications. For example, a player of a game disc may be presented with a trivia question, and if the player answers the question correctly, the player may attain the right to view and/or benefit from an indication of a game result (e.g., the player receives an extra slot machine spin). In other embodiments, a player may exercise skill not to gain access to such indications of game results, but rather in some other manner. For example, a player may purchase a remote gaming contract by which the player is to receive 500 video draw poker hands. The player may then access an Internet site from a remote location so as to view indications of 500 starting hands provided to the player, and the player may use the Web site to execute a plurality of hold/discard decisions associated with each hand. However, in some embodiments, the player must then return to a legal jurisdiction to view the final game results (e.g., the 500 final hands), which may then have been determined based on a combination of randomness and player skill.

In further embodiments, a player may purchase a right to view and/or to benefit from one or more such "hidden," "locked" or "standby" indications (e.g., in addition to purchasing a game disc or providing any other previous payment associated with a gaming session). For example, a player may purchase a"500-spin" game disc, entitling the player to view and/or benefit from 500 predetermined indications of game results. However, such a disc may additionally include one or more "standby" game result indications that a player may view and/or benefit from after the initial 500 indications have been viewed. For example, after the initial 500 indications have been viewed, the player may have a credit balance of 117. Assuming a wager amount of one credit per game result indication, a player may then purchase up to 117 further standby game result indications (or even more if the player's balance increases further as the result of a purchase of one or more such standby game result indications).

Of course, various combinations of such embodiments are contemplated. For example, by exercising skill in some manner, a player may earn the right to view and/or benefit from a randomly-selected game result indication. In another example, the granting of access to such indications of game results may be determined by a combination of randomness and player choice. For example, each time player wishes to view an indication of a game result, he may select a pool of game result indications from which one game result indication may be randomly selected. Further, it should of course be understood that a variety of alternate methods of remotely viewing indications of game results besides game discs may be utilized in such embodiments (e.g., players view results transmitted electronically via the Internet, to a cellular phone, mobile computing device, and so on).

It cannot be over-emphasized that the use of DVD as an example media on which session result information may be recorded, to allow remote viewing of outcomes of the session, is intended as an example only and should not be taken in any limiting fashion. Thus, for example, although a sale of a DVD has been described herein, a similar process may be performed for a sale of a session in another remotely viewable form. For example, a sale of access to session results available online (e.g., wherein a player may be provided with an activation code that allows the player to access a video presentation online) is also contemplated. In another example, a sale of a CD-ROM, VHS tape, floppy disc, flash memory, memory stick, dedicated portable device for viewing video presentations, and paper-based flip-through book that illustrates the outcomes of a session may also be sold in a similar manner. In other words, the format or media via which the video presentation is provided to a player is not limited to a DVD. In another example, the redemption of a DVD is not intended to limit the redemption of a session result to be via a DVD form. For example, in one embodiment a player may provide a CD-ROM including a video presentation thereon and redeem the CD-ROM for the redemption value associated with the session. In another example, a player having viewed a video presentation online may be provided with a code or other means of collecting a redemption value associated with the session upon which the video presentation is based. Any practicable method of outputting a video presentation to a player such that a player may purchase plurality of outcomes and view them remotely at the player's convenience is contemplated.

Hybrid Predetermined and Non-Predetermined Local Session

The present specification has set forth methods by which players may purchase a hybrid gaming session, involving (i) "predetermined" results (determined before the sale of the session to the player) that may be indicated by a video presentation of a tangible medium which may be viewed remotely, and (ii) offers for other, not-yet-determined game results that may be generated and presented to a player after the purchase of the tangible medium.

In addition, the embodiments are described wherein predetermined results, offers associated with not-yet-determined results and/or not-yet-determined results themselves are not presented via a tangible medium such as a DVD, but rather on one or more electronic gaming machines. For example, rather than provide a "hybrid local and remote" session, a "hybrid predetermined and non-predetermined local session" may be provided (e.g., for a flat price). For example, a player may present $20 and be provided with 400 spins of a 5¢-denomination slot machine. Some portion of these results (e.g., all, some) may be predetermined (e.g., before sale of the session), such that when a player utilizes a gaming device (e.g., a handheld gaming device) to "play" them, the gaming device is simply accessing a record of predetermined results to output to the player. However, in some embodiments, the player may also be provided with a number of game plays that have yet to be determined and/or executed (at the time of the sale of the session). For example, while outputting 400 predetermined results (e.g., via a gaming device such as a handheld device), an offer for further, non-predetermined game play may be output (e.g., "You've won five bonus spins!"). An amount of such non-predetermined game play and an expected value associated therewith may be determined before the session is sold, and thus built into the pricing of the session as described (e.g., the fact that the player will "win" five bonus spins is predetermined, and these spins may have an expected value, though the player may ultimately win more or less than the expected value when redeeming them).

In some embodiments, the gaming device that accesses and outputs predetermined results may have some part in determining values associated with and/or otherwise executing the non-predetermined results (i.e. may provide a component of an outcome). For example, a handheld gaming device not only presents pre-stored outcomes but also presents one or more partial outcomes, wherein to complete the partial outcomes the player must utilize a GD in a legalized gambling jurisdiction. For example, the handheld gaming device may include a session of predetermined outcomes, and one or more partial bonus game outcomes such as a portion of a hand of "Texas Hold-em" poker. The player may be provided with representations of two "hole cards", but not the other cards required to complete the hand which is typically five more "common cards" (conventionally known by card players as the "flop" (3 cards), the "river" (1 card) and the "turn" (1 card)). Thus, for example, a player who purchased a DVD and viewed such a bonus round or bonus game, does not yet know if he has been dealt a winning Texas Hold-em poker hand because the last five cards "common cards" have not yet been dealt. In this case, the player must travel to a casino to use a video poker GD to obtain the cards needed to complete his hand, and such cards may be randomly determined by the video poker GD for executing and/or otherwise randomly determining such non-predetermined results (for example, video card GD 90-ZYW-2004 located next to the POS terminal on the west side of the slots gaming parlor provides the player with the required "common cards" needed to complete his hand, wherein the cards may be determined according to its own probability table, and any amounts paid out for winning combinations may be calculated according to a paytable stored in that GD).

Rules of Interpretation

Numerous embodiments have been described, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms "an embodiment", "embodiment", "embodiments", "the embodiment", "the embodiments", "an embodiment", "some embodiments", "an example embodiment", "at least one embodiment, "one or more embodiments" and "one embodiment" mean "one or more (but not necessarily all) embodiments of the present invention(s)" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term "method" or a like term. Accordingly, any reference in a claim to a "step" or "steps" of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi, Bluetooth, TDMA, CDMA, and 3G.

Where databases are described, it will be understood by one of ordinary skill in the art that (i) alternative database structures to those described may be readily employed, and (ii) other memory structures besides databases may be readily employed. Any schematic-illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

For example, as an example alternative to a database structure for storing information, a hierarchical electronic file folder structure may be used. A program may then be used to access the appropriate information in an appropriate file folder in the hierarchy based on a file path named in the program.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning.

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures and/or components that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

CONCLUSION

While various embodiments have been described herein, it should be understood that the scope of the present invention is not limited to the particular embodiments explicitly described. Many other variations and embodiments would be understood by one of ordinary skill in the art upon reading the present description.

What is claimed is:

1. A wagering game device comprising:

at least one display device;

at least one input device configured to receive an input corresponding to a local game play identifier, wherein the local game play identifier is associated with a tangible medium separately acquired by a player and which stores: (i) data representing a play of a wagering game having a predetermined outcome, and (ii) for said play of the wagering game, data representing a video presentation of said play of the wagering game;

at least one processor; and at least one memory device which stores a plurality of instructions which when executed by the at least one processor, cause the at least one processor to operate with the at least one display device and the at least one input device to:

(a) in response to the at least one input device receiving the input corresponding to the local game play identifier associated with the tangible medium:

(i) authenticate the received local game play identifier, and (ii) if the received local game play identifier is authenticated:

(A) display a play of a local game, the play of the local game being in addition to the play of the wagering game, (B) determine if the play of the local game play results in any award, and (C) display any award determined to result from the play of the local game, and (b) provide to the player:

(i) any award resulting from the predetermined outcome of the play of the wagering game stored on the tangible medium, and (ii) any determined and displayed award for the play of the local game.

2. The wagering game device of claim 1, wherein the at least one input device comprises at least one of a card reader, a coupon reader, a barcode reader, a ticket reader, a keyboard, a mouse and a touch screen device.

3. The wagering game device of claim 1, wherein when executed by the at least one processor, the plurality of instructions cause the at least one processor to operate with the display device to display a menu associated with the play of the local game, wherein the menu displays a plurality of different local game play options selectable by the player.

4. The wagering game device of claim 3, wherein the plurality of different local game play options include at least one of a plurality of different game themes, a plurality of different game elements, and a plurality of different game selections.

5. The wagering game device of claim 1, wherein the local game play identifier includes at least one of a code, a bonus game identifier, a bonus round identifier, a printed barcode, coupon data, wagering game receipt data, video ticket data, cashless gaming ticket data, and game results ticket data.

6. A wagering game device comprising:

at least one display device;

at least one first input device configured to receive a tangible medium separately acquired by a player and which stores: (i) data representing a play of a wagering game having a predetermined outcome, and (ii) for said play of the wagering game, data representing a video presentation of said play of the wagering game;

at least one second input device configured to receive an input corresponding to a local game play identifier, wherein the local game play identifier is associated with the video presentation stored on the tangible medium;

at least one processor; and at least one memory device which stores a plurality of instructions which when executed by the at least one processor, cause the at least one processor to operate with the at least one display device, the at least one first input device and the at least one second input device to:

(i) in response to the at least one first input device receiving the tangible medium:

(a) display the video presentation of the play of the wagering game having the predetermined outcome, and (b) provide to the player any award resulting from the predetermined outcome of the play of the wagering game of the displayed video presentation, and (ii) in response to the at least one second input device receiving the input corresponding to the at least one local game play identifier associated with the tangible medium:

(a) authenticate the received local game play identifier, and (b) if the received local game play identifier is authenticated:

(1) display a play of a local game, the play of the local game being in addition to the play of the wagering game, (2) determine if the play of the local game play results in any award, (3) display any award determined to result from the play of the local game, and (4) provide to the player any determined and displayed award for the play of the local game.

* * * * *

UNITED STATES PATENT AND TRADEMARK OFFICE

CERTIFICATE OF CORRECTION

PATENT NO. : 7,753,770 B2
APPLICATION NO. : 11/393939
DATED : July 13, 2010
INVENTOR(S) : Jay S. Walker et al.

It is certified that error appears in the above-identified patent and that said Letters Patent is hereby corrected as shown below:

In Claim 3, Column 59, Lines 48 to 49, replace “the display” with --the at least one display--.

Signed and Sealed this

Fifth Day of October, 2010

David J. Kappos
*Director of the United States Patent and Trademark Office*